US012634495B2

(12) United States Patent
Yang et al.

(10) Patent No.: US 12,634,495 B2
(45) Date of Patent: May 19, 2026

(54) ENCODING AND DECODING METHOD, AND APPARATUS

(71) Applicant: Huawei Technologies Co., Ltd., Shenzhen (CN)

(72) Inventors: Haitao Yang, Shenzhen (CN); Yin Zhao, Hangzhou (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 18/426,805

(22) Filed: Jan. 30, 2024

(65) Prior Publication Data

US 2024/0223790 A1    Jul. 4, 2024

Related U.S. Application Data

(63) Continuation of application No. PCT/CN2022/096354, filed on May 31, 2022.

(30) Foreign Application Priority Data

Jul. 31, 2021    (CN) .......................... 202110877277.2

(51) Int. Cl.
*H04N 19/44* (2014.01)
*H04N 19/13* (2014.01)
*H04N 19/85* (2014.01)

(52) U.S. Cl.
CPC ............. *H04N 19/44* (2014.11); *H04N 19/13* (2014.11); *H04N 19/85* (2014.11)

(58) Field of Classification Search
CPC ........ H04N 19/44; H04N 19/13; H04N 19/85; H04N 19/132; H04N 19/59; G06N 3/04;
(Continued)

(56) References Cited

U.S. PATENT DOCUMENTS

| | | | | |
|---|---|---|---|---|
| 11,200,639 | B1 * | 12/2021 | Kim ........................ | G06N 3/045 |
| 2017/0347110 | A1 * | 11/2017 | Wang ...................... | G06F 18/22 |
| 2020/0092556 | A1 * | 3/2020 | Coelho ................ | H04N 19/124 |

FOREIGN PATENT DOCUMENTS

| | | |
|---|---|---|
| CN | 110033003 A | 7/2019 |
| CN | 110300301 A | 10/2019 |

(Continued)

OTHER PUBLICATIONS

Johannes Balle, et al "Variational Image Compression with a Scale Hyperprior" on 6th International Conference on Learning Representations, Dec. 31, 2018, 23 pages.
(Continued)

*Primary Examiner* — Tat C Chio
(74) *Attorney, Agent, or Firm* — Conley Rose, P.C.

(57) ABSTRACT

A decoding method includes decoding a bitstream to obtain a first feature map, where a resolution of the first feature map is lower than a resolution of an original picture; and reconstructing a second feature map based on a first neural network, to obtain a reconstructed picture, where a resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

20 Claims, 25 Drawing Sheets

10

(58) Field of Classification Search
CPC ...... G06N 3/045; G06N 3/0464; G06T 9/002;
G06T 9/00
See application file for complete search history.

(56) References Cited

FOREIGN PATENT DOCUMENTS

| | | | |
|----|--------------|----|---------|
| CN | 111800629 | A  | 10/2020 |
| CN | 112215332 | A  | 1/2021  |
| EP | 3848886 | A1 | 7/2021  |

OTHER PUBLICATIONS

Zhou Jiantong et al., Trends and technologies of video coding, Aug. 31, 2017, total 20 pages.

* cited by examiner

600

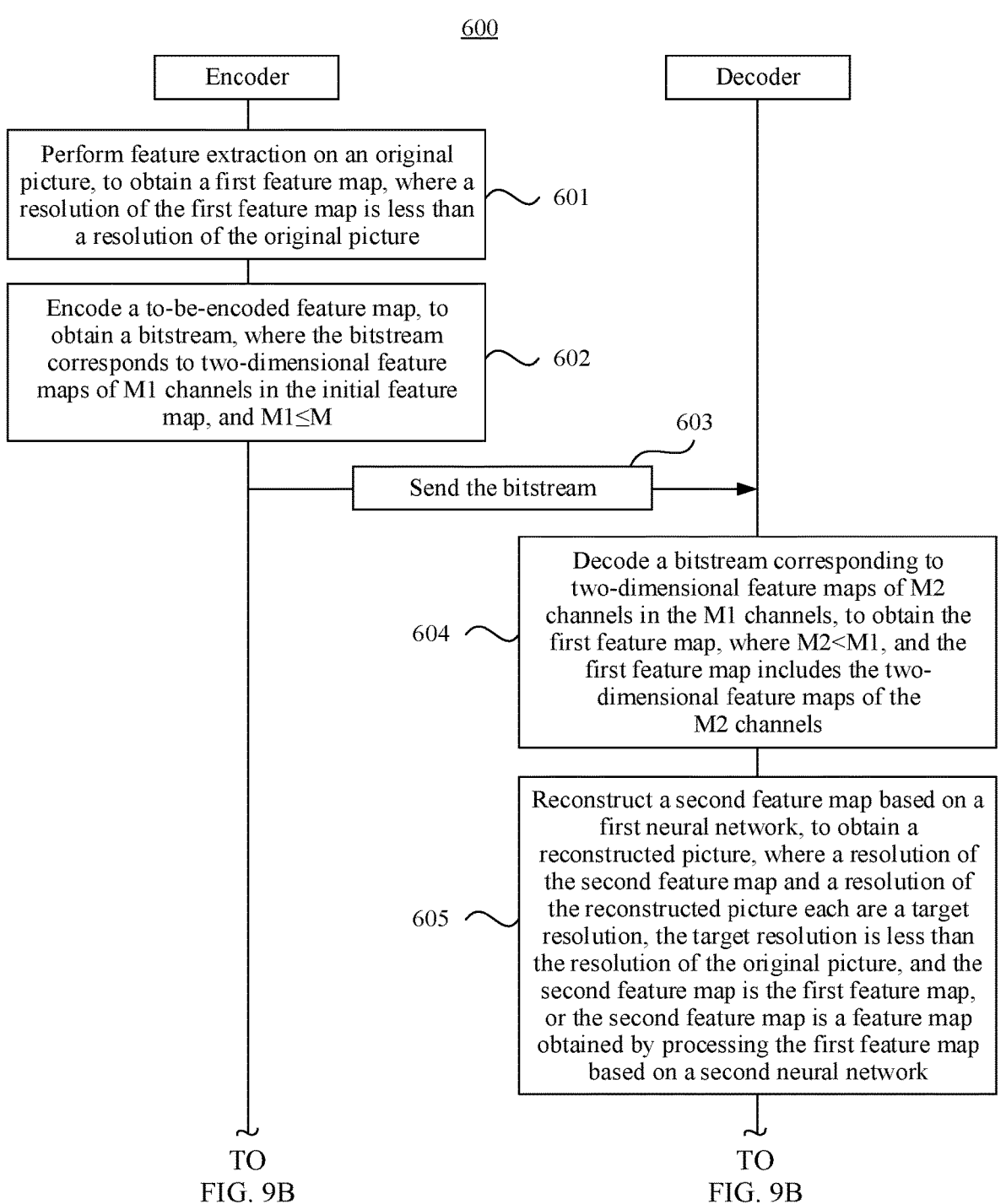

Encoder

Perform feature extraction on an original picture, to obtain a first feature map, where a resolution of the first feature map is less than a resolution of the original picture — 601

Encode a to-be-encoded feature map, to obtain a bitstream, where the bitstream corresponds to two-dimensional feature maps of M1 channels in the initial feature map, and M1≤M — 602

603

Send the bitstream

Decoder

Decode a bitstream corresponding to two-dimensional feature maps of M2 channels in the M1 channels, to obtain the first feature map, where M2<M1, and the first feature map includes the two-dimensional feature maps of the M2 channels — 604

Reconstruct a second feature map based on a first neural network, to obtain a reconstructed picture, where a resolution of the second feature map and a resolution of the reconstructed picture each are a target resolution, the target resolution is less than the resolution of the original picture, and the second feature map is the first feature map, or the second feature map is a feature map obtained by processing the first feature map based on a second neural network — 605

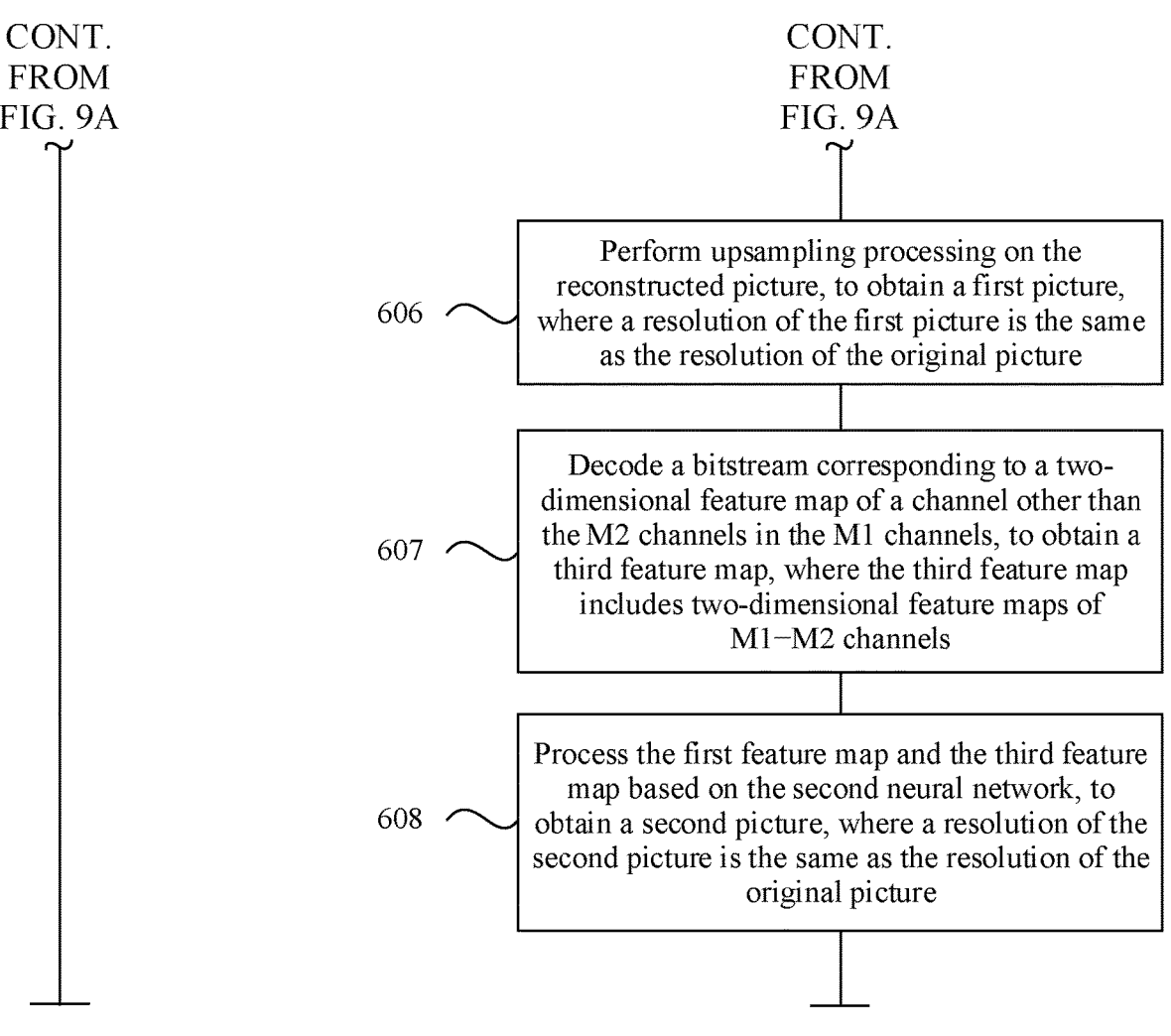

CONT.
FROM
FIG. 9A

CONT.
FROM
FIG. 9A

606    Perform upsampling processing on the reconstructed picture, to obtain a first picture, where a resolution of the first picture is the same as the resolution of the original picture 607    Decode a bitstream corresponding to a two-dimensional feature map of a channel other than the M2 channels in the M1 channels, to obtain a third feature map, where the third feature map includes two-dimensional feature maps of M1−M2 channels 608    Process the first feature map and the third feature map based on the second neural network, to obtain a second picture, where a resolution of the second picture is the same as the resolution of the original picture

FIG. 9B

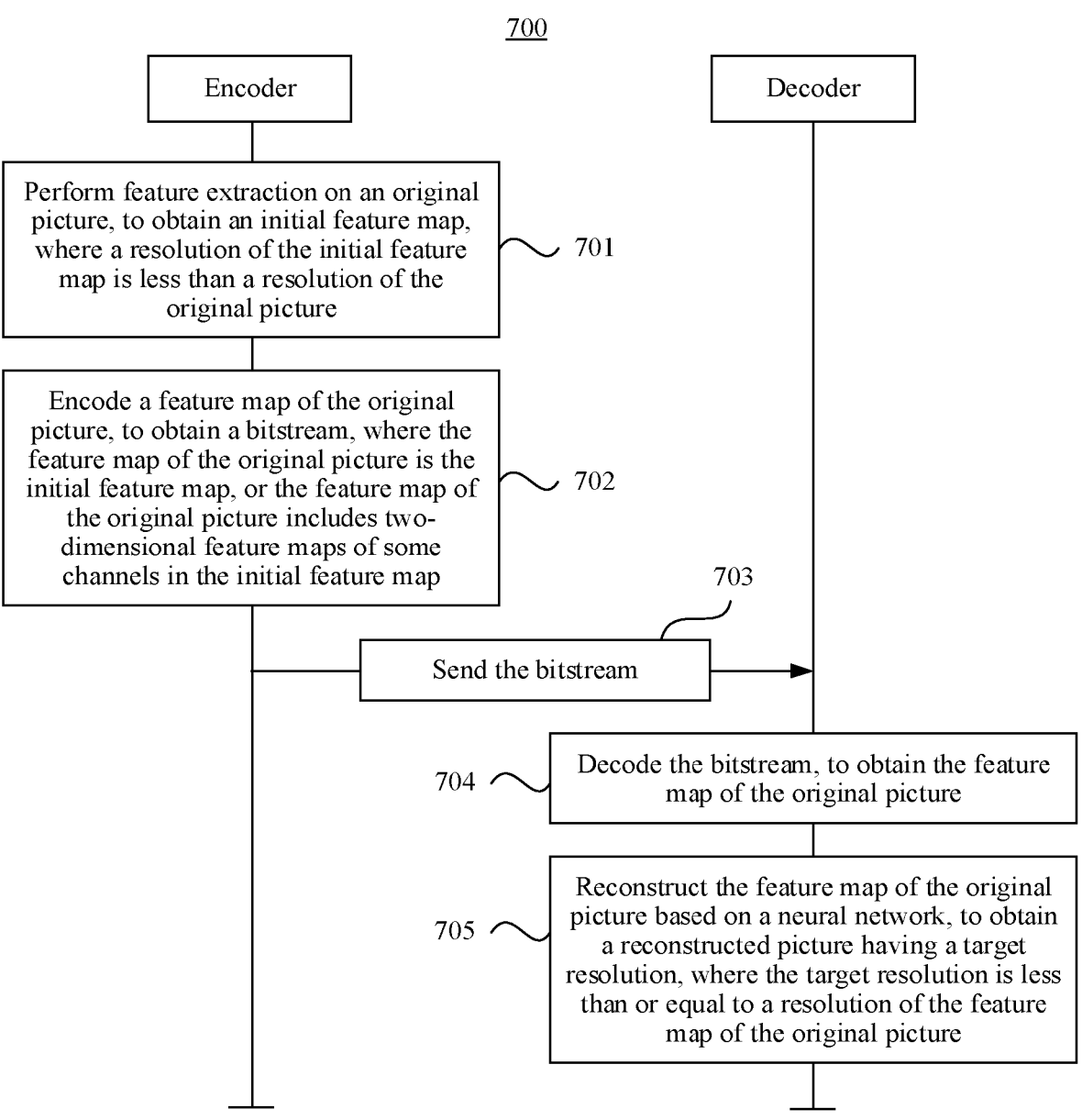

700

Encoder

Decoder

Perform feature extraction on an original picture, to obtain an initial feature map, where a resolution of the initial feature map is less than a resolution of the original picture    701

Encode a feature map of the original picture, to obtain a bitstream, where the feature map of the original picture is the initial feature map, or the feature map of the original picture includes two-dimensional feature maps of some channels in the initial feature map    702

703

Send the bitstream

704    Decode the bitstream, to obtain the feature map of the original picture

705    Reconstruct the feature map of the original picture based on a neural network, to obtain a reconstructed picture having a target resolution, where the target resolution is less than or equal to a resolution of the feature map of the original picture

FIG. 10

ENCODING AND DECODING METHOD, AND APPARATUS

CROSS-REFERENCE TO RELATED APPLICATIONS

This is a continuation of International Patent Application No. PCT/CN2022/096354 filed on May 31, 2022, which claims priority to Chinese Patent Application No. 202110877277.2 filed on Jul. 31, 2021. The disclosures of the aforementioned applications are hereby incorporated by reference in their entireties.

TECHNICAL FIELD

Embodiments of this disclosure relate to the field of data compression technologies, and in particular, to an encoding and decoding method, and an apparatus.

BACKGROUND

Video encoding and decoding are widely applied to a digital video application, for example, a real-time session application such as video transmission, video chatting, and video conferencing on a broadcast digital television, the Internet, an album, and a mobile network, a DIGITAL VERSATILE DISC (DVD), a BLU-RAY disc, a video content capturing and editing system, and a secure application of a portable camera.

A video usually has a large data amount. In a network with a limited bandwidth capacity, it may be difficult to send video data or transmit video data in another manner. Therefore, the video data usually needs to be compressed before being transmitted in a modern telecommunication network. Because there may be limited memory resources, a size of the video may also become a problem when the video is stored in a storage device. At a source side, software and/or hardware of a video compression device is usually used, to encode the video data before transmission or storage, to decrease a data amount required for representing digital video data. Then, compressed video data is received by a video decompression device at a destination side. In a case of a limited network resource and a continuously increasing requirement for higher video quality, compression and decompression technologies need to be improved. The improved technologies can improve a compression rate almost without affecting picture quality.

In some operations of the digital video application, a thumbnail of an original picture needs to be displayed, to display a large quantity of pictures in a display interface. In a conventional technology, a received bitstream of the original picture is first decoded and reconstructed, to obtain the original picture. Then, a resolution of the original picture is reduced, to obtain the thumbnail of the original picture. However, the foregoing manner of obtaining the thumbnail of the original picture is complex and consumes a long period of time, consequently, a speed at which a digital video application displays a thumbnail of the original picture is affected.

SUMMARY

This disclosure provides an encoding and decoding method, and an apparatus, to improve efficiency of obtaining a reconstructed picture, and improve a speed at which a digital video application displays a thumbnail of an original picture.

According to a first aspect, this disclosure provides a decoding method. The method includes decoding a bitstream, to obtain a first feature map, where a resolution of the first feature map is lower than a resolution of an original picture, and reconstructing a second feature map based on a first neural network, to obtain a reconstructed picture, where a resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

The feature map is three-dimensional data output by layers such as a convolutional layer, an activation layer, a pooling layer, and a batch normalization layer in a convolutional neural network, and three dimensions of the feature map are respectively referred to as a width, a height, and a channel. The feature map may be M×W×H, and it indicates that the feature map includes two-dimensional feature maps that are of M channels and whose resolutions are W×H. Herein, W represents a width, and H represents a height.

The resolution of the reconstructed picture output by the first neural network and the resolution of the input second feature map are the same, and each are a target resolution. When the second feature map is the first feature map, the target resolution is equal to the resolution of the first feature map. When the second feature map is a feature map obtained by processing the first feature map based on the second neural network, the target resolution is greater than the resolution of the first feature map.

The second neural network is configured to process the first feature map, to obtain the second feature map. The processing may include a convolution operation and/or a deconvolution operation. Further, the processing may further include a normalization operation.

In the decoding method, a decoder decodes the bitstream, to obtain the first feature map, and then reconstructs the second feature map based on the first neural network, to obtain the reconstructed picture. The resolution of the second feature map and the resolution of the reconstructed picture each are a target resolution, and the target resolution is lower than the resolution of the original picture. The second feature map includes the first feature map, or the second feature map is a feature map obtained by processing a feature map of the original picture based on the second neural network. The resolution of the reconstructed picture obtained through decoding and reconstruction is lower than the resolution of the original picture. In a process of obtaining the reconstructed picture, the original picture does not need to be first obtained through reconstruction, instead, the reconstructed picture is directly obtained, to improve efficiency of obtaining the reconstructed picture, and improve a speed at which a digital video application displays a thumbnail of an original picture.

When there is one first neural network, in an example, the second neural network does not need to be applied, and the first neural network may exist independently. In this case, the second feature map is the first feature map, the first neural network can output only a reconstructed picture having one resolution, and the resolution is the resolution of the first feature map.

In another example, the first neural network may be connected to an input end of the second neural network and/or connected to one or more output nodes. In this case, the second feature map is the first feature map or a feature map obtained by processing the first feature map based on the second neural network, and the first neural network can output reconstructed pictures having one or more resolutions.

When there is a plurality of first neural networks, the input end of the second neural network and/or each output node are/is connected to the first neural network. In this case, the second feature map is the first feature map or a feature map obtained by processing the first feature map based on the second neural network, and the first neural network can output reconstructed pictures having a plurality of resolutions.

In a possible implementation, when the second feature map is a feature map obtained by processing the first feature map based on the second neural network, the second neural network includes one or more output nodes and a plurality of convolutional layers, the output node is located between an output end of a first convolutional layer and an input end of a last convolutional layer, the output node is connected to an input end of the first neural network, and the method further includes inputting the first feature map into the second neural network, to obtain the second feature map output by a target output node of the second neural network, where the target output node belongs to the one or more output nodes, and reconstructing a second feature map based on a first neural network, to obtain a reconstructed picture includes inputting the second feature map output by the target output node into the first neural network, to obtain the reconstructed picture output by the first neural network.

The second neural network is an existing neural network in a network used for encoding and decoding in a conventional technology, and is used to generate a reconstructed picture having an original resolution. Output nodes are disposed at different locations of the second neural network, and reconstructed pictures having a plurality of target resolutions can be generated by using the output nodes and an existing second neural network. In this process, the second neural network is used to process the first feature map. In a process of generating reconstructed pictures having different target resolutions, all the output nodes share a layer in the second neural network. In this way, a size of a neural network (including the first neural network and the second neural network) used to generate the reconstructed picture can be reduced, and storage space that is of the decoder and that is occupied by the neural network used to generate the reconstructed picture is reduced, to reduce running overheads and running complexity of the neural network used to generate the reconstructed picture in the decoder.

In a possible implementation, when there is one first neural network, the second feature map output by the target output node is directly input into the network, to obtain a reconstructed picture output by the neural network. When there is a plurality of first neural networks, inputting the second feature map output by the target output node into the first neural network, to obtain the reconstructed picture output by the first neural network includes inputting the second feature map into a first neural network connected to the target output node, to obtain the reconstructed picture output by the first neural network connected to the target output node.

In a possible implementation, when there are a plurality of target resolutions and a plurality of target output nodes, inputting the first feature map into the second neural network, to obtain the second feature map output by a target output node of the second neural network includes inputting the first feature map into the second neural network, to obtain second feature maps that have a plurality of resolutions and that are output by the plurality of target output nodes of the second neural network, and inputting the second feature map output by the target output node into the first neural network, to obtain the reconstructed picture output by the first neural network includes inputting a second feature map output by each target output node into a first neural network connected to the target output node, to obtain reconstructed pictures that have a plurality of resolutions and that are output by first neural networks respectively connected to the plurality of target output nodes.

The output nodes may output second feature maps in parallel or in serial. When the second feature maps are output in parallel, efficiency of obtaining the reconstructed picture can be improved. When the second feature maps are output in serial, the second feature maps output by the output nodes may be shared. In this way, a quantity of calculation times of the second neural network can be reduced, and operation overheads of the second neural network are further reduced.

In a possible implementation, when the second neural network includes a plurality of output nodes, each output node corresponds to one output resolution, and the method further includes determining the target resolution, and determining that an output node whose output resolution is the target resolution is the target output node.

The target resolution may be determined by the decoder, or may be determined by an outside of the decoder, for example, determined by an external application layer of the decoder or an encoder. For the external application layer, refer to the digital video application, for example, a video player, an album, or a web page.

For example, the target resolution may be determined based on a resolution of the thumbnail. For example, a resolution that is in candidate resolutions that can be output by the first neural network and that is closest to the resolution of the thumbnail is determined as the target resolution. For another example, the target resolution may be determined based on complexity and/or a power consumption constraint of a process of obtaining a reconstructed picture having each candidate resolution.

In a possible implementation, the first neural network includes at least one convolutional layer, and a convolution stride of the at least one convolutional layer is 1.

In a possible implementation, the bitstream corresponds to two-dimensional feature maps of M1 channels, and decoding a bitstream to obtain a first feature map includes decoding a bitstream corresponding to two-dimensional feature maps of M2 channels in the M1 channels, to obtain the first feature map, where M2<M1, and the first feature map includes the two-dimensional feature maps of the M2 channels.

The decoder may decode the bitstream corresponding to two-dimensional feature maps of first M2 channels in the M1 channels. In this way, a subsequent reconstruction procedure can be executed after the bitstream corresponding to the two-dimensional feature maps of the M2 channels is decoded, and there is no need to execute the subsequent reconstruction procedure after the entire bitstream is decoded, to improve efficiency of obtaining a third feature map, and improve efficiency of obtaining the reconstructed picture.

In a possible implementation, the method further includes performing upsampling processing on the reconstructed picture, to obtain a first picture, where a resolution of the first picture is the same as the resolution of the original picture.

For example, upsampling processing may include bilinear interpolation upsampling, or upsampling performed by directly filling a pixel value at a neighboring location, or upsampling performed by performing a deconvolution operation at a convolutional layer whose stride is greater than 1.

It should be noted that, if a feature map obtained by decoding the entire bitstream is reconstructed, to generate the reconstructed picture having the original resolution, the resolution of the picture having the original resolution is high, and a generation process consumes a long period of time. This affects a speed at which the digital video application displays the picture having the original resolution, and frame freezing occurs when the user browses the picture having the original resolution. In this embodiment of this disclosure, only a partial bitstream of the bitstream is decoded in a process of obtaining the reconstructed picture, so that a data amount of the reconstructed picture is small, and efficiency of obtaining the reconstructed picture is high. In this way, when the first picture is obtained based on the reconstructed picture, efficiency of obtaining the first picture is improved, to reduce time consumed in a process of obtaining the first picture, and improve the speed at which the digital video application displays the picture having the original resolution.

With reference to the foregoing implementation, the bitstream is a bitstream of an initial feature map, the initial feature map is obtained by performing feature extraction on the original picture, and the method further includes decoding a bitstream corresponding to a two-dimensional feature map of a channel other than the M2 channels in the M1 channels, to obtain a third feature map, where the third feature map includes two-dimensional feature maps of the M1-M2 channels, and processing the first feature map and the third feature map based on the second neural network, to obtain a second picture, where a resolution of the second picture is the same as the resolution of the original picture.

The second picture is generated after the first feature map and the third feature map are reconstructed, a data amount of the second picture is greater than a data amount of the first picture, and picture quality of the second picture is higher than that of the first picture. Because a reconstruction process of the second picture consumes a long period of time, a low-quality first picture is first quickly generated for display, and a high-quality second picture is obtained through reconstruction. In this way, frame freezing does not occur when the digital video application displays the picture having the original resolution, and a display effect of the picture having the original resolution is improved.

In a possible implementation, the second feature map includes two-dimensional feature maps of a plurality of channels, and before reconstructing a second feature map based on a first neural network, to obtain a reconstructed picture, the method further includes performing channel reduction processing on the second feature map, and reconstructing a second feature map based on a first neural network, to obtain a reconstructed picture includes reconstructing, based on the first neural network, a second feature map obtained through channel reduction processing, to obtain the reconstructed picture.

In a possible implementation, the first feature map includes two-dimensional feature maps of a plurality of channels, and the method further includes performing channel reduction processing on the first feature map, where the second feature map is a first feature map obtained through channel reduction processing, or the second feature map is a feature map obtained by processing, based on the second neural network, the first feature map obtained through channel reduction processing.

Channel reduction processing is performed on the second feature map and/or the first feature map, to reduce complexity of a subsequent reconstruction process and efficiency of the reconstruction process.

According to a second aspect, this disclosure provides a decoding method, including decoding a bitstream, to obtain a first feature map, and reconstructing, based on a first neural network, a second feature map having a first resolution, to obtain a reconstructed picture having a second resolution, where the second resolution is different from the first resolution, the second resolution is lower than a resolution of an original picture, and the second feature map includes the first feature map, or the second feature map is a feature map obtained by processing the first feature map based on a second neural network.

A resolution of the reconstructed picture output by the first neural network and a resolution of the input second feature map are different. Because values of a plurality of resolutions that can be output by the second neural network are fixed, a value of a resolution output by a first neural network connected to one or more output nodes of the second neural network is fixed. In the method, the first neural network also has a function of changing a resolution of an input feature map. In this way, resolutions with various values can be output based on first neural networks of different structures. This reduces running overheads and running complexity of a neural network used to generate a reconstructed picture in a decoder, and improves flexibility of generating the reconstructed picture.

According to a third aspect, this disclosure provides an encoding method. The method includes performing feature extraction on an original picture, to obtain an initial feature map, where the initial feature map includes two-dimensional feature maps of a plurality of channels, and a resolution of the initial feature map is lower than a resolution of the original picture, and encoding a to-be-encoded feature map, to obtain a bitstream, where the to-be-encoded feature map is the initial feature map, or two-dimensional feature maps of some channels in the initial feature map.

When the to-be-encoded feature map includes the two-dimensional feature maps of some channels in the initial feature map, a data amount of a subsequently encoded bitstream can be reduced, and communication overheads of transmitting the bitstream to a decoder side can be reduced.

According to a fourth aspect, this disclosure provides a decoding apparatus. The decoding apparatus includes a processing module configured to decode a bitstream, to obtain a first feature map, where a resolution of the first feature map is lower than a resolution of an original picture, and a reconstruction module configured to reconstruct a second feature map based on a first neural network, to obtain a reconstructed picture, where a resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

In a possible implementation, when the second feature map is a feature map obtained by processing the first feature map based on the second neural network, the second neural network includes one or more output nodes and a plurality of convolutional layers, the output node is located between an output end of a first convolutional layer and an input end of a last convolutional layer, the output node is connected to an input end of the first neural network, and the reconstruction module is further configured to input the first feature map into the second neural network, to obtain the second feature map output by a target output node of the second neural network, where the target output node belongs to the one or more output nodes, and the reconstruction module is configured to input the second feature map output by the target output node into the first neural network, to obtain the reconstructed picture output by the first neural network.

In a possible implementation, when there is a plurality of first neural networks, the reconstruction module is configured to input the second feature map into a first neural network connected to the target output node, to obtain the reconstructed picture output by the first neural network connected to the target output node.

In a possible implementation, when there are a plurality of target resolutions and a plurality of target output nodes, the reconstruction module is configured to input the first feature map into the second neural network, to obtain second feature maps that have a plurality of resolutions and that are output by the plurality of target output nodes of the second neural network, and input a second feature map output by each target output node into a first neural network connected to the target output node, to obtain reconstructed pictures that have a plurality of resolutions and that are output by first neural networks respectively connected to the plurality of target output nodes.

In a possible implementation, when the second neural network includes a plurality of output nodes, each output node corresponds to one output resolution, and the reconstruction module is further configured to determine the target resolution, and determine that an output node whose output resolution is the target resolution is the target output node.

In a possible implementation, the first neural network includes at least one convolutional layer, and a convolution stride of the at least one convolutional layer is 1.

In a possible implementation, the bitstream corresponds to two-dimensional feature maps of M1 channels, and the processing module is configured to decode a bitstream corresponding to two-dimensional feature maps of M2 channels in the M1 channels, to obtain the first feature map, where $M2 < M1$, and the first feature map includes the two-dimensional feature maps of the M2 channels.

In a possible implementation, the reconstruction module is further configured to perform upsampling processing on the reconstructed picture, to obtain a first picture, where a resolution of the first picture is the same as the resolution of the original picture.

In a possible implementation, the bitstream is a bitstream of an initial feature map, the initial feature map is obtained by performing feature extraction on the original picture, and the processing module is further configured to decode a bitstream corresponding to a two-dimensional feature map of a channel other than the M2 channels in the M1 channels, to obtain a third feature map, where the third feature map includes two-dimensional feature maps of the M1-M2 channels, and the reconstruction module is further configured to process the first feature map and the third feature map based on the second neural network, to obtain a second picture, where a resolution of the second picture is the same as the resolution of the original picture.

In a possible implementation, the second feature map includes two-dimensional feature maps of a plurality of channels, and the processing module is further configured to perform channel reduction processing on the second feature map, and the reconstruction module is configured to reconstruct, based on the first neural network, a second feature map obtained through channel reduction processing, to obtain the reconstructed picture.

In a possible implementation, the first feature map includes two-dimensional feature maps of a plurality of channels, and the reconstruction module is further configured to perform channel reduction processing on the first feature map. The second feature map is a first feature map obtained through channel reduction processing, or the second feature map is a feature map obtained by processing, based on the second neural network, the first feature map obtained through channel reduction processing.

According to a fifth aspect, this disclosure provides an encoding apparatus. The encoding apparatus includes a processing module configured to perform feature extraction on an original picture, to obtain an initial feature map, where the initial feature map includes two-dimensional feature maps of a plurality of channels, and a resolution of the initial feature map is lower than a resolution of the original picture, and an encoding module configured to encode a to-be-encoded feature map, to obtain a bitstream, where the to-be-encoded feature map is the initial feature map, or two-dimensional feature maps of some channels in the initial feature map.

According to a sixth aspect, this disclosure provides an electronic device, including one or more processors, and a storage configured to store one or more computer programs or instructions. When the one or more computer programs or instructions are executed by the one or more processors, the one or more processors are enabled to implement the method according to any one of the first aspect to the third aspect.

According to a seventh aspect, this disclosure provides an electronic device, including a processor configured to perform the method according to any one of the first aspect to the third aspect.

According to an eighth aspect, this disclosure provides a computer-readable storage medium, including a computer program or instructions. When the computer program or instructions are executed on a computer, the computer is enabled to perform the method according to any one of the first aspect to the third aspect.

BRIEF DESCRIPTION OF DRAWINGS

FIG. 9A and FIG. 9B are a schematic flowchart of a process of still another encoding and decoding method according to an embodiment of this disclosure;

FIG. 10 is a schematic flowchart of a process of yet another encoding and decoding method according to an embodiment of this disclosure;

DESCRIPTION OF EMBODIMENTS

Figure 1:
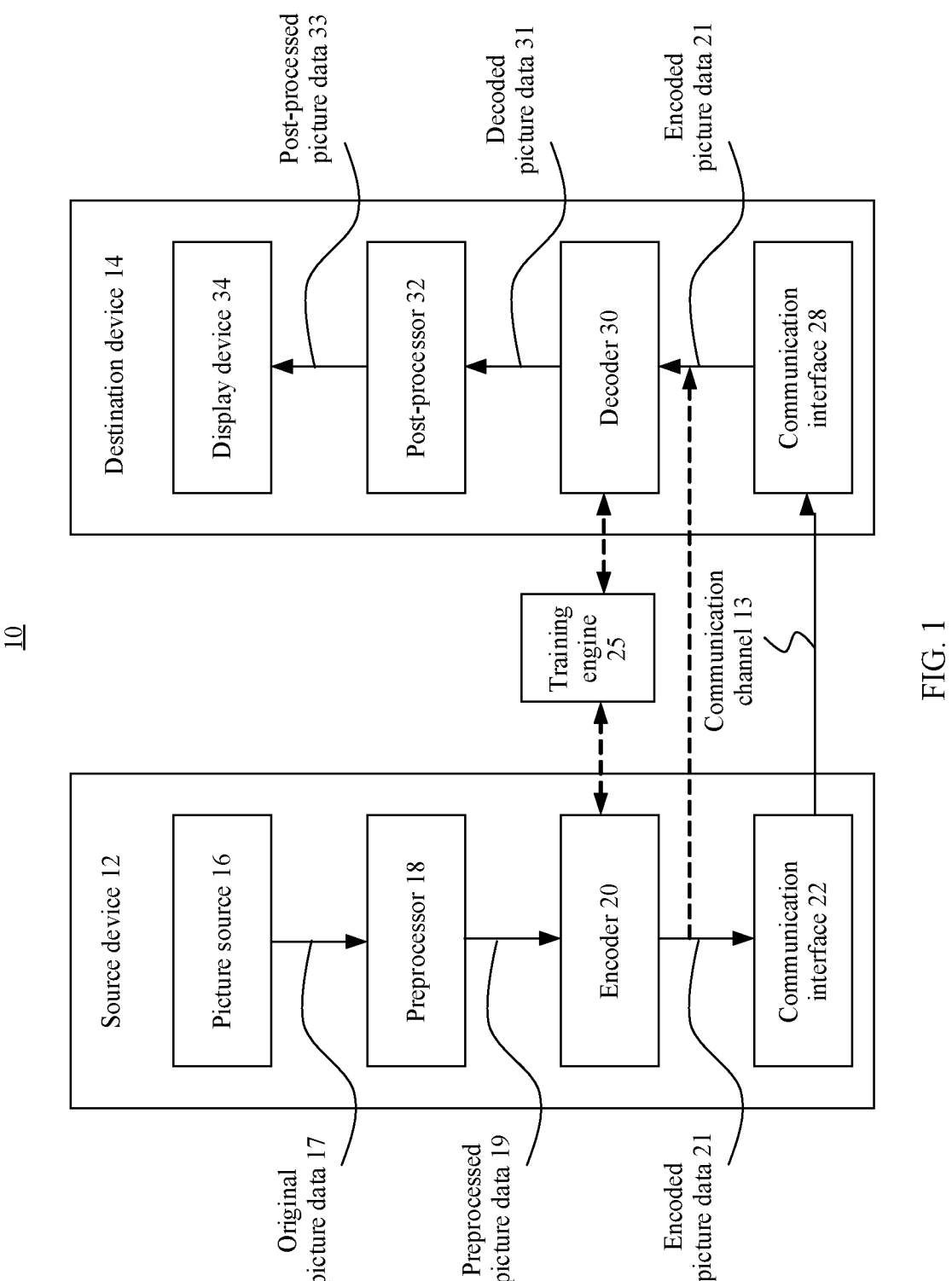
FIG. 1 is an example block diagram of a decoding system according to an embodiment of this disclosure.

The following clearly describes the technical solutions in embodiments of this disclosure with reference to the accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

The term "and/or" in this specification describes only an association relationship for describing associated objects and represents that three relationships may exist. For example, A and/or B may represent the following three cases: only A exists, both A and B exist, and only B exists.

In the specification and claims of embodiments of this disclosure, the terms such as "first" and "second" are intended to distinguish between different objects but do not indicate a particular order of the objects. For example, a first range, a second range, and the like are used to distinguish between different ranges, but are not used to describe a particular order of the ranges.

In embodiments of this disclosure, the word such as "in an example", "example", or "for example" is used to represent giving an example, an illustration, or a description. Any embodiment or design solution described as "in an example", "example", or "for example" in embodiments of this disclosure should not be explained as having more advantages than another embodiment or design solution. Exactly, use of the word such as "in an example", "example", or "for example" is intended to present a related concept in a specific manner.

In descriptions of embodiments of this disclosure, unless otherwise specified, "at least one" means one or more, and "a plurality of" means two or more. For example, a plurality of processing units are two or more processing units, and a plurality of systems are two or more systems.

An embodiment of this disclosure provides an artificial intelligence (AI)-based video compression/decompression technology, in particular, provides a neural network-based video compression/decompression technology, and provides an encoding and decoding technology. The encoding and decoding technology may include an entropy encoding and decoding technology.

Video encoding and decoding include two parts: video encoding and video decoding. Video encoding is performed on a source side (or an encoder side), and usually includes processing (for example, compressing) an original picture to reduce a data amount required for representing the original picture (for more efficient storage and/or transmission). Video decoding is performed on a destination side (or a decoder side), and usually includes performing inverse processing relative to the encoder side, to reconstruct an original picture. "Encoding and decoding" of the video in embodiments should be understood as "encoding" or "decoding" of the video.

Video encoding and decoding are usually processing a picture sequence that forms a video or a video sequence. In the video encoding and decoding field, the terms "picture", "frame", and " " may be used as synonyms.

FIG. 1 is an example block diagram of a decoding system according to an embodiment of this disclosure, for example, a video decoding system 10 (or a decoding system 10) in which a technology in this disclosure may be used. A video encoder 20 (or an encoder 20) and a video decoder 30 (or a decoder 30) in the video decoding system 10 represent devices that may be configured to execute a technology based on various examples described in this disclosure.

As shown in FIG. 1, the decoding system 10 includes a source device 12. The source device 12 is configured to provide encoded picture data 21 such as an encoded picture to a destination device 14 that is configured to decode the encoded picture data 21.

The source device 12 includes an encoder 20, and may additionally, that is, optionally, include a picture source 16, a preprocessor (or preprocessing unit) 18, for example, a picture preprocessor, and a communication interface (or communication unit) 22.

The picture source 16 may include or may be any type of picture capturing device for capturing a real-world picture, or the like, and/or any type of a picture generating device, for example, a computer-graphics processor for generating a computer animated picture, or any type of device for obtaining and/or providing a real-world picture, a computer generated picture (for example, screen content, a virtual reality (VR) picture) and/or any combination thereof (for example, an augmented reality (AR) picture). The picture source may be any type of memory or storage storing any of the foregoing pictures.

In distinction to processing performed by the preprocessor (or the preprocessing unit) 18, the picture (or picture data) 17 may also be referred to as an original picture (or original picture data) 17.

The preprocessor 18 is configured to receive the original picture data 17, and preprocess the original picture data 17, to obtain a preprocessed picture (preprocessed picture data) 19. For example, preprocessing performed by the preprocessor 18 may include trimming, color format conversion (for example, from red, green, and blue (RGB) to luma, blue-difference chroma, and red-difference chroma (YCbCr)), color grading, or de-noising. It can be understood that, the preprocessing unit 18 may be an optional component.

The video encoder (or encoder) 20 is configured to receive the preprocessed picture data 19, and provide the encoded picture data 21.

The communication interface 22 of the source device 12 may be configured to receive the encoded picture data 21, and send, through a communication channel 13, the encoded picture data 21 (or any other processed version) to another device, for example, the destination device 14 or any other device, for storage or direct reconstruction.

The source device 12 may further include a storage. The storage may be configured to store at least one type of the following data: the original picture data 17, the preprocessed picture (or preprocessed picture data) 19, and the encoded picture data 21.

The destination device 14 includes a decoder 30, and may additionally, that is, optionally, include a communication interface (or a communication unit) 28, a post-processor (or post-processing unit) 32, and a display device 34.

The communication interface 28 of the destination device 14 is configured to directly receive the encoded picture data 21 (or any other processed version) from the source device 12 or any other source device, for example, a storage device. For example, the storage device is an encoded picture data storage device, and provides the encoded picture data 21 to the decoder 30.

The communication interface 22 and the communication interface 28 may be configured to send or receive the encoded picture data (or encoded data) 21 through a direct communication link between the source device 12 and the destination device 14, for example, a direct wired or wireless connection, or through any type of network, for example, a wired network, a wireless network, or any combination thereof, or any type of private network and public network, or any type of combination thereof.

For example, the communication interface 22 may be configured to package the encoded picture data 21 into a proper format, for example, a packet, and/or process the encoded picture data through any type of transmission encoding or processing, to perform transmission on a communication link or communication network.

The communication interface 28 corresponds to the communication interface 22, for example, may be configured to receive transmission data, and process the transmission data through any type of corresponding transmission decoding or processing and/or de-packaging, to obtain the encoded picture data 21.

Both the communication interface 22 and the communication interface 28 may be configured as unidirectional communication interfaces indicated by an arrow that corresponds to the communication channel 13 and that points from the source device 12 to the destination device 14 in FIG. 1, or bi-directional communication interfaces, and may be configured to send and receive messages, or the like, to establish a connection, and acknowledge and exchange any other information related to the communication link and/or data transmission, for example, encoded picture data transmission.

The video decoder (or decoder) 30 is configured to receive the encoded picture data 21, and provide the decoded picture data (or reconstructed picture data) 31 (further descriptions are provided below based on FIG. 3A and FIG. 3B, or the like).

The post-processor 32 is configured to post-process the decoded picture data 31 (or reconstructed picture data), for example, a decoded picture, to obtain post-processed picture data 33, for example, a post-processed picture. Post-processing performed by the post-processing unit 32 may include, for example, color format conversion (for example, from YCbCr to RGB), color grading, trimming, or re-sampling, or any other processing for generating the decoded picture data 31 for display by the display device 34, or the like.

The display device 34 is configured to receive the post-processed picture data 33, to display the picture to a user or viewer, or the like. The display device 34 may be or may include any type of display for representing a reconstructed picture, for example, an integrated or external display or monitor. For example, the display may include a liquid crystal display (LCD), an organic light-emitting diode (LED) (OLED) display, a plasma display, a projector, a micro LED display, a liquid crystal on silicon (LCoS), a digital light processor (DLP), or any type of another display.

The destination device 14 may further include a storage. The storage may be configured to store at least one type of the following data: the encoded picture data 21, the decoded picture data 31, and the post-processed picture data 33.

The decoding system 10 further includes a training engine 25. The training engine 25 is configured to train the encoder 20, to process an input picture, a picture region, or a picture block, to obtain a feature map of the input picture, the picture region, or the picture block, obtain an estimated probability distribution of the feature map, and encode the feature map based on the estimated probability distribution.

The training engine 25 is further configured to train the decoder 30, to obtain an estimated probability distribution of a bitstream, decode the bitstream based on the estimated probability distribution to obtain a feature map, and reconstruct the feature map to obtain a reconstructed picture.

Although FIG. 1 shows the source device 12 and the destination device 14 as separate devices, device embodiments may alternatively include both the source device 12 and the destination device 14, or include functions of both the source device 12 and the destination device 14, in other words, include both the source device 12 or a corresponding function and the destination device 14 or a corresponding function. In such embodiments, the source device 12 or corresponding function and the destination device 14 or the corresponding function may be implemented by using same hardware and/or software or by separate hardware and/or software or any combination thereof.

Based on the descriptions, existence of and (exact) division into different units or functions of the source device 12 and/or destination device 14 shown in FIG. 1 may vary based on an actual device and application. This is obvious for a skilled person.

In recent years, applying deep learning to the video encoding and decoding field gradually becomes a trend. Deep learning is to perform multi-layer learning at different abstract levels based on a machine learning algorithm. Deep learning-based video encoding and decoding may also be referred to as AI-based video encoding and decoding or neural network-based video encoding and decoding. Because embodiments of this disclosure relate to application of a neural network, for ease of understanding, the following first explains and describes some nouns or terms used in embodiments of this disclosure.

(1) Neural Network (NN):

A neural network is a machine learning model. The neural network may include a neural unit. The neural unit may be an operation unit for which $x_s$ and an intercept of 1 are used as an input. An output of the operation unit may be as follows:

$$h_{W,b}(x) = f(W^T x) = f\left(\sum_{s=1}^{n} W_s x_s + b\right) \qquad (1\text{-}1)$$

Herein, $s=1, 2, \ldots,$ or n, n is a natural number greater than 1, $W_s$ is a weight of $x_s$, b is a bias of the neural unit, and f is an activation function of the neural unit, and is used to introduce a nonlinear feature into the neural network, to convert an input signal in the neural unit into an output signal. The output signal of the activation function may serve as an input of a next convolutional layer. The activation function may be a sigmoid function. The neural network is a network formed by connecting many single neural units together. In an example, an output of one neural unit may be an input of another neural unit. An input of each neural unit may be connected to a local receptive field of a previous layer to extract a feature of the local receptive field. The local receptive field may be a region including several neural units.

(2) Deep Neural Network:

The deep neural network (DNN), also referred to as a multi-layer neural network, may be understood as a neural network including a plurality of hidden layers. There is no special metric standard for "many" herein. The DNN is divided based on locations of different layers, and a neural network in the DNN may be divided into three types: an input layer, a hidden layer, and an output layer. Usually, a first layer is the input layer, a last layer is the output layer, and a middle layer is the hidden layer. Layers are fully connected. In an example, any neuron at an $i^{th}$ layer is connected to any neuron at an $(i+1)^{th}$ layer. Although the DNN seems to be complex, the DNN is actually not complex in terms of work at each layer, and is simply expressed as the following linear relationship expression: $\vec{y} = \alpha(W\vec{x} + \vec{b})$. Herein, $\vec{x}$ is an input vector, $\vec{y}$ is an output vector, $\vec{b}$ is an offset vector, W is a weight matrix (or a coefficient), and $\alpha()$ is an activation function. At each layer, such a simple operation is performed on the input vector $\vec{x}$, to obtain the output vector $\vec{y}$. Because the DNN includes a large quantity of layers, there are also a large quantity of coefficients W and a large quantity of offset vectors $\vec{b}$. These parameters are defined in the DNN as follows. The coefficient W is used as an example. It is assumed that in a three-layer DNN, a linear coefficient from a $4^{th}$ neuron at a $2^{nd}$ layer to a $2^{nd}$ neuron at a $3^{rd}$ layer is defined as $$w_{24}^3.$$

A superscript 3 represents a number of a layer corresponding to the coefficient W, and a subscript corresponds to an output index 2 of the third layer and an input index 4 of the second layer. In conclusion, a coefficient from a $k^{th}$ neuron at an $(L-1)^{th}$ layer to a $j^{th}$ neuron at an $L^{th}$ layer is defined as $$W_{jk}^L.$$

It should be noted that there is no parameter W for the input layer. In the deep neural network, more hidden layers make the network more capable of describing a complex case in the real world. Theoretically, a model with more parameters has higher complexity and a larger "capacity", and means that the model can complete a more complex learning task. Training the deep neural network is a process of learning a weight matrix, and a final objective of training the deep neural network is to obtain a weight matrix of all layers of a trained deep neural network (a weight matrix including vectors W of a plurality of layers).

(3) Convolutional Neural Network (CNN):

The convolutional neural network is a deep learning architecture, and is a typical method in the picture processing and analysis field. The convolutional neural network includes at least a convolutional layer, and may further include another functional module such as an activation layer, a pooling layer, a batch normalization layer (BN), or a fully connected layer (FC). The activation layer may be a rectified linear unit (ReLU), a parametric rectified linear unit (PReLU), or the like. Typical convolutional neural networks include, for example, LeNet, AlexNet, a super-resolution test sequence network (VGGNet), a deep residual network (ResNet), You Only Look Once (Yolo), a faster Region with CNN feature (RCNN), a mask RCNN, and ASLFeat.

A basic convolutional neural network may include a backbone network and a head network, for example, AlexNet in object recognition. Some complex CNNs such as a faster RCNN with a feature pyramid structure in the target detection field include several partial networks: a backbone network, a neck network, and a head network.

The backbone network is a first part of the convolutional neural network, and a function of the backbone network is extracting feature maps of a plurality of scales from an input picture. The backbone network usually includes a convolutional layer, a pooling layer, an activation layer, and the like, and does not include a fully connected layer. Usually, in the backbone network, a feature map output by a layer close to the input picture has a large resolution (width and height), but has a small quantity of channels. Typical backbone networks include VGG-16, ResNet-50, ResNet-101, and the like. The backbone network may be subdivided into two parts: a front part of the backbone network and a core part of the backbone network. The front part of the backbone network, that is, several layers close to an input in the backbone network, is also referred to as a stem. The stem usually includes a small quantity of convolutional layers, and may further include a layer in another form such as a pooling layer. The stem preliminarily processes an input signal, to reduce a spatial resolution and increase a quantity of channels. For example, an input side in ResNet-50 is of a structure including a convolutional layer with a 7×7 convolution kernel and a maximum pooling layer (Max Pool). A part other than the front part of the backbone network is the core part of the backbone network. The core part of the backbone network usually includes a large quantity of convolutional layers and some network submodules that are connected in series and that have same or similar structures, for example, a residual block structure (Resblock) in the ResNet.

The neck network is a middle part of the convolutional neural network, and a function of the neck network is further integrating and processing a feature map generated by the backbone network, to obtain a new feature map. A common neck network includes, for example, a feature pyramid network (FPN).

The head network is a last part of the convolutional neural network, and a function of the head network is processing the feature map, to obtain a prediction result output by the neural network. Common head networks include a fully connected layer, a normalized exponential function (Softmax) module, and the like.

A bottleneck structure is a multi-layer network structure. Input data of a network first passes through one or more neural network layers to obtain intermediate data, and then the intermediate data passes through one or more neural network layers to obtain output data. A data amount (that is, a product of a width, a height, and a quantity of channels) of the intermediate data is less than an amount of the input data and an amount of the output data.

The feature map is three-dimensional data output by layers such as the convolutional layer, the activation layer, the pooling layer, and the batch normalization layer in the convolutional neural network, and three dimensions of the feature map are respectively referred to as a width, a height, and a channel. The feature map may be $M\times W\times H$, and it indicates that the feature map includes two-dimensional feature maps that are of M channels and whose resolutions are $W\times H$. Herein, W represents a width, and H represents a height. For example, when an original picture is in an RGB format, R represents red, G represents green, and B represents blue. The feature map may include three channels: R, G, and B. When the original picture is in a YUV format (for example, a YUV444 format), Y represents luminance, U represents chrominance, V represents hue, and V represents saturation. The feature map may include three channels: Y, U, and V.

The convolutional layer is a neuron layer that is in the convolutional neural network and at which convolution processing is performed on the input signal. The convolutional layer may include a plurality of convolution operators. The convolution operator is also referred to as a kernel. During picture processing, the convolution operator functions as a filter that extracts specific information from an input picture matrix. The convolution operator may essentially be a weight matrix, and the weight matrix is usually predefined. In a process of performing a convolution operation on the picture, the weight matrix usually processes pixels at one by one (or two by two, . . . , depending on a value of a stride stride) in a horizontal direction on the input picture, to extract a specific feature from the picture. A size of the weight matrix needs to be related to a size of the picture. It should be noted that a depth dimension of the weight matrix is the same as a depth dimension of the input picture. In a convolution operation process, the weight matrix extends to an entire depth of the input picture. Therefore, a convolutional output of a single depth dimension is generated through a convolution with a single weight matrix. However, in most cases, the single weight matrix is not used, but a plurality of weight matrices with a same size (row×column), namely, a plurality of same-type matrices, are applied. Outputs of all weight matrices are stacked to form a depth dimension of a convolutional picture. The dimension herein may be understood as being determined based on the foregoing "plurality of". Different weight matrices may be used to extract different features from the picture. For example, one weight matrix is used to extract edge information of the picture, another weight matrix is used to extract a specific color of the picture, and still another weight matrix is used to blur unnecessary noise in the picture. The plurality of weight matrices has a same size (row×column), and feature maps extracted from the plurality of weight matrices with a same size have a same size. Then, the plurality of extracted convolutional feature maps with a same size are combined to form an output of the convolution operation. Weight values in these weight matrices need to be obtained through massive training in an actual application. Each weight matrix including the weight values obtained through training may be used to extract information from the input picture, so that the convolutional neural network performs correct prediction. When the convolutional neural network includes a plurality of convolutional layers, an initial convolutional layer usually extracts a large quantity of general features. The general feature may also be referred to as a low-level feature. As a depth of the convolutional neural network increases, a more subsequent convolutional layer extracts a more complex feature, for example, a feature with high-level semantics. A feature with higher semantics is more applicable to a to-be-resolved problem.

Because a quantity of training parameters usually needs to be reduced, the pooling layer usually needs to be periodically introduced after the convolutional layer. One convolutional layer may be followed by one pooling layer, or a plurality of convolutional layers may be followed by one or more pooling layers. In a picture processing procedure, the pooling layer is only used to reduce a space size of the picture. The pooling layer may include an average pooling operator and/or a maximum pooling operator, to perform sampling on the input picture to obtain a picture with a small size. The average pooling operator may be used to calculate pixel values in the picture in a specific range, to generate an average value. The average value is used as an average pooling result. The maximum pooling operator may be used to select a pixel with a maximum value in the specific range as a maximum pooling result. In addition, similar to that the size of the weight matrix at the convolutional layer needs to be related to the size of the picture, an operator at the pooling layer also needs to be related to the size of the picture. A size of a picture output after processing at the pooling layer may be less than a size of a picture input into the pooling layer. Each pixel in the picture output from the pooling layer represents an average value or a maximum value of a corresponding sub-region of the picture input into the pooling layer.

After processing is performed at the convolutional layer/ pooling layer, the convolutional neural network still cannot output required output information. As described above, at the convolutional layer/pooling layer, only a feature is extracted, and parameters brought by the input picture are reduced. However, to generate final output information (required class information or other related information), the convolutional neural network needs to generate an output of a quantity of one or a group of required classes by using the neural network layer. Therefore, the neural network layer may include a plurality of hidden layers (for example, the activation layer, the BN layer, and/or the FC layer). Parameters included at the plurality of hidden layers may be obtained through pre-training based on related training data of a specific task type. For example, the task type may include picture recognition, picture classification, and super-resolution picture reconstruction.

Optionally, at the neural network layer, the plurality of hidden layers is followed by the output layer of the entire convolutional neural network. The output layer has a loss function similar to a categorical cross entropy, and the loss function is used to calculate a prediction error. Once forward propagation of the entire convolutional neural network is completed, back propagation is started to update a weight value and a deviation of each layer mentioned above, to reduce a loss of the convolutional neural network and an error between a result output by the convolutional neural network by using the output layer and an ideal result.

The neural network needs to determine a parameter of each layer of the neural network through training. In a training process, forward loss calculation and reverse gradient propagation are used to update a trainable parameter in the neural network. The parameter is updated for a plurality of times, so that the parameter of each layer of the neural network converges to better analysis precision. After training is completed, the parameter of each layer of the network is fixed, and the input signal passes through the neural network, to obtain a result. This process of actually using the neural network is referred to as "inference".

(4) Recurrent Neural Network:

The recurrent neural network (RNN) is used to process sequence data. A conventional neural network model starts from an input layer to a hidden layer and then to an output layer, and the layers are fully connected, while nodes at each layer are unconnected. Although this ordinary neural network resolves many problems, it is still incompetent to many problems. For example, if a word in a sentence is to be predicted, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. In an example, nodes at the hidden layer are no longer unconnected, and are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used, but there is a difference. If the RNN is expanded, a parameter such as W of the RNN is shared. This is different from the conventional neural network described in the foregoing example. In addition, during use of a gradient descent algorithm, output in each step not only depends on a network in a current step, but also depends on a network status in several previous steps. Such a learning algorithm is referred to as a back propagation through time (BPTT) algorithm.

(5) Loss Function:

In a process of training a deep neural network, because it is expected that an output of the deep neural network is as much as possible close to a predicted value that is actually expected, a current predicted value of the network and a target value that is actually expected may be compared, and then a weight vector of each layer of the neural network is updated based on a difference between the predicted value and the target value (certainly, there is usually an initialization process before a first time of update. In an example, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is close to the target value that is actually expected. Therefore, "how to obtain the difference between the predicted value and the target value through comparison" needs to be predefined. This is a loss function or an objective function. The loss function and the objective function are important equations for measuring the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm:

In a training process, the convolutional neural network may correct a value of a parameter in an initial super-resolution model based on an error back propagation (BP) algorithm, so that an error loss of reconstructing the super-resolution model becomes smaller. In an example, an input signal is transferred forward until the error loss is generated in an output, and the parameter in the initial super-resolution model is updated through back propagation of information about the error loss, to converge the error loss. The back propagation algorithm is an error-loss-centered back propagation motion, and aims to obtain a parameter, for example, a weight matrix, of an optimal super-resolution model.

(7) Generative Adversarial Network:

A generative adversarial network (GAN) is a deep learning model. The model includes at least two modules. One module is a generative model, and the other module is a discriminative model. The two modules are learned through gaming with each other, to generate a better output. Both the generative model and the discriminative model may be neural networks, and may be deep neural networks or convolutional neural networks. A basic principle of the GAN is as follows. A GAN for generating an image is used as an example. It is assumed that there are two networks: G (Generator) and D (Discriminator). G is a network for generating an image. G receives random noise z, and generates an image based on the noise, where the picture is denoted as G(z). D is a discriminative network and used to determine whether an image is "real". An input parameter of D is x, x represents an image, and an output D(x) represents a probability that x is a real image. If a value of D(x) is 1, it indicates that the picture is 100% real. If the value of D(x) is 0, it indicates that the image cannot be real. In a process of training the generative adversarial network, an objective of the generative network G is to generate an image that is as real as possible to deceive the discriminative network D, and an objective of the discriminative network D is to distinguish between the image generated by G and a real image as much as possible. In this way, a dynamic "gaming" process, in an example, "adversary" in the "generative adversarial network", exists between G and D. A final gaming result is that in an ideal state, G may generate an image G(z) that is to be difficultly distinguished from a real image, and it is difficult for D to determine whether the image generated by G is real, in an example, D(G(z))=0.5. In this way, an excellent generative model G is obtained, and can be used to generate an image.

Figure 2:
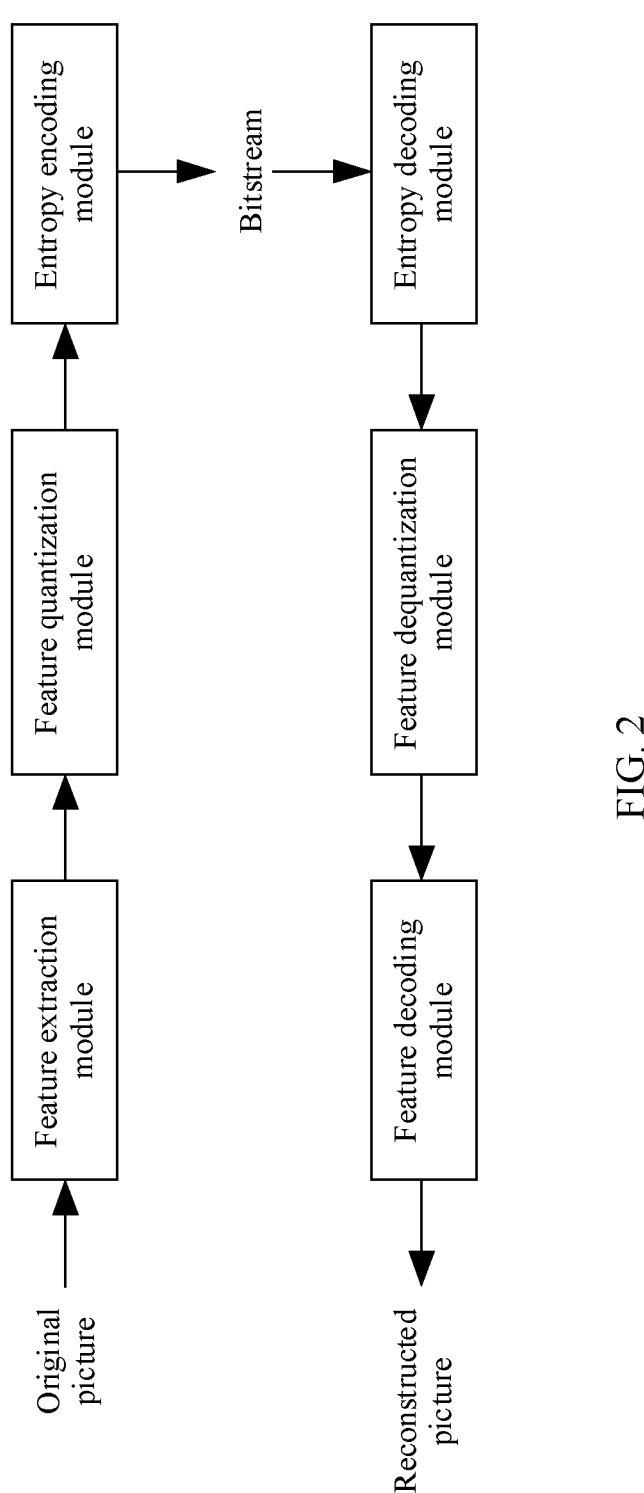
FIG. 2 is a schematic diagram of a deep learning-based video encoding and decoding network according to an embodiment of this disclosure.

FIG. 2 is a schematic diagram of a deep learning-based video encoding and decoding network according to an embodiment of this disclosure. In FIG. 2, entropy encoding and decoding are used as an example for description. The network includes a feature extraction module, a feature quantization module, an entropy encoding module, an entropy decoding module, a feature dequantization module, and a feature decoding (or picture reconstruction) module.

On an encoder side, an original picture is input into the feature extraction module, and the feature extraction module outputs an extracted feature map of the original picture by stacking a plurality of layers of convolution and in combination with a nonlinear mapping activation function. The feature quantization module quantizes feature values of floating point numbers in the feature map, to obtain a quantized feature map. Entropy encoding is performed on the quantized feature map, to obtain a bitstream.

On a decoder side, the entropy decoding module parses the bitstream, to obtain the quantized feature map. The feature dequantization module dequantizes a feature value that is an integer in the quantized feature map, to obtain a dequantized feature map. After the dequantized feature map is reconstructed by the feature decoding module, a reconstructed picture is obtained.

The network may not include the feature quantization module and the feature dequantization module. In this case, the network may directly perform a series of processing on the feature map whose feature map is a floating point number. Alternatively, integration processing may be performed on the network, so that all feature values in the feature map output by the feature extraction module are integers.

Figure 3A:
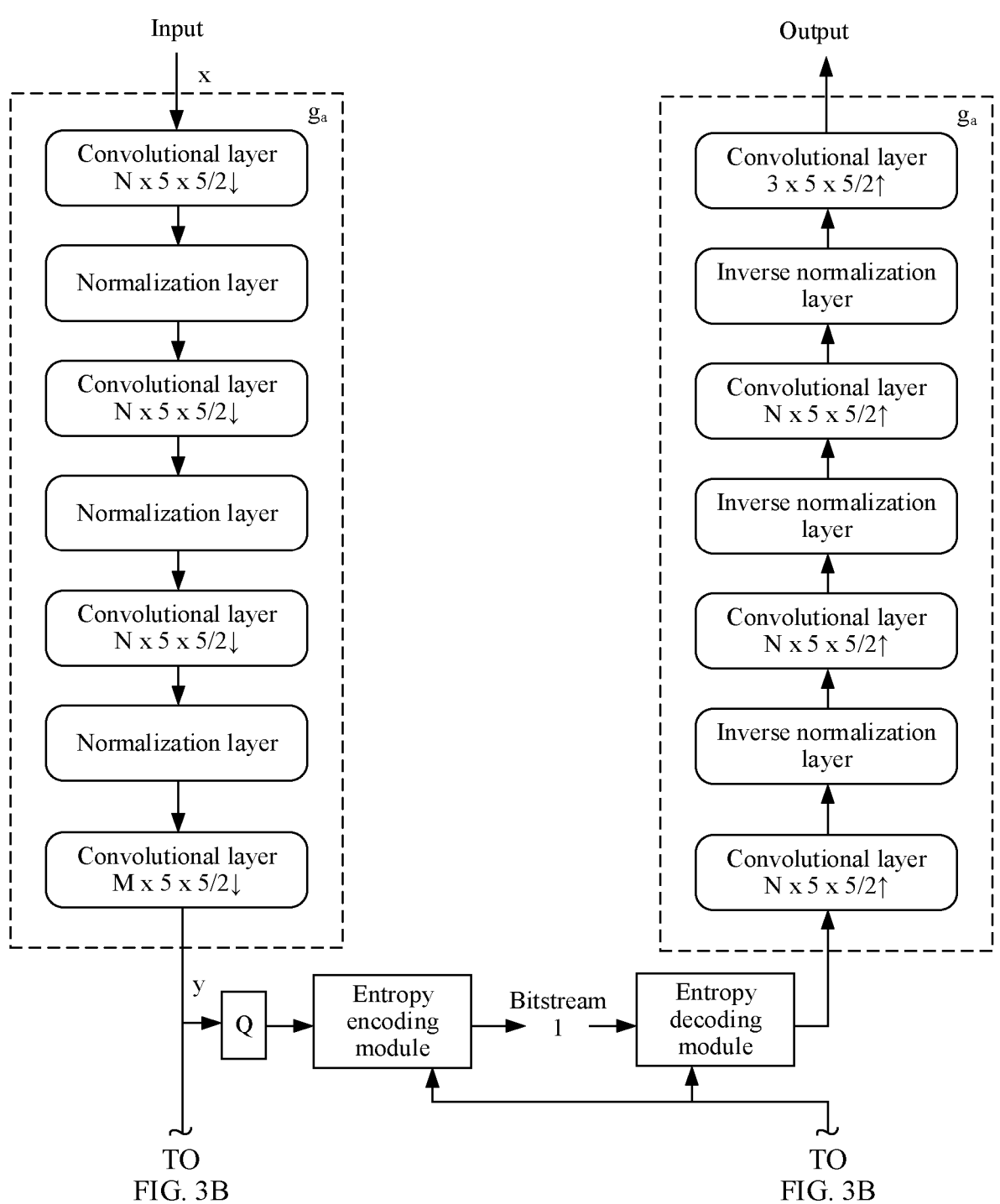
FIG. 3A and FIG. 3B are a schematic diagram of a deep learning-based end-to-end video encoding and decoding network structure according to an embodiment of this disclosure.
Figure 3B:
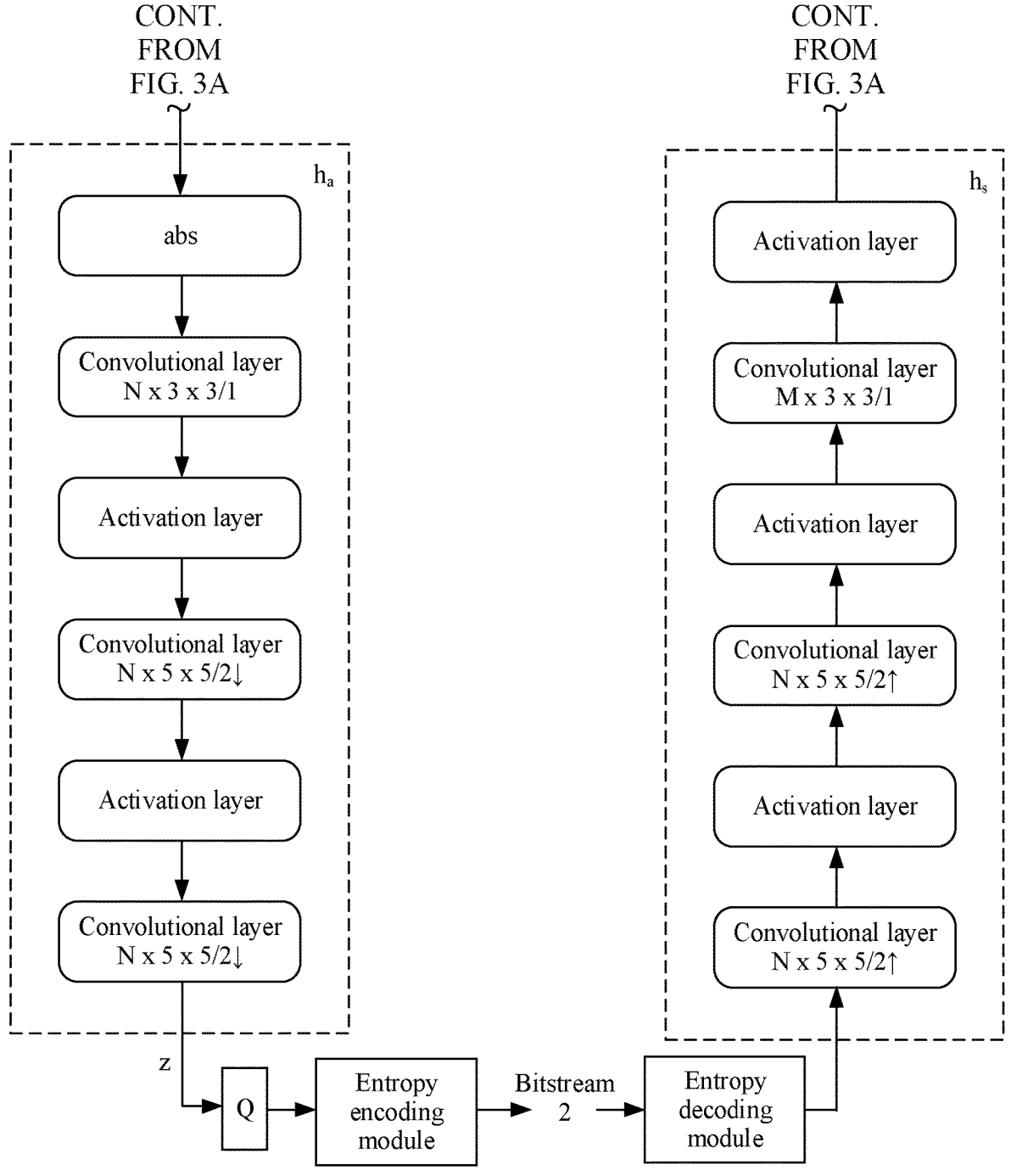

FIG. 3A and FIG. 3B are a schematic diagram of a deep learning-based end-to-end video encoding and decoding network structure according to an embodiment of this disclosure. In FIG. 3A and FIG. 3B, entropy encoding and decoding are used as an example for description. A neural network includes a feature extraction module $g_a$, a quantization module Q, an edge information extraction module $h_a$, an entropy encoding module, an entropy decoding module, a probability estimation network $h_s$, and a reconstruction module $g_s$. Entropy encoding may be an automatic encoder (AE), and entropy decoding may be an automatic decoder (AD).

Herein, $g_a$ includes four convolutional layers and three normalization layers that are interleaved and concatenated, and the normalization layer may include a generalized divisive normalization (GDN) layer. In $g_a$, convolution kernels of the four convolutional layers are all 5×5, and strides are all 2. Quantities of output channels of a first convolutional layer to a third convolutional layer are N, and a quantity of output channels of a last convolutional layer is M. In this embodiment of this disclosure, the stride is used to control a resolution of a picture or a feature map that is input into the convolutional layer. When the stride is 1, the convolutional layer controls the resolution of an input picture or feature map to remain unchanged. When the stride is greater than 1, the convolutional layer performs upsampling or downsampling on the input picture or feature map by using the stride as a sampling rate. In $g_a$, each convolutional layer is configured to perform 2× downsampling on the resolution of the input picture or feature map. In addition, the quantity of output channels is used to control a quantity of channels of a picture or feature map output by the convolutional layer, and a quantity of channels of a feature map that is of an original picture and that is output by $g_a$ is M.

$h_a$ includes three convolutional layers, two activation layers, and one abs layer that are interleaved and concatenated. In $h_a$, a convolution kernel of a first convolutional layer is 3×3, a stride is 1, and the quantity of output channels is N. In $h_a$, convolution kernels of a second convolutional layer and a third convolutional layer are both 5×5, strides are both 2, and quantities of output channels are both N. $h_s$ includes three convolutional layers and three activation layers that are interleaved and concatenated. In $h_s$, convolution kernels of a first convolutional layer and a second convolutional layer are both 5×5, strides are both 2, and quantities of output channels are both N. In $h_s$, a convolution kernel of a third convolutional layer is 3×3, a stride is 1, and a quantity of output channels is M. $g_s$ includes four convolutional layers and three inverse normalization layers that are interleaved and concatenated. The inverse normalization layer may include an IGDN layer. In $g_a$, convolution kernels of four convolutional layers are all 5×5, strides are all 2, quantities of output channels of a first convolutional layer to a third convolutional layer are N, and a quantity of output channels of a last convolutional layer is 3.

On an encoder side, an original picture x is input into $g_a$, and $g_a$ outputs a feature map y of the original picture. The feature map y is input into Q, Q outputs a quantized feature map, and the quantized feature map is input into the entropy encoding module. In addition, the feature map y is input into $h_a$, and $h_a$ outputs edge information z. The edge information z is input into Q, and Q outputs quantized edge information. The quantized edge information passes through the entropy encoding module, to obtain a bitstream of the edge information, and then the bitstream passes through the entropy decoding module, to obtain decoded edge information. The decoded edge information is input into $h_s$, and $h_s$ outputs a probability distribution of each feature element in the quantized feature map, and inputs the probability distribution of each feature element into the entropy encoding module. The entropy encoding module performs entropy encoding on each input feature element based on the probability distribution of each feature element, to obtain a hyper prior bitstream.

The edge information z is feature information, and is represented as a three-dimensional feature map. A quantity of feature elements included in the edge information z is less than that of the feature map y. A quantity of channels of the feature map y and a quantity of channels of the quantized feature map are both M, and resolutions are both W×H. M is the same as the quantity of output channels of the last convolutional layer in $g_a$. W and H are related to a width and a height of the original picture and a stride of each convolutional layer in $g_a$. As shown in FIG. 3A and FIG. 3B, $g_a$ performs downsampling on the original picture at a rate of 2 for four times. Assuming that the resolution of the feature map y or the resolution of the quantized feature map is W×H, a resolution of the original picture is $2^4W×2^4H$.

On a decoder side, the entropy decoding module parses the bitstream of the edge information to obtain the edge information, and inputs the edge information into $h_s$, and $h_s$ outputs a probability distribution of each feature element in a to-be-decoded symbol. The probability distribution of each feature element is input into the entropy decoding module. The entropy decoding module performs entropy decoding on each feature element based on the probability distribution of each feature element, to obtain a decoded feature map, and inputs the decoded feature map into $g_s$, and $g_s$ output a reconstructed picture.

In addition, in a probability estimation network of some variational automatic encoders (VAE), an encoded or decoded feature element around a current feature element is further used, to estimate probability distribution of the current feature element more accurately.

It should be noted that, the network structures shown in FIG. 2 and FIG. 3A and FIG. 3B are merely examples for description. Modules included in the network and structures of the modules are not limited in embodiments of this disclosure.

In some operations of a digital video application, a thumbnail of an original picture needs to be displayed, to display a large quantity of pictures in a display interface. In a conventional technology, a received bitstream of the original picture is first decoded and reconstructed, to obtain the original picture. Then, a resolution of the original picture is reduced, to obtain the thumbnail of the original picture. In other words, in a process of obtaining the thumbnail, a picture having an original resolution needs to be first obtained through reconstruction, and complexity of the picture that has the original resolution and that is obtained through reconstruction is high. Consequently, a manner of obtaining the thumbnail of the original picture consumes a long period of time, and a speed at which the digital video application displays the thumbnail of the original picture is affected. For example, for an album application, thumbnails of a plurality of pictures need to be simultaneously displayed. Consequently, the display interface cannot be refreshed in a timely manner, and a display effect of the album application is affected.

Figure 4:
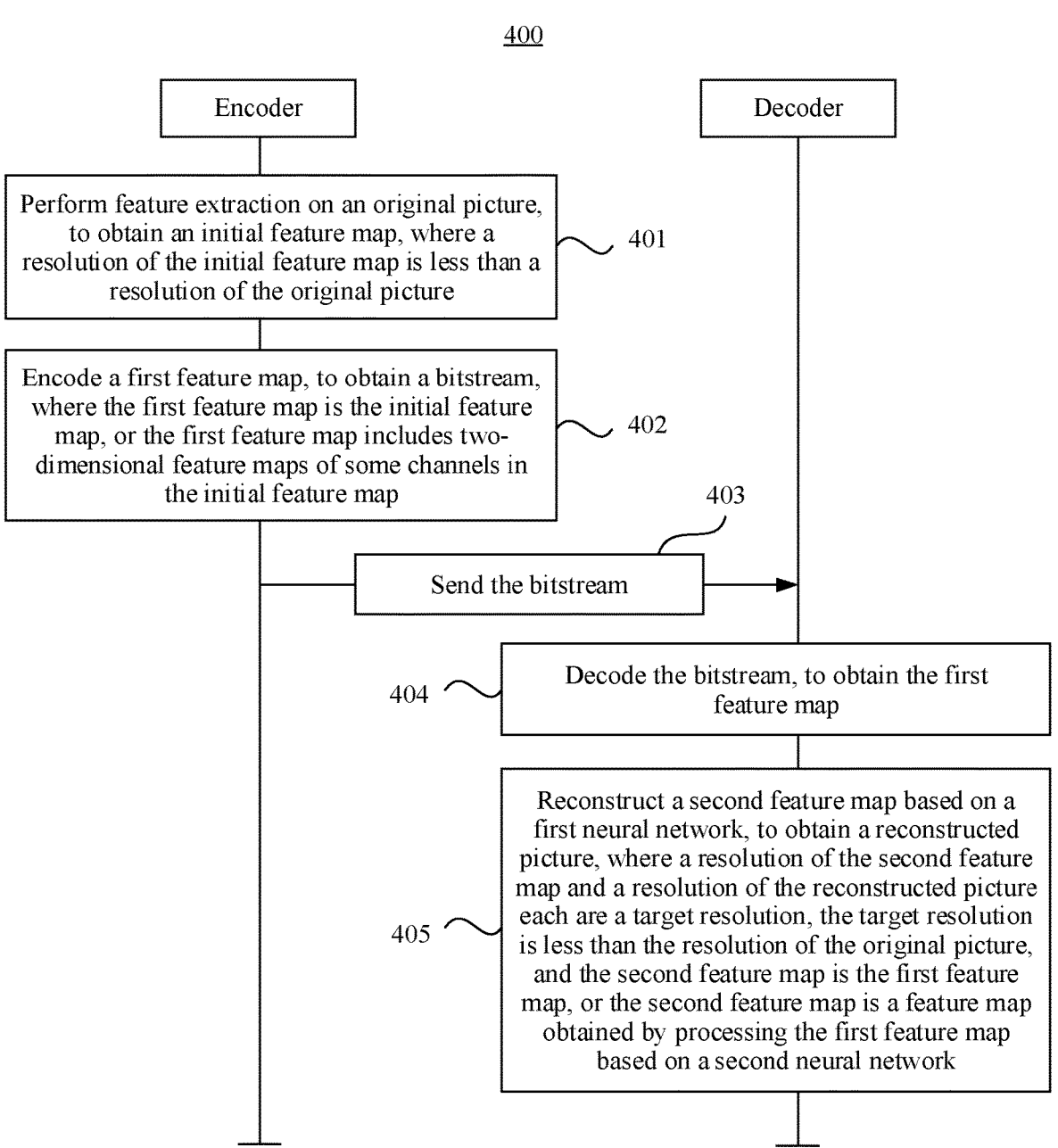
FIG. 4 is a schematic flowchart of a process of an encoding and decoding method according to an embodiment of this disclosure.

An embodiment of this disclosure provides an encoding and decoding method. FIG. 4 is a schematic flowchart of a process 400 of an encoding and decoding method according to an embodiment of this disclosure. The process 400 may be executed by an electronic device (including an encoder and a decoder). In an example, the process 400 may be executed by the electronic device by invoking a neural network model. The process 400 is described as a series of operations. It should be understood that the process 400 may be performed in various sequences and/or simultaneously, and is not limited to an execution sequence shown in FIG. 4. The process 400 may include the following procedures.

401: The encoder performs feature extraction on an original picture, to obtain an initial feature map, where a resolution of the initial feature map is lower than a resolution of the original picture.

The encoder may input the original picture into a feature extraction module in a deep learning-based network, and the feature extraction module outputs the extracted initial feature map by stacking a plurality of layers of convolution and in combination with a nonlinear mapping activation function.

Optionally, for the feature extraction module, refer to FIG. 2 and FIG. 3A and FIG. 3B. FIG. 3A and FIG. 3B are used as an example. The feature extraction module may include four convolutional layers and three normalization layers that are interleaved and concatenated. A size of a convolution kernel of each convolutional layer is 5×5, and a stride is 2. In an example, each convolutional layer performs 2× downsampling on a resolution of an input original picture or a feature map (2× downsampling is performed on each of a width and a height). A quantity of output channels of first three convolutional layers is N, and a quantity of output channels of a last convolutional layer is M.

It is assumed that the resolution of the original picture is W×H. After the original picture is input into the feature extraction module, a first convolutional layer performs 2× downsampling on the resolution of the original picture, and outputs a feature map whose quantity of channels is N and resolution is W/2×H/2. A second convolutional layer performs 2× downsampling on the resolution of the feature map output by the first convolutional layer, and outputs a feature map whose quantity of output channels is N and resolution is W/4×H/4. A third convolutional layer performs 2× downsampling on the resolution of the feature map output by the second convolutional layer, and outputs a feature map whose quantity of channels is N and resolution is W/8×H/8. A last convolutional layer performs 2× downsampling on the resolution of the feature map output by the third convolutional layer, and outputs an initial feature map whose quantity of channels is M and resolution is W/16×H/16. In other words, the initial feature map includes two-dimensional feature maps that are of M channels and whose resolutions are W/16×H/16.

It should be noted that, the feature extraction module shown in FIG. 3A and FIG. 3B is merely an example for description. A structure of the feature extraction module, a connection relationship between layers, a quantity of convolutional layers, and a stride, a convolution kernel, and a quantity of output channels of any convolutional layer, and the like are not limited in this embodiment of this disclosure. In addition, at least one of the following parameters of any two convolutional layers may be the same: a stride, a convolution kernel, and a quantity of output channels. For example, the convolution kernel of any convolutional layer may alternatively be 3×3, 7×7, 9×9, or the like, the stride may alternatively be 1, 1.5, 3, 3.2, 4, 5, or the like, and the quantity of output channels may be 1, 2, 5, 8, or the like. The feature extraction module may not include the normalization layer, or the feature extraction module may further include at least one activation layer, a pooling layer, and/or the like.

402: The encoder encodes a first feature map, to obtain a bitstream, where the first feature map is the initial feature map, or the first feature map includes two-dimensional feature maps of some channels in the initial feature map.

An initial feature map includes two-dimensional feature maps of a plurality of channels. When the first feature map includes the two-dimensional feature maps of some channels in the initial feature map, the encoder does not need to encode two-dimensional feature maps of all channels in the initial feature map. In this way, a data amount of a subsequently encoded bitstream can be reduced, and communication overheads of transmitting the bitstream to a decoder side can be reduced.

For example, it is assumed that the initial feature map includes two-dimensional feature maps of M channels, and the first feature map may include two-dimensional feature maps of M1 channels, where M1≤M. When M1<M, the first feature map may include two-dimensional feature maps of any M1 channels in the M channels, or may include two-dimensional feature maps of first M1 channels or last M1 channels in the M channels. This is not limited in this embodiment of this disclosure.

The first feature map includes a plurality of feature elements, and the encoder encodes each feature element to obtain a bitstream. Optionally, the first feature map may be encoded based on a probability distribution model, or the first feature map may be encoded in a hyper prior entropy encoding manner.

In an implementation, the first feature map is encoded based on the probability distribution model. Modeling is first performed based on the probability distribution model, and then context information of a to-be-encoded feature element is obtained. A probability distribution of the to-be-encoded feature element is obtained based on the context information, and then the to-be-encoded feature element is encoded based on the probability distribution of the to-be-encoded feature element. The bitstream is obtained by performing the foregoing procedures on each feature element in the first feature map. The context information may include an encoded feature element adjacent to the to-be-encoded feature element in the first feature map.

The probability distribution model includes at least one of the following: a Gaussian single model (GSM), an asymmetric Gaussian model, a Gaussian mixture model (GMM), and a Laplacian distribution model.

The encoder may invoke the neural network model to encode the first feature map based on the probability distribution model. For example, the context information may be input into a probability estimation network, and the probability estimation network outputs a model parameter of the to-be-encoded feature element. The model parameter is input into the probability distribution model, and the probability distribution model outputs the probability distribution of the to-be-encoded feature element. The probability estimation network may include a deep learning-based neural network, for example, an RNN or a CNN.

In a second implementation, the first feature map is encoded by using the hyper prior entropy encoding scheme. Edge information is first extracted from the first feature map, quantization processing is performed on the extracted edge information, and then entropy encoding and entropy decoding are sequentially performed on quantized edge information, to obtain decoded edge information. The probability distribution of the to-be-encoded feature element is obtained based on the decoded edge information, and then entropy encoding is performed on the to-be-encoded feature element based on the probability distribution of the to-be-encoded feature element. The bitstream is obtained by performing the foregoing procedures on each feature element in the first feature map.

The encoder may invoke a neural network model to encode the first feature map by using the hyper prior entropy encoding scheme. Optionally, the first feature map may be input into an edge information extraction module, and the edge information extraction module outputs the edge information. The edge information is input into a probability estimation network, and the probability estimation network outputs the model parameter of the to-be-encoded feature element. For the edge information extraction module and the probability estimation network, refer to the descriptions corresponding to FIG. 3A and FIG. 3B. Details are not described again herein in this embodiment of this disclosure.

Before the first feature map is encoded, quantization processing may be first performed on the first feature map, to obtain a quantized first feature map. Then, the quantized first feature map is encoded, to obtain the bitstream. As shown in FIG. 2 or FIG. 3A and FIG. 3B, quantization processing may be performed on the first feature map by using a quantization module.

For example, a quantization processing procedure includes quantizing each feature element (or a feature value) in the first feature map, and performing integer processing on a feature element that is a floating point number, to obtain a feature element that is an integer. Optionally, the feature element that is a floating point number may be rounded off, to obtain the feature element that is an integer, or the feature element that is a floating point number is truncated, to obtain the feature element that is an integer, or the feature element that is an integer is obtained based on a preset quantization stride. The quantization processing procedure is not limited in this embodiment of this disclosure.

403: The encoder sends the bitstream to the decoder.

As described in the foregoing embodiment, the encoder and the decoder have communication interfaces between which a communication connection is established, and the encoder may send the bitstream to a communication interface of the decoder through a communication interface.

404: The decoder decodes the bitstream, to obtain the first feature map.

The bitstream corresponds to the first feature map. In an example, the bitstream corresponds to the two-dimensional feature maps that are of a plurality of channels and that are included in the first feature map. The decoder may decode a bitstream corresponding to each feature element included in the plurality of channels, to obtain the first feature map.

A decoding process corresponds to an encoding process. Corresponding to the foregoing probability distribution model-based encoding manner, the decoder obtains context information of a bitstream corresponding to a to-be-decoded feature element, obtains, based on the context information, a probability distribution of the bitstream corresponding to the to-be-decoded feature element, and then decodes, based on the probability distribution, the bitstream corresponding to the to-be-decoded feature element. The first feature map is obtained by performing the foregoing procedures on a bitstream corresponding to each feature element in the plurality of channels.

When the encoder invokes the neural network model to encode the first feature map based on the probability distribution model, the decoder may also invoke the neural network model to decode the bitstream. For example, the context information of the bitstream corresponding to the to-be-decoded feature element may be input into a probability estimation network the same as that on an encoder side, and the probability estimation network outputs a model parameter of the bitstream corresponding to the to-be-decoded feature element. The model parameter is input into a probability distribution model the same as that on the encoder side, and the probability distribution model outputs the probability distribution of the bitstream corresponding to the to-be-decoded feature element. For both the probability distribution model and the probability estimation network, refer to the process 402. Details are not described herein in this embodiment of this disclosure.

Corresponding to the foregoing hyper prior entropy encoding scheme, the decoder first performs entropy decoding on a bitstream of the edge information to obtain the edge information, obtains, based on the edge information obtained through entropy decoding, the probability distribution of the bitstream corresponding to the to-be-decoded feature element, and then performs, based on the probability distribution, entropy decoding on the bitstream corresponding to the to-be-decoded feature element. The first feature map is obtained by performing the foregoing procedures on a bitstream corresponding to each feature element in the plurality of channels.

When the encoder invokes the neural network model to perform entropy encoding on the first feature map by using the hyper prior entropy encoding scheme, the decoder may also invoke the neural network model to perform entropy decoding on the bitstream. For example, the edge information obtained through entropy decoding may be input into the probability estimation network the same as that on the encoder side, and the probability estimation network outputs the probability distribution of the bitstream corresponding to the to-be-decoded feature element. For the probability estimation network, refer to the process 402. Details are not described herein in this embodiment of this disclosure.

405: The decoder reconstructs a second feature map based on a first neural network, to obtain a reconstructed picture, where a resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

The resolution of the reconstructed picture output by the first neural network and the resolution of the input second feature map are the same, and each are a target resolution. When the second feature map is the first feature map, the target resolution is equal to the resolution of the first feature map. When the second feature map is a feature map obtained by processing the first feature map based on the second neural network, the target resolution is greater than the resolution of the first feature map.

Optionally, the first neural network may include at least one convolutional layer, and a convolution stride of the at least one convolutional layer is 1. The first neural network is used to convert a quantity of channels of an input feature map, and there may be one or more first neural networks. When there is a plurality of first neural networks, structures of any two first neural networks may be the same or different. This is not limited in this embodiment of this disclosure.

The second neural network is configured to process the first feature map, to obtain the second feature map. The processing may include a convolution operation and/or a deconvolution operation. Further, the processing may further include a normalization operation. Optionally, the second neural network may include one or more output nodes and a plurality of convolutional layers, the output node is located between an output end of a first convolutional layer and an input end of a last convolutional layer, and the output node is connected to an input end of the first neural network. The convolutional layer is configured to perform a convolution operation and/or a deconvolution operation on the input feature map. The first neural network may further include at least one normalization layer, and the normalization layer is configured to perform a normalization operation on the input feature map.

As described in the process 401, the feature extraction module on the encoder side is configured to perform feature extraction on the original picture to obtain the initial feature map. When the first feature map is the initial feature map, the second neural network can reconstruct the first feature map to obtain a reconstructed picture having an original resolution. Therefore, a structure of the second neural network corresponds to a structure of the feature extraction module on the encoder side. A total upsampling rate of a convolutional layer included in the second neural network for the first feature map is the same as a total downsampling rate of a convolutional layer included in the feature extraction module shown in FIG. 3A and FIG. 3B for the original picture. In other words, a total multiple by which the convolutional layer included in the second neural network increases the resolution of the first feature map is the same as a total multiple by which the convolutional layer included in the feature extraction module shown in FIG. 3A and FIG. 3B reduces the resolution of the original picture. In addition, a quantity of output channels of a last convolutional layer of the second neural network is the same as an actual quantity of channels of the original picture. In this way, the second neural network can obtain, through reconstruction, the reconstructed picture having the original resolution.

When there is one first neural network, in an example, the second neural network does not need to be applied, and the first neural network may exist independently. In this case, the second feature map is the first feature map, the first neural network can output only a reconstructed picture having one resolution, and the resolution is the resolution of the first feature map.

In another example, the first neural network may be connected to an input end of the second neural network and/or connected to one or more output nodes. In this case, the second feature map is the first feature map or a feature map obtained by processing the first feature map based on the second neural network, and the first neural network can output reconstructed pictures having one or more resolutions.

When there is a plurality of first neural networks, the input end of the second neural network and/or each output node are/is connected to the first neural network. In this case, the second feature map is the first feature map or a feature map obtained by processing the first feature map based on the second neural network, and the first neural network can output reconstructed pictures having a plurality of resolutions.

The second neural network is used to process the first feature map to obtain the second feature map, and the second feature map is output by the output node and input into the first neural network connected to the output node.

The following provides descriptions by using an example in which there is one or more first neural networks, there are a plurality of output nodes, and the input end of the second neural network and each output node each are connected to an input end of one first neural network.

Each output node corresponds to one output resolution, and the resolution of the reconstructed picture output by the first neural network may include an output resolution corresponding to each output node and a resolution of the first feature map. For ease of description, all resolutions of reconstructed pictures that can be output by the first neural network are referred to as candidate resolutions below. The decoder may first determine the target resolution. When the target resolution is equal to the resolution of the first feature map, the decoder may directly input the first feature map into the first neural network connected to the input end of the second neural network, to obtain the reconstructed picture output by the first neural network. When the target resolution is unequal to the resolution of the first feature map, the decoder may determine that an output node whose output resolution is the target resolution is the target input node. Then, the first feature map is input into the second neural network, to obtain a second feature map output by a target output node of the second neural network, and the second feature map output by the target output node is input into the first neural network, to obtain the reconstructed picture output by the first neural network.

When there is one first neural network, the second feature map output by the target output node is directly input into the network, to obtain a reconstructed picture output by the neural network. When there is a plurality of first neural networks, the second feature map is input into a first neural network connected to the target output node, to obtain a reconstructed picture output by the first neural network connected to the target output node.

The target resolution may be determined by the decoder, or may be determined by an outside of the decoder, for example, determined by an external application layer of the decoder or an encoder. For the external application layer, refer to the digital video application, for example, a video player, an album, or a web page.

When the target resolution is determined by the decoder, in an example, the decoder may determine the target resolution based on a resolution of a thumbnail. For example, with reference to this embodiment of this disclosure, the decoder may determine that a resolution closest to the resolution of the thumbnail in the candidate resolutions is the target resolution. The resolution of the thumbnail is a resolution of a thumbnail that is finally displayed at the external application layer of the decoder, and may be the same as or different from the target resolution.

Optionally, the resolution of the thumbnail may be indicated by the external application layer or the encoder. The external application layer or the encoder may send, to the decoder, an identifier indicating the resolution of the thumbnail. When the encoder sends, to the decoder, the identifier indicating the resolution of the thumbnail, the identifier of the resolution of the thumbnail may be separately sent or carried in the bitstream. A manner in which the decoder determines the resolution of the thumbnail is not limited in this embodiment of this disclosure.

In another example, the decoder may determine the target resolution based on complexity and/or a power consumption constraint of a process of obtaining a reconstructed picture having each candidate resolution. For example, the decoder may determine that a candidate resolution corresponding to a reconstructed picture obtaining process with minimum complexity is the target resolution, or determine that a candidate resolution corresponding to a reconstructed picture obtaining process with complexity closest to maximum complexity that can be assumed by the external application layer is the target resolution.

When the target resolution is determined by an outside of the decoder, in an example, the target resolution is determined by the external application layer and sent to the decoder. The external application layer may send, to the decoder, an identifier indicating the target resolution, and the decoder determines the target resolution based on the identifier of the target resolution. The external application layer may determine the target resolution based on the candidate resolution and the resolution of the thumbnail, or may determine the target resolution based on the complexity and/or the power consumption constraint of the process of obtaining the reconstructed picture having each candidate resolution. The candidate resolution may be located in the bitstream sent by the decoder by using supplemental enhancement information (SEI), or may be located at the application layer in a file format, so that the external application layer obtains the candidate resolution. For a process of determining the target resolution, refer to the foregoing process in which the decoder determines the target resolution. Details are not described herein in this embodiment of this disclosure.

In another example, the target resolution is determined by the encoder and sent to the decoder. The encoder may send, to the decoder, an identifier indicating the target resolution, and the decoder determines the target resolution based on the identifier of the target resolution. The identifier of the target resolution may be separately sent or carried in the bitstream. For a process of determining the target resolution, refer to the foregoing process in which the decoder determines the target resolution. Details are not described herein in this embodiment of this disclosure.

Figure 5:
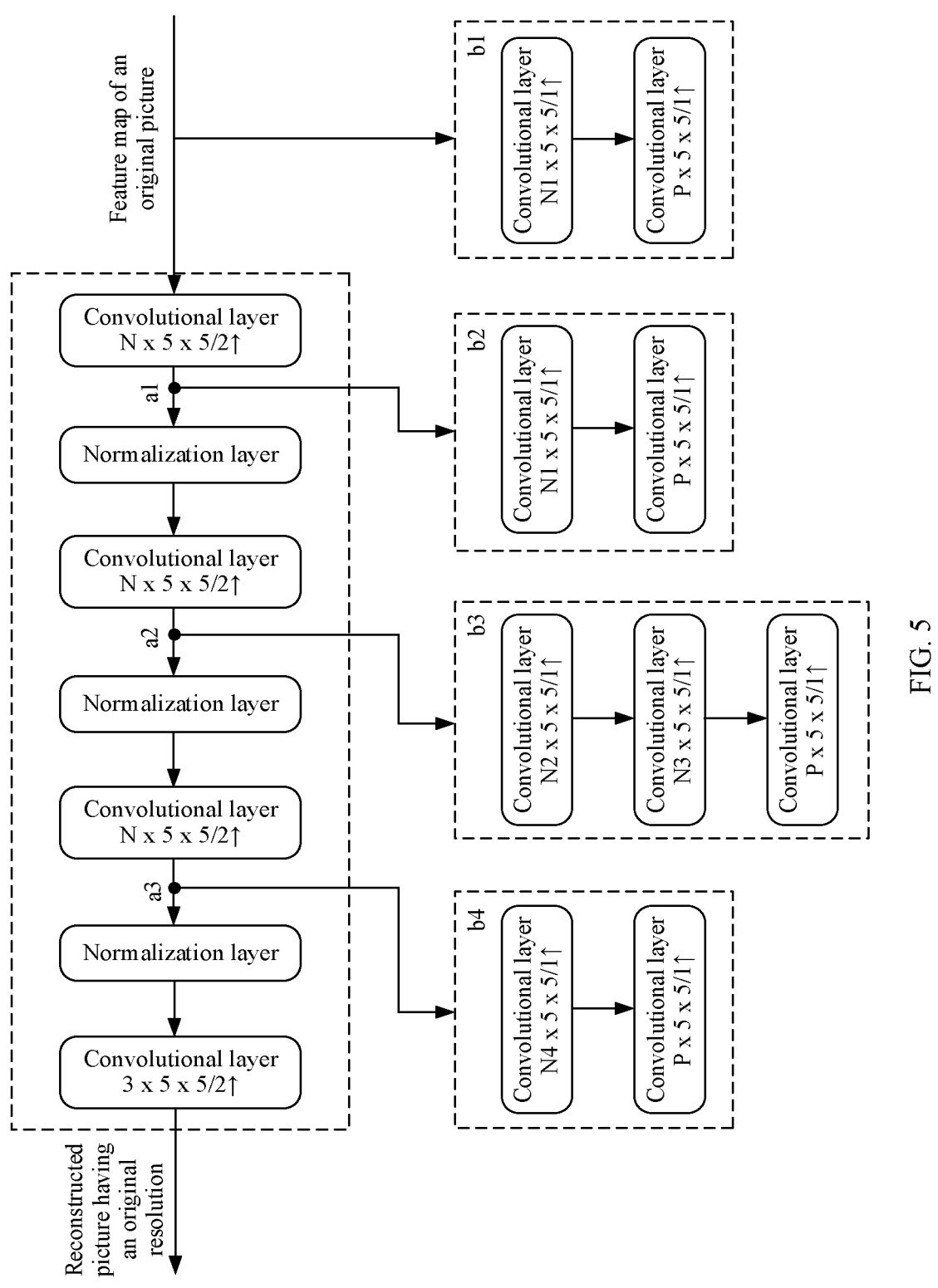
FIG. 5 is a schematic diagram of a structure of a first neural network and a structure of a second neural network according to an embodiment of this disclosure.

For example, FIG. 5 is a schematic diagram of a structure of a first neural network and a structure of a second neural network according to an embodiment of this disclosure. In FIG. 5, descriptions are provided by using an example in which there are a plurality of first neural networks. The structure of the second neural network in FIG. 5 may correspond to a structure of the feature extraction module shown in FIG. 3A and FIG. 3B. As shown in FIG. 5, the second neural network includes four convolutional layers and three normalization layers that are interleaved and concatenated. A size of a convolution kernel of each convolutional layer is the same as a size of a convolution kernel of the convolutional layer in the feature extraction module shown in FIG. 3A and FIG. 3B, and is 5×5, and a stride is 2. In an example, each convolutional layer performs 2× upsampling on a resolution of the input feature map (2× upsampling is performed on each of a width and a height). A quantity of output channels of first three convolutional layers is N, and a quantity of output channels of a last convolutional layer is 3. The second neural network includes three output nodes a1 to a3, a1 is located at an output end of a first convolutional layer, a2 is located at an output end of a second convolutional layer, and a3 is located at an output end of a third convolutional layer.

FIG. 5 shows four first neural networks b1 to b4. An input end of b1 is connected to the input end of the second neural network, an input end of b2 is connected to a1, an input end of b3 is connected to a2, and an input end of b4 is connected to a3.

In FIG. 5, descriptions are provided by using an example in which b1 and b2 have a same structure, and b1, b3, and b4 have different structures. b1 and b2 each include two convolutional layers, convolution kernels of the two convolutional layers each are 5×5, and strides of the two convolutional layers each are 1. A quantity of output channels of a first convolutional layer in the two convolutional layers is N1, and a quantity of output channels of a last convolutional layer is P. For example, P may be 1, 3, or the like. When P is 1, the output reconstructed picture is a grayscale picture. When P is 3, the output reconstructed picture is a three-channel color picture. N1>P. A larger value of N1 indicates that more feature elements are input into the last convolutional layer and more information can be provided for the last convolutional layer, so that the last convolutional layer can output a reconstructed picture with good quality. b3 includes three convolutional layers, convolution kernels of the three convolutional layers each are 5×5, and strides of the three convolutional layers each are 1. In b3, a quantity of output channels of a first convolutional layer is N2, a quantity of output channels of a second convolutional layer is N3, and a quantity of output channels of a third convolutional layer is P. b4 includes two convolutional layers, convolution kernels of the two convolutional layers each are 5×5, and strides of the two convolutional layers each are 1. In b4, a quantity of output channels of a first convolutional layer is N4, and a quantity of output channels of a second convolutional layer is P. It can be learned from the structure of the first neural network and the structure of the second neural network shown in FIG. 5 that resolutions of feature maps input at input ends of any two neural networks are different.

A resolution output by b1 in FIG. 5 is the resolution of the first feature map. A resolution output by b2 is a resolution of a feature map output by the first convolutional layer after the first feature map is input into the second neural network. A resolution output by b3 is a resolution of a feature map output by the second convolutional layer after the first feature map is input into the second neural network. A resolution output by b4 is a resolution of a feature map output by the third convolutional layer after the first feature map is input into the second neural network. Assuming that the resolution of the first feature map is W/16×H/16, output resolutions of b1 to b4 are respectively W/16×H/16, W/8× H/8, W/4×H/4, and W/2×H/2.

It is assumed that a quantity of channels of the first feature map is M1, and the resolution is W/16×H/16. When the determined target resolution is the resolution of the first feature map, the first feature map is directly input into b1, and the first convolutional layer of b1 keeps the resolution of the first feature map unchanged, and converts the quantity of channels of the first feature map, to output a feature map whose quantity of channels is N1 and resolution is W/16× H/16. The second convolutional layer of b1 keeps the resolution of the input feature map unchanged, and converts the quantity of channels of the input feature map, to output a feature map whose quantity of channels is P and resolution is W/16×H/16.

When the target output node determined based on the target resolution is a1, the first feature map is input into the second neural network, and a first convolutional layer of the second neural network performs 2× upsampling on the resolution of the first feature map, and outputs, from a1, a second feature map whose quantity of channels is N and resolution is W/8×H/8. The second feature map is input into b2 connected to a1, and the first convolutional layer and the second convolutional layer of b2 keep the resolution of the input feature map unchanged, and sequentially convert the quantity of channels of the input feature map, to finally output a reconstructed picture whose quantity of channels is P and resolution is W/8×H/8. For an output of each convolutional layer in b2, refer to b1. Details are not described herein in this embodiment of this disclosure.

When the target output node determined based on the target resolution is a2, the first feature map is input into the second neural network, and a first convolutional layer and a second convolutional layer of the second neural network sequentially perform 2× upsampling on the resolution of the first feature map, and output, from a2, a second feature map whose quantity of channels is N and resolution is W/4×H/4. The second feature map is input into b3 connected to a2, and the first convolutional layer to the third convolutional layer of b3 keep the resolution of the input feature map unchanged, and sequentially convert the quantity of the input feature map, to finally output a reconstructed picture whose quantity of channels is P and resolution is W/4×H/4. For an output of each convolutional layer in b3, refer to b1. Details are not described herein in this embodiment of this disclosure.

When the target output node determined based on the target resolution is a3, the first feature map is input into the second neural network, and a first convolutional layer to a third convolutional layer of the second neural network sequentially perform 2× upsampling on the resolution of the first feature map, and output a second feature map whose quantity of channels is N and resolution is W/2×H/2. The second feature map is input into b4 connected to a3, and the first convolutional layer and the second convolutional layer of b4 keep the resolution of the input feature map unchanged, and sequentially convert the quantity of the input feature map, to finally output a reconstructed picture whose quantity of channels is P and resolution is W/2×H/2.

It should be noted that, there may be one or more target resolutions. When there are a plurality of target resolutions and a plurality of output nodes are determined based on the plurality of target resolutions, the first feature map may be input into the second neural network, to obtain second feature maps that have a plurality of resolutions and that are output by a plurality of target output nodes of the second neural network. Then, a second feature map output by each target output node is input into a first neural network connected to the target output node, to obtain reconstructed pictures that have a plurality of resolutions and that are output by first neural networks respectively connected to the plurality of target output nodes.

The output nodes may output second feature maps in parallel or in serial. When the second feature maps are output in serial, the second feature maps output by the output nodes may be shared. As shown in FIG. 5, assuming that the determined target output nodes include a1, a2, and a3, the first feature map may be sequentially input into the first neural network for three times, so that a1, a2, and a3 output corresponding second feature maps in parallel based on the first feature map input from the input end of the first neural network. In this way, efficiency of obtaining the reconstructed picture can be improved.

Alternatively, the first feature map may be input into the first neural network for one time. After a1 outputs a second feature map based on the first feature map input from the input end of the first neural network, a2 outputs a second feature map based on the second feature map output by a1, and a3 may output, after a1 outputs the second feature map, a second feature map based on the second feature map output by a1, or may output, after a2 outputs the second feature map, a second feature map based on the second feature map output by a2. In this way, a quantity of calculation times of the second neural network can be reduced, and operation overheads of the second neural network are further reduced.

The structure of the first neural network, the structure of the second neural network, and a connection relationship between the first neural network and the second neural network in FIG. 5 are all examples for description. This is not limited in this embodiment of this disclosure. For example, based on FIG. 5, any neural network branch may further include one or more convolutional layers, and a plurality of convolutional layers may be the same or different.

Figure 6:
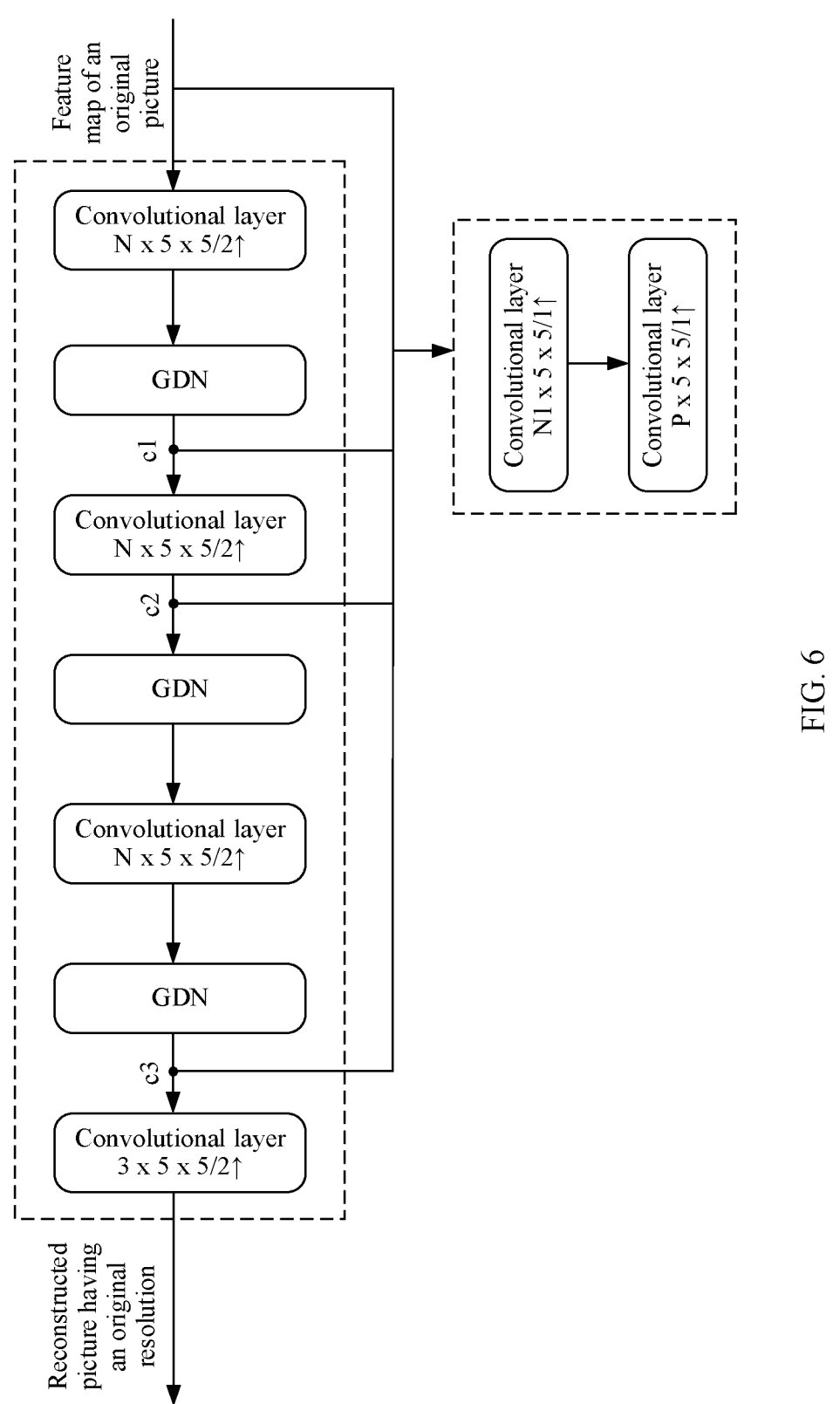
FIG. 6 is a schematic diagram of another structure of a first neural network and another structure of a second neural network according to an embodiment of this disclosure.

For example, FIG. 6 is a schematic diagram of another structure of a first neural network and another structure of a second neural network according to an embodiment of this disclosure. In FIG. 6, descriptions are provided by using an example in which there is one first neural network. The second neural network includes two convolutional layers, convolution kernels of the two convolutional layers each are 5×5, and strides of the two convolutional layers each are 1. For the structure of the second neural network, refer to FIG. 5 and the foregoing descriptions of the neural network branch. Details are not described herein in this embodiment of this disclosure. A quantity of output channels of the first convolutional layer in the two convolutional layers is N1, and a quantity of output channels of the last convolutional layer is P. For related descriptions of the first neural network, refer to the descriptions corresponding to FIG. 5. Details are not described herein in this embodiment of this disclosure.

As shown in FIG. 6, the second neural network includes three output nodes c1 to c3, c1 is located at an output end of a first normalization layer, c2 is located at an output end of a second convolutional layer, and c3 is located at an output end of a third normalization layer. c1 to c3 are all connected to the input end of the first neural network, and the input end of the second neural network is further connected to the input end of the first neural network.

Resolutions output by the first neural network in FIG. 6 include the resolution of the first feature map, a resolution of a feature map output by the first normalization layer after the first feature map is input into the second neural network, a resolution of a feature map output by the second convolutional layer after the first feature map is input into the second neural network, and a resolution of a feature map output by the third normalization layer after the first feature map is input into the second neural network. Assuming that the resolution of the first feature map is W/16×H/16, the resolutions output by the first neural network include W/16×H/16, W/8×H/8, W/4×H/4, and W/2×H/2.

It is assumed that a quantity of channels of the first feature map is M1 and a resolution is W/16×H/16. When the determined target resolution is the resolution of the first feature map, the first feature map is directly input into the first neural network, and a first convolutional layer and a second convolutional layer of the first neural network keep the resolution of the input feature map unchanged, and sequentially convert the quantity of the input feature map, to finally output a reconstructed picture whose quantity of channels is P and resolution is W/16×H/16.

When the target output node determined based on the target resolution is c1, the first feature map is input into the second neural network, and a first convolutional layer of the second neural network performs 2× upsampling on the resolution of the first feature map, and outputs, from c1, a second feature map whose quantity of channels is N and resolution is W/8×H/8. The second feature map is input into the first neural network, and the first neural network finally outputs a reconstructed picture whose quantity of channels is P and resolution is W/8×H/8. For a process in which the first neural network processes the input feature map, refer to the foregoing descriptions. Details are not described herein in this embodiment of this disclosure.

When a target output node determined based on the target resolution is c2, the first feature map is input into the second neural network, and a first convolutional layer and a second convolutional layer of the second neural network sequentially perform 2× upsampling on the resolution of the first feature map, and output, from c2, a second feature map whose quantity of channels is N and resolution is W/4×H/4. The second feature map is input into the first neural network, and the first neural network outputs a reconstructed picture whose quantity of channels is P and resolution is W/4×H/4. For a process in which the first neural network processes the input feature map, refer to the foregoing descriptions. Details are not described herein in this embodiment of this disclosure.

When a target output node determined based on the target resolution is c3, the first feature map is input into the second neural network, and a first convolutional layer to a third convolutional layer of the second neural network sequentially perform 2× upsampling on the resolution of the first feature map, and output, from c3, a second feature map whose quantity of channels is N and resolution is W/2×H/2. The second feature map is input into the first neural network, and the first neural network outputs a reconstructed picture whose quantity of channels is P and resolution is W/2×H/2. For a process in which the first neural network processes the input feature map, refer to the foregoing descriptions. Details are not described herein in this embodiment of this disclosure.

It should be noted that, the second neural network is an existing neural network in a network used for encoding and decoding in a conventional technology, and is used to generate a reconstructed picture having an original resolution. Output nodes are disposed at different locations of the second neural network, and reconstructed pictures having a plurality of target resolutions can be generated by using the output nodes and an existing second neural network. In this process, the second neural network is used to process the first feature map. In a process of generating reconstructed pictures having different target resolutions, all the output nodes share a layer in the second neural network. In this way, a size of a neural network (including the first neural network and the second neural network) used to generate the reconstructed picture can be reduced, and storage space that is of the decoder and that is occupied by the neural network used to generate the reconstructed picture is reduced, to reduce running overheads and running complexity of the neural network used to generate the reconstructed picture in the decoder.

Optionally, in this embodiment of this disclosure, before a feature map having the target resolution is reconstructed, channels of the first feature map and/or the second feature map may be further reduced, to reduce complexity of a subsequent reconstruction process and improve efficiency of the reconstruction process.

For example, the second feature map includes two-dimensional feature maps of a plurality of channels, and channel reduction processing may be performed on the second feature map. Then, a second feature map obtained through channel reduction processing is reconstructed, to obtain the reconstructed picture. Two-dimensional feature maps of some channels may be randomly extracted from the two-dimensional feature maps that are of the plurality of channels and that are included in the second feature map, or two-dimensional feature maps of first several channels in the plurality of channels may be extracted, or two-dimensional feature maps of last several channels in the plurality of channels may be extracted. A channel reduction processing manner is not limited in this embodiment of this disclosure.

Figure 7:
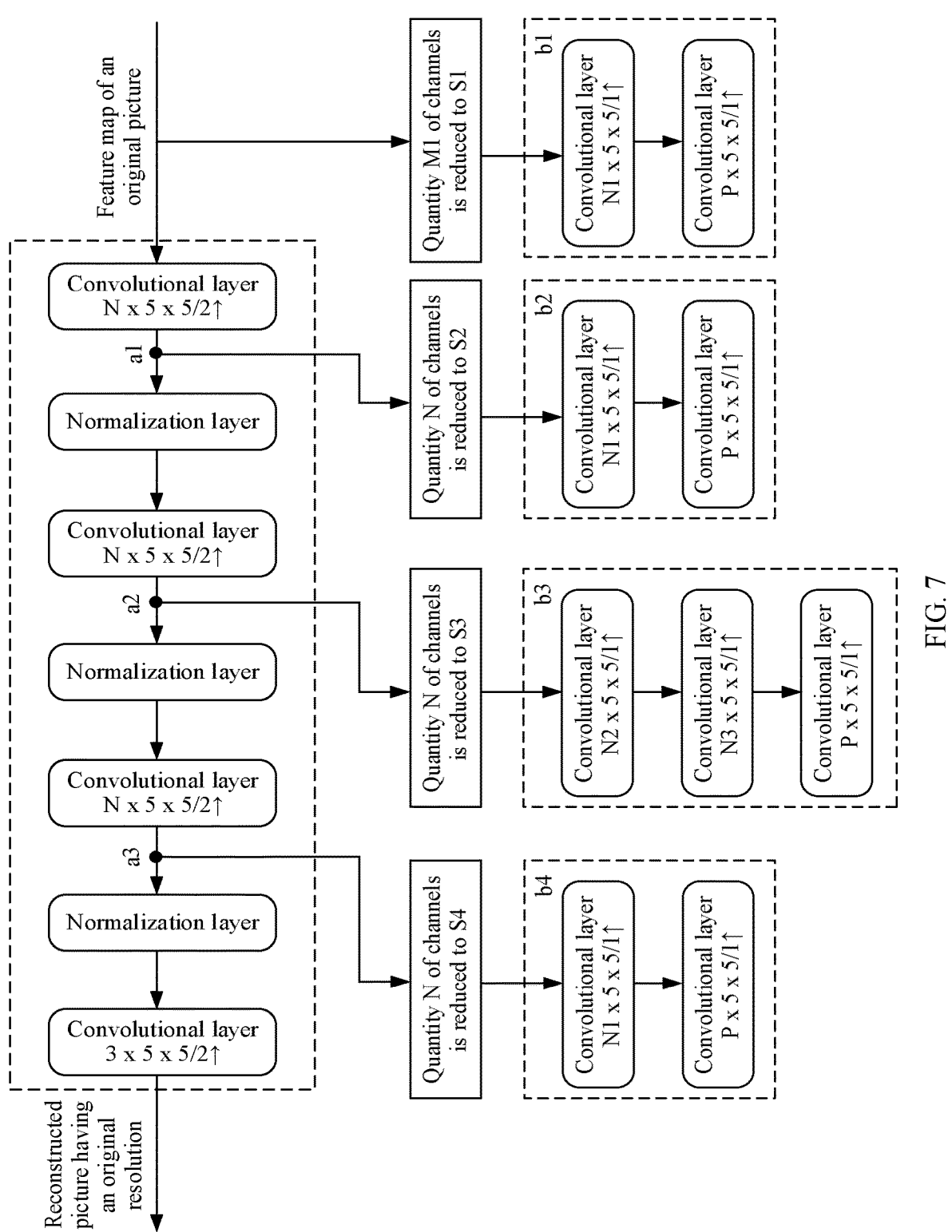
FIG. 7 is a schematic diagram of a channel reduction procedure according to an embodiment of this disclosure.

For example, FIG. 7 is a schematic diagram of a channel reduction procedure according to an embodiment of this disclosure. In FIG. 7, descriptions are provided by using an example in which channel reduction processing is performed based on the first neural network and the second neural network shown in FIG. 5. Channel reduction processing is performed on the second feature map in each first neural network. As shown in FIG. 7, a quantity of channels of the second feature map is reduced from M1 to S1 in b1, the quantity of channels of the second feature map is reduced from N to S2 in b2, the quantity of channels of the second feature map is reduced from N to S3 in b3, and the quantity of channels of the second feature map is reduced from N to S4 in b4. S1 is less than M1, and S2, S3, and S4 each are less than N. a1 is used as an example. Two-dimensional feature maps of S1 channels may be randomly extracted from the two-dimensional feature maps of the M1 channels, or two-dimensional feature maps of first S1 channels in the M1 channels may be extracted. The second feature map in b1 is the first feature map, and M1 represents the quantity of channels of the first feature map.

For another example, the first feature map includes two-dimensional feature maps of a plurality of channels, and channel reduction processing may be performed on the first feature map. The second feature map is a first feature map obtained through channel reduction processing, or the second feature map is a feature map obtained by processing, based on the second neural network, the first feature map obtained through channel reduction processing. As shown in FIG. 7, channel reduction processing may be performed on the first feature map before the first feature map is input into the second neural network or b1. For this process, refer to the foregoing example. Details are not described herein in this embodiment of this disclosure.

Further, in this embodiment of this disclosure, after the reconstructed picture is obtained, the reconstructed picture having the target resolution may be directly output and displayed at the external application layer. Alternatively, the target resolution and the resolution of the thumbnail may be compared, and further processing is performed based on a comparison result.

Optionally, when the target resolution is equal to the resolution of the thumbnail, the reconstructed picture having the target resolution is directly output and displayed. When the target resolution is unequal to the resolution of the thumbnail, a scaling-up/down operation is performed on the reconstructed picture, so that the target resolution is equal to the resolution of the thumbnail, and then a reconstructed picture obtained through the scaling-up/down operation is output and displayed. The scaling-up/down operation includes a downsampling operation and an upsampling operation. When the target resolution is lower than the resolution of the thumbnail, the upsampling operation may be performed on the reconstructed picture. When the target resolution is greater than the resolution of the thumbnail, the downsampling operation may be performed on the reconstructed picture. For example, the upsampling operation may include bilinear interpolation upsampling, or upsampling performed by directly filling a pixel value at a neighboring location, or upsampling performed by performing a deconvolution operation at a convolutional layer whose stride is greater than 1. The downsampling operation may include bilinear interpolation downsampling, downsampling performed by directly removing some pixel values, or downsampling implemented by performing a convolution operation at a convolutional layer whose stride is less than 1. An upsampling manner and a downsampling manner are not limited in this embodiment of this disclosure, provided that the resolution of the reconstructed picture can be increased or decreased from the target resolution to the resolution of the thumbnail.

Still optionally, when a difference between the target resolution and the resolution of the thumbnail is lower than a difference threshold, the reconstructed picture having the target resolution is directly output and displayed. When a difference between the target resolution and the resolution of the thumbnail is greater than a difference threshold, the scaling-up/down operation is performed on the reconstructed picture, so that the difference between the target resolution and the resolution of the thumbnail is lower than the difference threshold, and then a reconstructed picture obtained through the scaling-up/down operation is output and displayed. For the scaling-up/down operation, refer to the foregoing descriptions. Details are not described herein in this embodiment of this disclosure.

It should be noted that, a process in which the target resolution and the resolution of the thumbnail are compared and further processing is performed based on the comparison result may be executed by the decoder, or may be executed by an external module of the decoder. This is not limited in this embodiment of this disclosure.

In conclusion, in the encoding and decoding method provided in this embodiment of this disclosure, the encoder performs feature extraction on the original picture to obtain the initial feature map, encodes the first feature map to obtain the bitstream, and sends the bitstream to the decoder. The decoder decodes the bitstream, to obtain the first feature map, and then reconstructs the second feature map based on the first neural network, to obtain the reconstructed picture. The resolution of the second feature map and the resolution of the reconstructed picture each are the target resolution, and the target resolution is lower than the resolution of the original picture. The second feature map includes the first feature map, or the second feature map is a feature map obtained by processing a feature map of the original picture based on the second neural network. The resolution of the reconstructed picture obtained through decoding and reconstruction is lower than the resolution of the original picture. In a process of obtaining the reconstructed picture, the original picture does not need to be first obtained through reconstruction, instead, the reconstructed picture is directly obtained, to improve efficiency of obtaining the reconstructed picture, and improve a speed at which a digital video application displays a thumbnail of an original picture.

In addition, the second neural network includes one or more output nodes, and each output node corresponds to one output resolution. The reconstructed pictures having the plurality of target resolutions can be generated by using the output node and the second neural network. In this process, the second neural network is used to process the first feature map. In a process of generating reconstructed pictures having different target resolutions, all the output nodes share a layer in the second neural network. In this way, a size of a neural network (including the first neural network and the second neural network) used to generate the reconstructed picture can be reduced, and storage space that is of the decoder and that is occupied by the neural network used to generate the reconstructed picture is reduced, to reduce running overheads and running complexity of the neural network used to generate the reconstructed picture in the decoder.

A sequence of the method provided in this embodiment of this disclosure may be properly adjusted, or processes may be correspondingly added or reduced based on a situation. Any method that is obtained through variation and that is readily figured out by a person skilled in the art within the technical scope disclosed in this disclosure shall fall within the protection scope of this disclosure. This is not limited in this embodiment of this disclosure.

Figure 8:
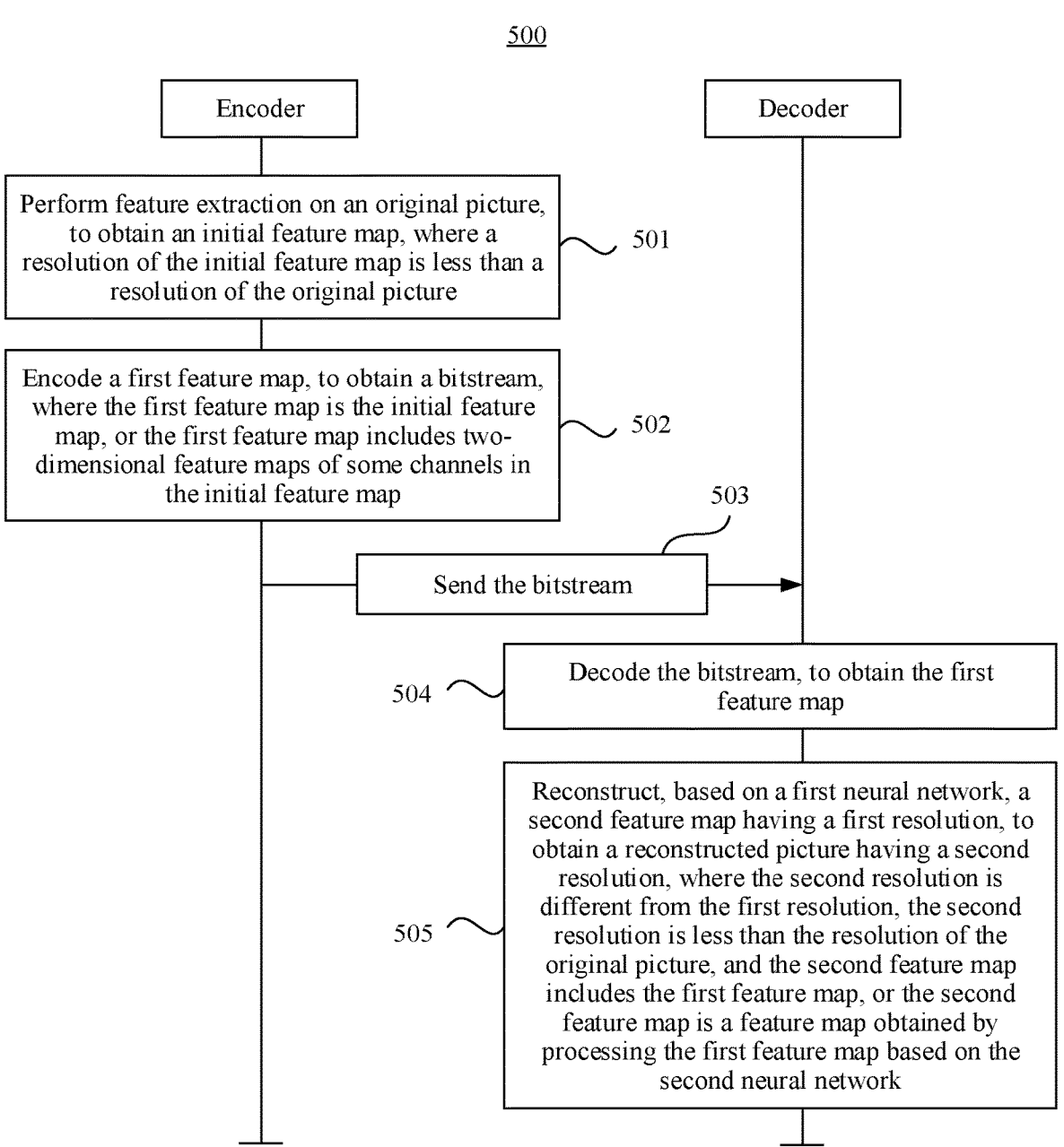
FIG. 8 is a schematic flowchart of a process of another encoding and decoding method according to an embodiment of this disclosure.

An embodiment of this disclosure provides another encoding and decoding method. FIG. 8 is a schematic flowchart of a process 500 of another encoding and decoding method according to an embodiment of this disclosure. The process 500 may be executed by an electronic device (including an encoder and a decoder). In an example, the process 500 may be executed by the electronic device by invoking a neural network model. The process 500 is described as a series of operations. It should be understood that the process 500 may be performed in various sequences and/or simultaneously, and is not limited to an execution sequence shown in FIG. 8. The process 500 may include the following procedures.

501: The encoder performs feature extraction on an original picture, to obtain an initial feature map, where a resolution of the initial feature map is lower than a resolution of the original picture.

For the process, refer to the process 401. Details are not described herein in this embodiment of this disclosure.

502: The encoder encodes a first feature map, to obtain a bitstream, where the first feature map is the initial feature map, or the first feature map includes two-dimensional feature maps of some channels in the initial feature map.

For the process, refer to the process 402. Details are not described herein in this embodiment of this disclosure.

503: The encoder sends the bitstream to the decoder.

For the process, refer to the process 403. Details are not described herein in this embodiment of this disclosure.

504: The decoder decodes the bitstream, to obtain the first feature map.

For the process, refer to the process 404. Details are not described herein in this embodiment of this disclosure.

505: The decoder reconstructs, based on a first neural network, a second feature map having a first resolution, to obtain a reconstructed picture having a second resolution, where the second resolution is different from the first resolution, the second resolution is lower than the resolution of the original picture, and the second feature map includes the first feature map, or the second feature map is a feature map obtained by processing the first feature map based on the second neural network.

A difference between the process 505 and the process 405 lies in that in the process 405, the first neural network keeps a resolution of the second feature map unchanged, to generate the reconstructed picture, while in the process 505, the first neural network can change the resolution of the second feature map.

A resolution of the reconstructed picture output by the first neural network and a resolution of the input second feature map are different. Optionally, the first neural network may include at least one convolutional layer, and a convolutional layer whose stride is not 1 exists in the at least one convolutional layer. The first neural network may perform upsampling or downsampling on the resolution of the input second feature map at the convolutional layer whose stride is not 1, to change the resolution of the input second feature map.

For example, as shown in FIG. 5, a stride of a second convolutional layer in b1 may be 1.3, and 1.3× downsampling is performed on the resolution of the second feature map. As shown in FIG. 6, a stride of a first convolutional layer of the first neural network may be 1.6, and 1.6× upsampling is performed on the resolution of the second feature map.

Because values of a plurality of resolutions that can be output by the second neural network are fixed, a value of a resolution output by a first neural network connected to one or more output nodes of the second neural network is fixed. In the process 505, the first neural network also has a function of changing a resolution of an input feature map. In this way, resolutions with various values can be output based on first neural networks of different structures. This reduces running overheads and running complexity of a neural network used to generate a reconstructed picture in a decoder, and improves flexibility of generating the reconstructed picture.

For related descriptions of the first neural network and the second neural network in the process 505, refer to the process 405. Details are not described herein in this embodiment of this disclosure.

In conclusion, in the encoding and decoding method provided in this embodiment of this disclosure, the encoder performs feature extraction on the original picture to obtain the initial feature map, encodes the first feature map to obtain the bitstream, and sends the bitstream to the decoder. The decoder decodes the bitstream to obtain the first feature map, and then reconstructs, based on the first neural network, the second feature map having the first resolution, to obtain the reconstructed picture having the second resolution. The second resolution is different from the first resolution, the second resolution is lower than the resolution of the original picture, and the second feature map includes the first feature map, or the second feature map is a feature map obtained by processing the first feature map based on the second neural network. The resolution of the reconstructed picture obtained through decoding and reconstruction is lower than the resolution of the original picture. In a process of obtaining the reconstructed picture, the original picture does not need to be first obtained through reconstruction, instead, the reconstructed picture is directly obtained, to improve efficiency of obtaining the reconstructed picture, and improve a speed at which a digital video application displays a thumbnail of an original picture.

In addition, the first neural network also has a function of changing a resolution of an input feature map. In this way, resolutions with various values can be output based on first neural networks of different structures. This reduces running overheads and running complexity of a neural network used to generate a reconstructed picture in a decoder, and improves flexibility of generating the reconstructed picture.

A sequence of the method provided in this embodiment of this disclosure may be properly adjusted, or processes may be correspondingly added or reduced based on a situation. Any method that is obtained through variation and that is readily figured out by a person skilled in the art within the technical scope disclosed in this disclosure shall fall within the protection scope of this disclosure. This is not limited in this embodiment of this disclosure.

An embodiment of this disclosure provides still another encoding and decoding method. FIG. 9A and FIG. 9B are a schematic flowchart of a process 600 of still another encoding and decoding method according to an embodiment of this disclosure. The process 600 may be executed by an electronic device (including an encoder and a decoder). In an example, the process 600 may be executed by the electronic device by invoking a neural network model. The process 600 is described as a series of operations. It should be understood that the process 600 may be performed in various sequences and/or simultaneously, and is not limited to an execution sequence shown in FIG. 8. The process 600 may include the following procedures.

601: The encoder performs feature extraction on an original picture, to obtain an initial feature map, where a resolution of the initial feature map is lower than a resolution of the original picture, and a quantity of channels of the initial feature map is M.

For the process, refer to the process 401. Details are not described herein in this embodiment of this disclosure.

602: The encoder encodes a to-be-encoded feature map, to obtain a bitstream, where the bitstream corresponds to two-dimensional feature maps of M1 channels in the initial feature map, and M1≤M.

For this process, refer to the process 402. The to-be-encoded feature map is equivalent to a first feature map in the process 402. Details are not described herein in this embodiment of this disclosure.

603: The encoder sends the bitstream to the decoder.

For the process, refer to the process 403. Details are not described herein in this embodiment of this disclosure.

604: The decoder decodes a bitstream corresponding to two-dimensional feature maps of M2 channels in the M1 channels, to obtain the first feature map, where M2<M1, and the first feature map includes the two-dimensional feature maps of the M2 channels.

The bitstream corresponds to the two-dimensional feature maps of the M1 channels, and bitstreams corresponding to the two-dimensional feature maps of the M1 channels are arranged in sequence. The decoder may decode the bitstream corresponding to two-dimensional feature maps of first M2 channels in the M1 channels. In this way, a subsequent reconstruction procedure can be executed after the bitstream corresponding to the two-dimensional feature maps of the M2 channels is decoded, and there is no need to execute the subsequent reconstruction procedure after the entire bitstream is decoded, to improve efficiency of obtaining a third feature map, and improve efficiency of obtaining the reconstructed picture.

For a process of decoding the bitstream corresponding to the two-dimensional feature maps of the M2 channels in the M1 channels, refer to the process 404. Details are not described herein in this embodiment of this disclosure.

605: The decoder reconstructs a second feature map based on a first neural network, to obtain a reconstructed picture, where a resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

For the process, refer to the process 405. Details are not described herein in this embodiment of this disclosure.

606: The decoder performs upsampling processing on the reconstructed picture, to obtain a first picture, where a resolution of the first picture is the same as the resolution of the original picture.

For example, upsampling processing may include bilinear interpolation upsampling, or upsampling performed by directly filling a pixel value at a neighboring location, or upsampling performed by performing a deconvolution operation at a convolutional layer whose stride is greater than 1.

It should be noted that, if a feature map obtained by decoding the entire bitstream is reconstructed, to generate the reconstructed picture having the original resolution, the resolution of the picture having the original resolution is high, and a generation process consumes a long period of time. This affects a speed at which the digital video application displays the picture having the original resolution, and frame freezing occurs when the user browses the picture having the original resolution. In this embodiment of this disclosure, only a partial bitstream of the bitstream is decoded in a process of obtaining the reconstructed picture, so that a data amount of the reconstructed picture is small, and efficiency of obtaining the reconstructed picture is high. In this way, when the first picture is obtained based on the reconstructed picture, efficiency of obtaining the first picture is improved, to reduce time consumed in a process of obtaining the first picture, and improve the speed at which the digital video application displays the picture having the original resolution.

It can be learned from the process 602 that the bitstream may be a bitstream of the initial feature map (that is, M1=M), or the bitstream corresponds to two-dimensional feature maps of some channels in the initial feature map (that is, M1<M). When M1=M, a high-quality picture having the original resolution may be obtained through reconstruction. In other words, subsequent processes 607 and 608 may be executed. When M1<M, subsequent processes 607 and 608 do not need to be executed.

607: The decoder decodes a bitstream corresponding to a two-dimensional feature map of a channel other than the M2 channels in the M1 channels, to obtain a third feature map, where the third feature map includes two-dimensional feature maps of M1-M2 channels.

For a decoding process, refer to the process 404. Details are not described herein in this embodiment of this disclosure.

608: The decoder processes the first feature map and the third feature map based on the second neural network, to obtain a second picture, where a resolution of the second picture is the same as the resolution of the original picture.

The first feature map and the third feature map form the two-dimensional feature maps of the M1 channels (that is, form the initial feature map). The second picture is a final output of the second neural network. For a structure and a processing procedure of the second neural network, refer to the process 405. Details are not described herein in this embodiment of this disclosure.

The second picture is generated after the first feature map and the third feature map are reconstructed, a data amount of the second picture is greater than a data amount of the first picture, and picture quality of the second picture is higher than that of the first picture. The process 607 and the process 608 may be executed simultaneously with the process 606. In an example, the low-quality first picture is quickly generated in the process 606, so that the low-quality first picture is first displayed by the digital video application, and the high-quality second picture is obtained through reconstruction in the process 607 and the process 608. Because a reconstruction process of the second picture consumes a long period of time, a low-quality first picture is first quickly generated for display, and a high-quality second picture is obtained through reconstruction. In this way, frame freezing does not occur when the digital video application displays the picture having the original resolution, and a display effect of the picture having the original resolution is improved.

In conclusion, in the encoding and decoding method provided in this embodiment of this disclosure, the encoder performs feature extraction on the original picture to obtain the initial feature map, where the quantity of channels of the initial feature map is M, encodes the first feature map to obtain the bitstream, and sends the bitstream to the decoder. The bitstream corresponds to the two-dimensional feature data of the M1 channels in the initial feature map, where M1≤M. The decoder decodes the bitstream corresponding to the two-dimensional feature maps of the M2 channels in the M1 channels, to obtain the first feature map, and reconstructs the second feature map based on the first neural network, to obtain the reconstructed picture. The resolution of the second feature map and the resolution of the reconstructed picture each are the target resolution, the target resolution is lower than the resolution of the original picture, and the second feature map is the first feature map, or the second feature map is a feature map obtained by processing the second feature map based on the second neural network. The resolution of the reconstructed picture obtained through decoding and reconstruction is lower than the resolution of the original picture. In a process of obtaining the reconstructed picture, the original picture does not need to be first obtained through reconstruction, instead, the reconstructed picture is directly obtained, to improve efficiency of obtaining the reconstructed picture, and improve a speed at which a digital video application displays a thumbnail of an original picture.

In addition, after the reconstructed picture is obtained, upsampling processing may be further performed on the reconstructed picture, to obtain the first picture. The resolution of the first picture is the same as the resolution of the original picture. In addition, the bitstream corresponding to the two-dimensional feature map of the channel other than the M2 channels in the M1 channels is decoded, to obtain the third feature map. The third feature map includes two-dimensional feature maps of the M1-M2 channels. The first feature map and the third feature map are processed based on the second neural network, to obtain the second picture. The resolution of the second picture is the same as the resolution of the original picture. A data amount of the second picture is greater than a data amount of the first picture, and picture quality of the second picture is higher than that of the first picture. Because a reconstruction process of the second picture consumes a long period of time, a low-quality first picture is first quickly generated for display, and a high-quality second picture is obtained through reconstruction. In this way, frame freezing does not occur when the digital video application displays the picture having the original resolution, and a display effect of the picture having the original resolution is improved.

A sequence of the method provided in this embodiment of this disclosure may be properly adjusted, or processes may be correspondingly added or reduced based on a situation. For example, when the bitstream corresponds to the two-dimensional feature maps of some channels in the initial feature map, processes 607 and 608 may not be performed. Any method that is obtained through variation and that is readily figured out by a person skilled in the art within the technical scope disclosed in this disclosure shall fall within the protection scope of this disclosure. This is not limited in this embodiment of this disclosure.

An embodiment of this disclosure provides yet another encoding and decoding method. FIG. 10 is a schematic flowchart of a process 700 of yet another encoding and decoding method according to an embodiment of this disclosure. The process 700 may be executed by an electronic device (including an encoder and a decoder). In an example, the process 700 may be executed by the electronic device by invoking a neural network model. The process 700 is described as a series of operations. It should be understood that the process 700 may be performed in various sequences and/or simultaneously, and is not limited to an execution sequence shown in FIG. 10. The process 700 may include the following procedures.

701: The encoder performs feature extraction on an original picture, to obtain an initial feature map, where a resolution of the initial feature map is lower than a resolution of the original picture.

For the process, refer to the process 401. Details are not described herein in this embodiment of this disclosure.

702: The encoder encodes a feature map of the original picture, to obtain a bitstream, where the feature map of the original picture is the initial feature map, or the feature map of the original picture includes two-dimensional feature maps of some channels in the initial feature map.

For the process, refer to the process 402. Details are not described herein in this embodiment of this disclosure.

703: The encoder sends the bitstream to the decoder.

For the process, refer to the process 403. Details are not described herein in this embodiment of this disclosure.

704: The decoder decodes the bitstream, to obtain the feature map of the original picture.

For the process, refer to the process 404. Details are not described herein in this embodiment of this disclosure.

705: The decoder reconstructs the feature map of the original picture based on a neural network, to obtain a reconstructed picture having a target resolution, where the target resolution is lower than or equal to a resolution of the feature map of the original picture.

A resolution of a reconstructed picture output by the neural network and a resolution of an input feature map are the same or different.

There may be one or more neural networks. When there is one neural network, the decoder may directly input the feature map of the original picture into the neural network, to obtain a reconstructed picture output by the neural network. In this case, the neural network can output only a reconstructed picture having one resolution.

When there is a plurality of neural networks, structures of any two neural networks may be the same or different. This is not limited in this embodiment of this disclosure. The decoder may determine a target neural network in the plurality of neural networks. Then, the feature map of the original picture is input into the target neural network, to obtain a reconstructed picture output by the target neural network.

Each neural network includes at least one convolutional layer, and the convolutional layer is configured to process the feature map of the input original picture. Each neural network corresponds to one output resolution, and an output resolution of any neural network is a resolution of a feature map output by a last convolutional layer in the any neural network after the feature map of the original picture is input into the any neural network. The decoder may first determine the target resolution, and then determine that a neural network whose input resolution is the target resolution is the target neural network. For a method for determining the target resolution, refer to the process 405. Details are not described herein in this embodiment of this disclosure.

Figure 11:
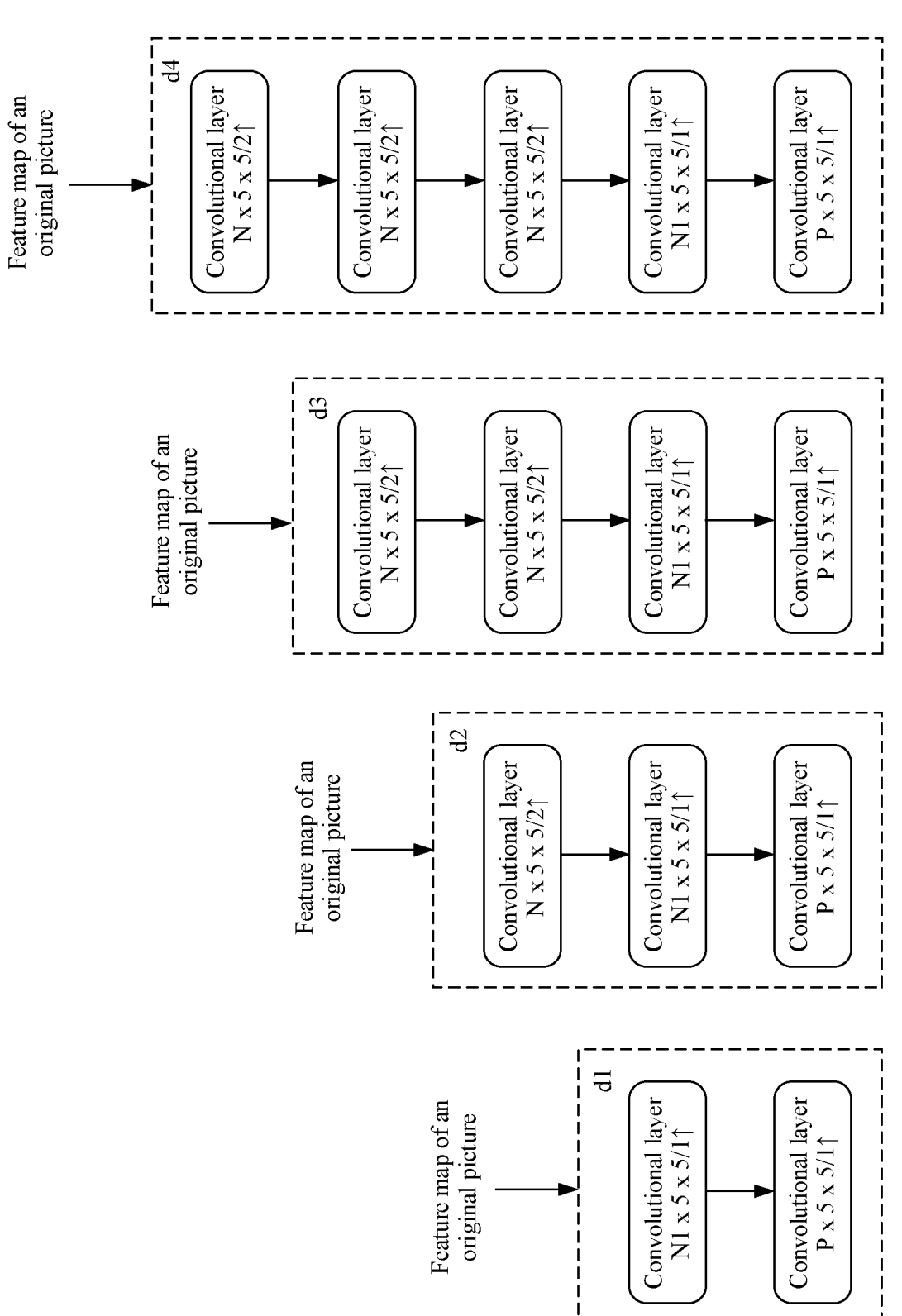
FIG. 11 is a schematic diagram of a structure of a neural network according to an embodiment of this disclosure.

For example, FIG. 11 is a schematic diagram of a structure of a neural network according to an embodiment of this disclosure. FIG. 11 shows four neural networks d1 to d4. d1 includes two convolutional layers, sizes of convolution kernels of the two convolutional layers in d1 each are 5×5, and strides of the two convolutional layers each are 1. In d1, a quantity of output channels of a first convolutional layer is N1, and a quantity of output channels of a last convolutional layer is P. d2 includes three convolutional layers, and sizes of convolution kernels of the three convolutional layers in d2 each are 5×5. A stride of a first convolutional layer in d2 is 2, and a quantity of output channels is N, a stride of a second convolutional layer and a stride of a last convolutional layer in d2 each are 1, a quantity of output channels of the second convolutional layer in d2 is N1, and a quantity of output channels of the last convolutional layer in d2 is P. d3 includes four convolutional layers, a stride of a first convolutional layer and a stride of a second convolutional layer in d3 each are 2, and quantities of output channels each are N, a stride of a third convolutional layer and a stride of a last convolutional layer in d3 each are 1, a quantity of output channels of the third convolutional layer in d3 is N1, and a quantity of output channels of the last convolutional layer is P. d4 includes five convolutional layers, a stride of a first convolutional layer, a stride of a second convolutional layer, and a stride of a third convolutional layer in d4 each are 2, and quantities of output channels each are N, a stride of a fourth convolutional layer and a stride of a last convolutional layer in d4 each are 1, a quantity of output channels of a fourth convolutional layer in d4 is N1, and a quantity of output channels of a last convolutional layer is P.

It is assumed that a quantity of channels of the feature map of the original picture is M, the resolution is W/16×H/16, and output resolutions of the four neural networks d1 to d4 are respectively W/16×H/16, W/8×H/8, W/4×H/4, and W/2×H/2.

When the target neural network is d1, the feature map of the original picture is input into d1, and the first convolutional layer and the second convolutional layer of d1 keep the resolution of the input feature map unchanged, and sequentially convert the quantity of the input feature map, to finally output a reconstructed picture whose quantity of channels is P and resolution is W/16×H/16.

When the target neural network is d2, the feature map of the original picture is input into d2, and the first convolutional layer of d2 performs 2× upsampling on the resolution of the feature map, and outputs a feature map whose quantity of channels is N and resolution is W/8×H/8. The second convolutional layer and the third convolutional layer of d2 keep the resolution of the input feature map unchanged, and sequentially convert the quantity of the input feature map, to finally output a reconstructed picture whose quantity of channels is P and resolution is W/8×H/8.

When the target neural network is d3, the feature map of the original picture is input into d3, and the first convolutional layer and the second convolutional layer of d3 sequentially perform 2× upsampling on the resolution of the feature map of the original picture, and output a feature map whose quantity of channels is N and resolution is W/4×H/4. The third convolutional layer and the fourth convolutional layer of d3 keep the resolution of the input feature map unchanged, and sequentially convert the quantity of the input feature map, to finally output a reconstructed picture whose quantity of channels is P and resolution is W/4×H/4.

When the target neural network is d4, the feature map of the original picture is input into d4, and the first convolutional layer, the second convolutional layer, and the third convolutional layer of d4 sequentially perform 2× upsampling on the resolution of the feature map of the original picture, and output a feature map whose quantity of channels is N and resolution is W/2×H/2. The fourth convolutional layer and the fifth convolutional layer of d4 keep the resolution of the input feature map unchanged, and sequentially convert the quantity of the input feature map, to finally output a reconstructed picture whose quantity of channels is P and resolution is W/2×H/2.

Figure 12:
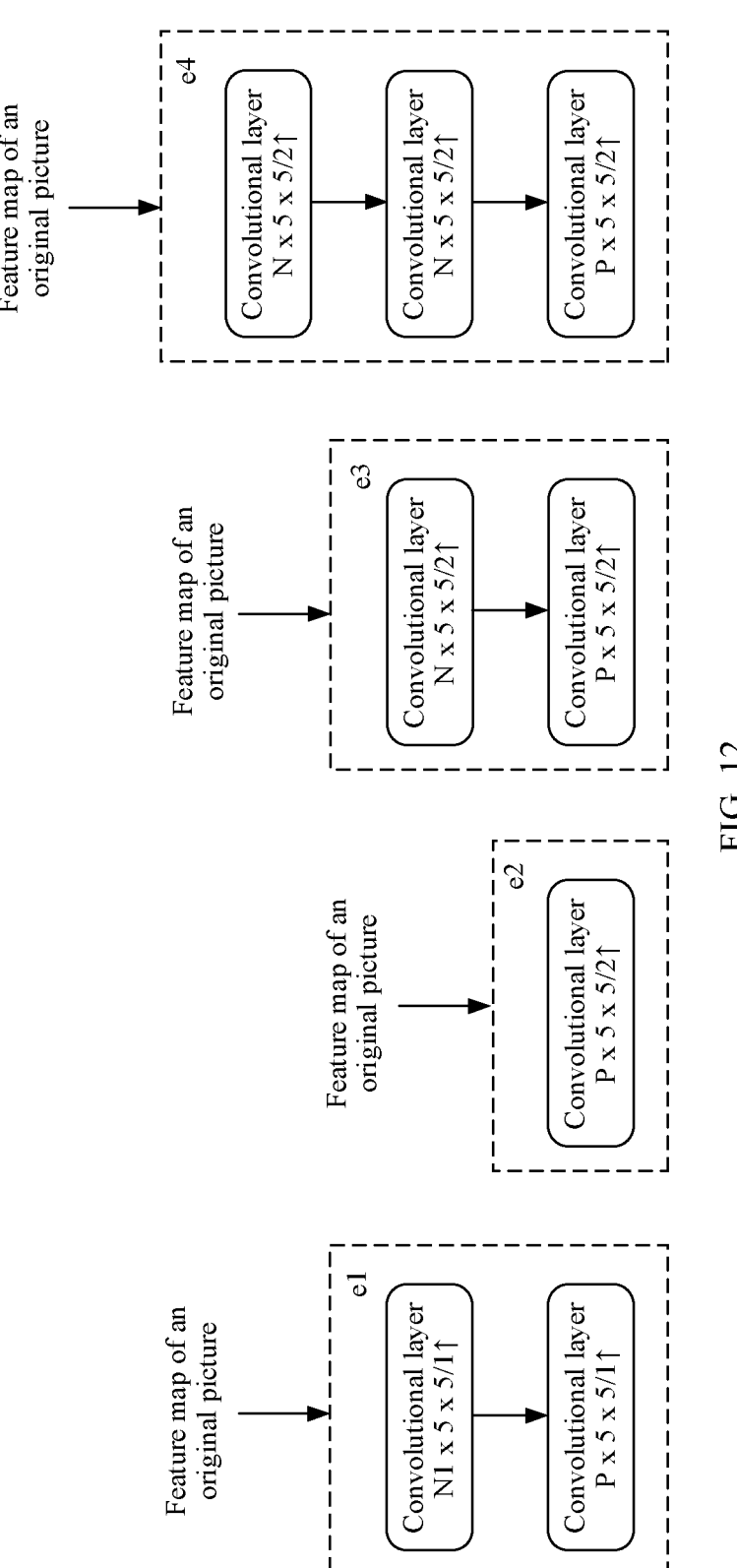
FIG. 12 is a schematic diagram of a structure of another neural network according to an embodiment of this disclosure.

For example, FIG. 12 is a schematic diagram of a structure of another neural network according to an embodiment of this disclosure. FIG. 12 shows four neural networks e1 to e4. e1 includes two convolutional layers, sizes of convolution kernels of the two convolutional layers in e1 each are 5×5, and strides of the two convolutional layers each are 1. In e1, a quantity of output channels of a first convolutional layer is N1, and a quantity of output channels of a last convolutional layer is P. e2 includes one convolutional layer, a size of a convolution kernel of one convolutional layer in e2 is 5×5, a stride is 2, and a quantity of output channels is P. e3 includes two convolutional layers, a stride of a first convolutional layer and a stride of a second convolutional layer in e3 each are 2, a quantity of output channels of the first convolutional layer in e3 is N, and a quantity of output channels of a second convolutional layer in d3 is P. e4 includes three convolutional layers, a stride of a first convolutional layer, a stride of a second convolutional layer, and a stride of a third convolutional layer in e4 each are 2, quantities of output channels of the first convolutional layer and the second convolutional layer in e4 each are N, and a quantity of output channels of the third convolutional layer in e4 is P.

It is assumed that the feature map of the original picture is M×W/16×H/16, and output resolutions of the four neural networks e1 to e4 are respectively W/16×H/16, W/8×H/8, W/4×H/4, and W/2×H/2. In other words, when target neural networks are respectively e1 to e4, output reconstructed pictures are respectively P×W/16×H/16, P×W/8×H/8, P×W/4×H/4, and P×W/2×H/2.

It should be noted that, there may be one or more target resolutions, and correspondingly, there may be one or more target neural networks. When there is a plurality of target neural networks, the plurality of target neural networks may simultaneously output reconstructed pictures having corresponding target resolutions. For a reconstruction process of each target neural network, refer to the foregoing descriptions. Details are not described herein in this embodiment of this disclosure.

The structures of the neural networks in FIG. 11 and FIG. 12 are examples for description. This is not limited in this embodiment of this disclosure. For example, based on FIG. 11 or FIG. 12, any neural network may further include one or more convolutional layers, and a plurality of convolutional layers may be the same or different.

Optionally, in this embodiment of this disclosure, before the feature map of the original picture is reconstructed or the last convolutional layer of the neural network outputs the reconstructed picture, channel reduction may be further performed on the feature map of the original picture and/or an intermediate feature map output by a convolutional layer, to reduce complexity of a subsequent reconstruction process and improve efficiency of the reconstruction process. For the process, refer to the process 405. Details are not described herein in this embodiment of this disclosure.

Figure 13:
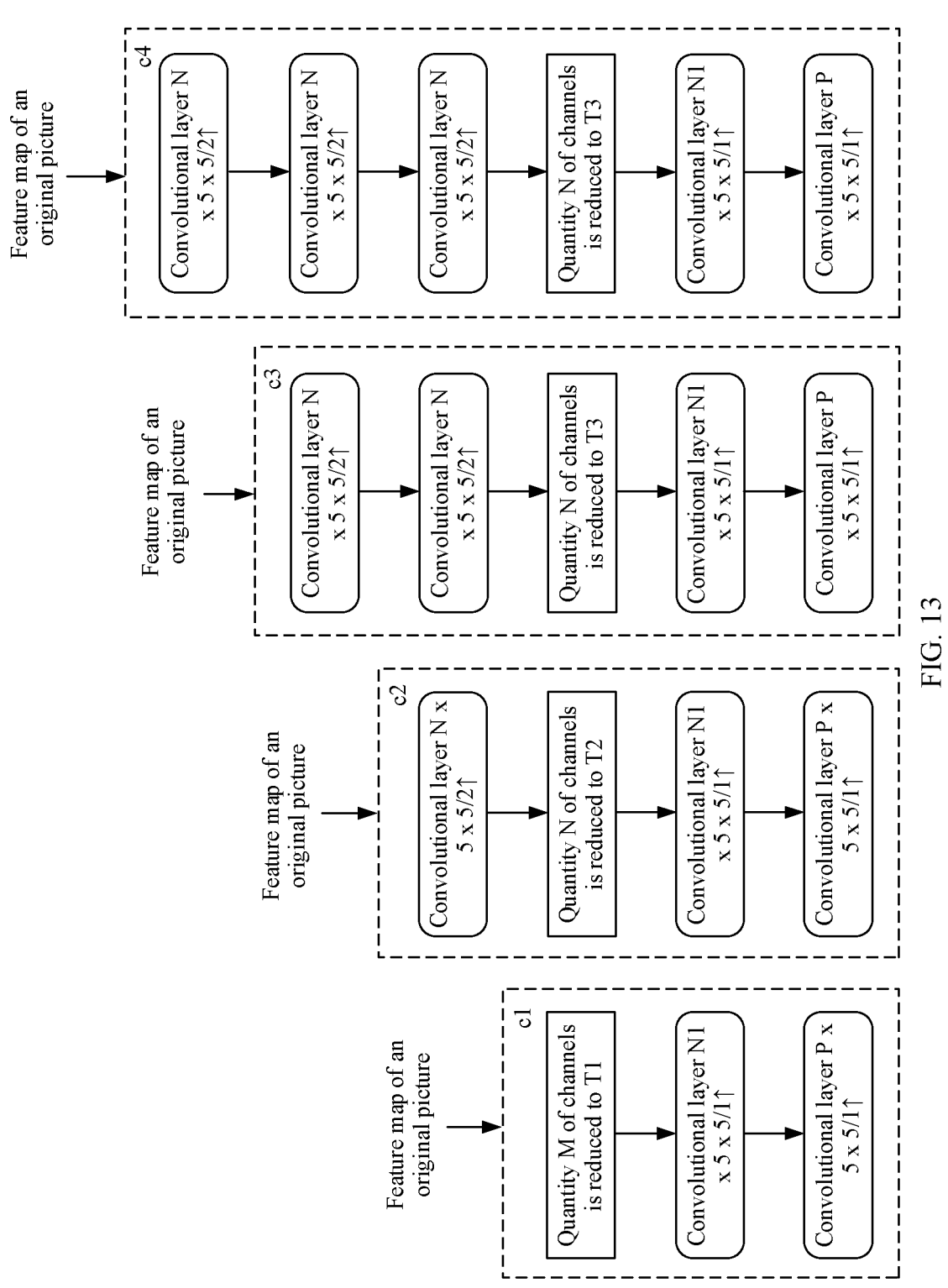
FIG. 13 is a schematic diagram of another channel reduction procedure according to an embodiment of this disclosure.

FIG. 13 is a schematic diagram of another channel reduction procedure according to an embodiment of this disclosure. In FIG. 13, descriptions are provided by using an example in which channel reduction is performed based on the neural network shown in FIG. 11, and channel reduction is performed on the intermediate feature map. That is, a quantity of output channels of a convolutional layer is reduced in each neural network. As shown in FIG. 13, a quantity of channels of the feature map of the original picture is reduced from M1 to T1 in d1, a quantity of channels of an intermediate feature map output by the first convolutional layer is reduced from N to T2 in d2, a quantity of channels of an intermediate feature map output by the second convolutional layer is reduced from N to T3 in d3, and a quantity of channels of an intermediate feature map output by the third convolutional layer is reduced from N to T4 in d4. T1 is less than M1, and T2, T3, and T4 each are less than N.

For the process 705, refer to the process 405. Details are not described herein in this embodiment of this disclosure.

In conclusion, in the encoding and decoding method provided in this embodiment of this disclosure, the encoder performs feature extraction on the original picture to obtain the feature map of the original picture, encodes the feature map of the original picture to obtain the bitstream, and sends the bitstream to the decoder. The decoder decodes the bitstream to obtain the feature map of the original picture, and then reconstructs the feature map of the original picture to obtain the reconstructed picture having the target resolution. The target resolution is lower than or equal to the resolution of the feature map of the original picture. The resolution of the reconstructed picture obtained through decoding and reconstruction is lower than the resolution of the original picture. In a process of obtaining the reconstructed picture, the original picture does not need to be first obtained through reconstruction, instead, the reconstructed picture is directly obtained, to improve efficiency of obtaining the reconstructed picture, and improve a speed at which a digital video application displays a thumbnail of an original picture.

In addition, the feature map of the original picture may be reconstructed based on the neural network, to obtain the reconstructed picture. The neural network includes a plurality of neural subnetworks, and each neural subnetwork corresponds to one output resolution. The target resolution may be determined based on a required resolution of a thumbnail, a neural subnetwork whose output resolution is the target resolution is determined as the target neural subnet, and the reconstructed picture is obtained based on the target neural subnet. In the process of obtaining the reconstructed picture, a matched neural subnetwork can be selected based on the determined target resolution, and reconstructed pictures having a plurality of target resolutions can be obtained, to improve flexibility of obtaining the reconstructed picture.

A sequence of the method provided in this embodiment of this disclosure may be properly adjusted, or processes may be correspondingly added or reduced based on a situation. Any method that is obtained through variation and that is readily figured out by a person skilled in the art within the technical scope disclosed in this disclosure shall fall within the protection scope of this disclosure. This is not limited in this embodiment of this disclosure.

Optionally, embodiments of this disclosure may further include the following five embodiments.

Embodiment 1

Figure 14:
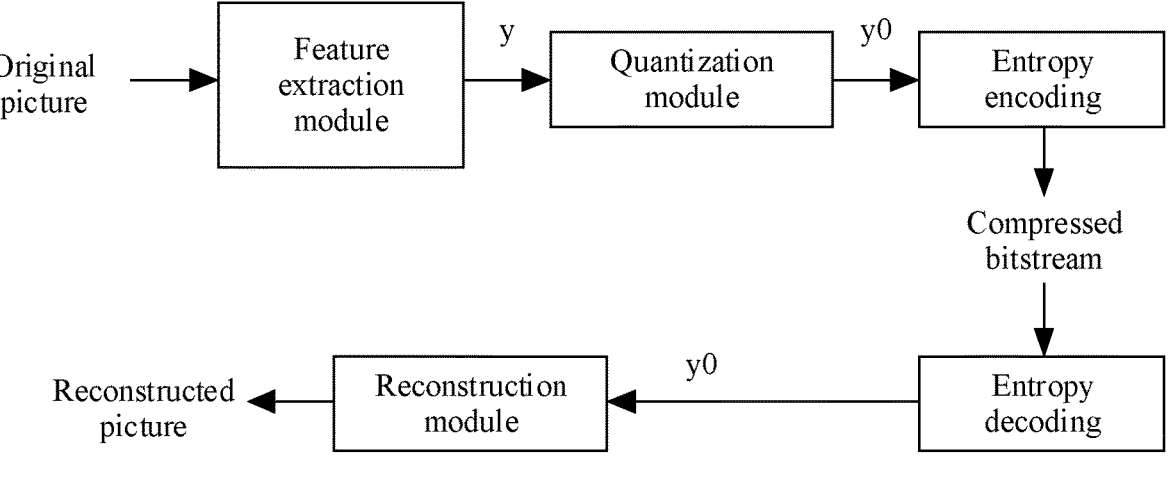
FIG. 14 is a schematic diagram of an encoding and decoding procedure according to an embodiment of this disclosure.

A main flowchart of this embodiment is shown in FIG. 14.

FIG. 14 is a schematic diagram of an encoding and decoding procedure according to an embodiment of this disclosure. On an encoder side, an original picture is input into a feature extraction module to output a feature map y, and the feature map y is input into a quantization module to obtain a quantized feature map y0. An entropy encoding module performs entropy encoding on the feature map y0 to obtain a compressed bitstream. A technical solution on the encoder side is described as follows.

Step 1: Obtain a three-dimensional feature map y.

Figure 15:
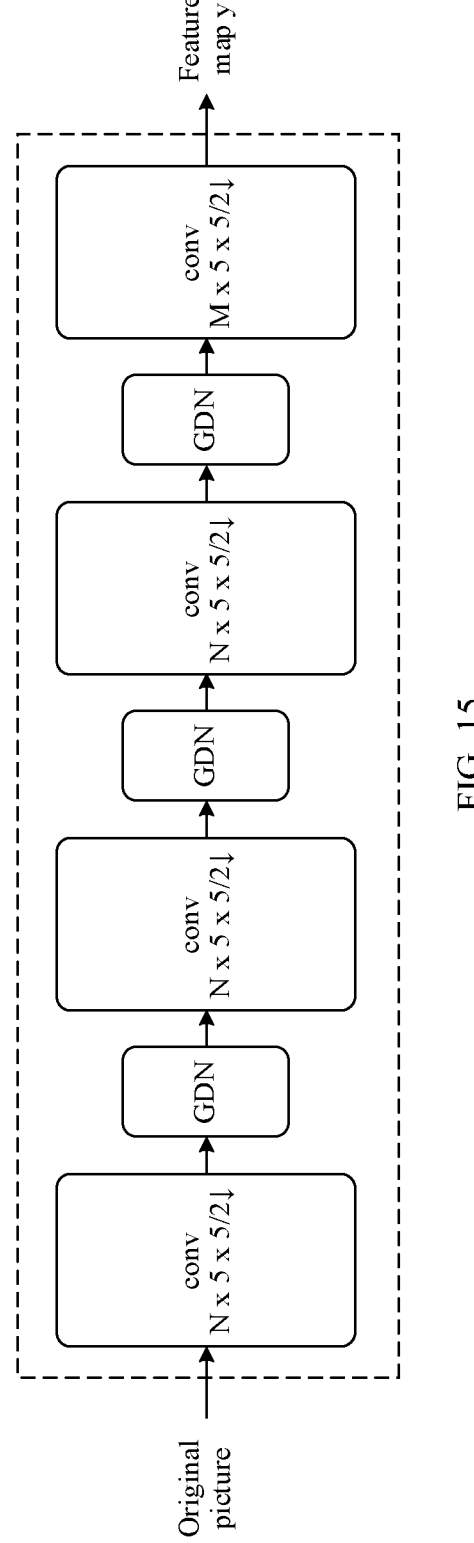
FIG. 15 is a schematic diagram of a network structure of a feature extraction module according to an embodiment of this disclosure.

The original picture x is input into the feature extraction module to output the three-dimensional feature picture y. The feature extraction module is implemented in a neural network-based method. FIG. 15 is a schematic diagram of a network structure of a feature extraction module according to an embodiment of this disclosure. The feature extraction module mainly includes four convolutional layers and three GDN layers that are interleaved and concatenated. A size of a convolution kernel of each convolutional layer is 5×5, a quantity of channels of an output feature map of the last convolutional layer is M, and a stride of each convolutional layer is 2, indicating that 2× downsampling is performed on a width and a height of an input picture or feature map. Therefore, after an original picture whose size is W×H is input into a feature extraction network, a three-dimensional feature map y whose size is M×W/16×H/16 is output. It can be understood that the feature map y includes two-dimensional feature maps that are of M channels and whose resolutions are W/16×H/16.

A first convolutional layer (conv N×5×5/2↓) is used as an example. It indicates that a convolution kernel is 5×5, N indicates that a quantity of channels of an output feature map of a convolution kernel of the first layer is N, and a number 2 indicates that a stride is 2. It is understood that a 2× downsampling operation is performed on both a width and a height of an input picture. Therefore, a size of a feature map output by the first convolutional layer is N×W/2×H/2.

Similarly, if a quantity of channels of a second convolutional layer is N and a stride is 2, a size of an output feature map is N×W/4×H/4. After convolution operations at four layers shown in FIG. 15 are performed, a size of the output feature map y is M×W/16×H/16.

It should be noted that, in this step, a structure of the feature extraction network is not limited, a quantity of convolutional layers is not limited, whether a GDN is included is not limited, whether there is another activation function is not limited, a size of a convolution kernel is not limited, may be 3×3, 5×5, 7×7, or another size, and is determined by a specific network design of an encoder/decoder side. This is not limited in this disclosure. In this disclosure, 5×5 is used as an example for description.

Step 2: Input the feature map y into the quantization module, to obtain the quantized feature map y0.

The feature quantization module quantizes each feature value (or a feature element) in the feature map y, and rounds off a feature value of a floating point number to obtain an integer feature value, so as to obtain the quantized feature map y0. The feature map y0 is an M×W/16×H/16 three-dimensional integer feature map.

It should be noted that a specific quantization method is not limited in this disclosure, and may alternatively be truncating the feature value of the floating point number to obtain an integer feature value. Alternatively, a quantized feature value may be obtained by performing a quantization operation based on a preset quantization stride.

Step 3: The entropy encoding module performs entropy encoding on the feature map y0, to obtain the compressed bitstream.

When entropy encoding is performed on each feature element in the feature map y0, processing may be performed in one of the following methods. This is not limited herein.

Method 1: A probability model-based entropy encoding method: When entropy encoding is performed on each feature element in the feature map y0, modeling is first performed by using a probability distribution model, context information of a current feature element is input into a probability estimation network to obtain a model parameter, the model parameter is substituted into the probability distribution model to obtain a probability distribution of the current feature element, and entropy encoding is performed based on the probability distribution. The probability distribution model may be a Gaussian single model (GSM), an asymmetric Gaussian model, a Gaussian mixture model (GMM), or a Laplace distribution model. The probability estimation network may be a deep learning-based network, for example, a recurrent neural network (RNN) or a convolutional neural network (PixelCNN). This is not limited herein.

Method 2: Hyper prior entropy encoding method:

The feature map y passes through an edge information extraction module, and edge information z is output. The edge information z is quantized, to obtain $\hat{z}$. Entropy encoding is performed on $\hat{z}$, and $\hat{z}$ is written into the bitstream. The encoder side performs an entropy decoding operation, to obtain decoded $\hat{z}$, and inputs $\hat{z}$ into the probability estimation network to output a probability distribution of each feature element in the feature map y0 (entropy encoding is performed on $\hat{z}$ and then decoding is performed, to ensure synchronization of encoding and decoding). The entropy encoding module performs entropy encoding on each feature element in the feature map y0 based on the probability distribution of each feature element in y0, obtain a compressed bitstream. The edge information $\hat{z}$ is also feature information, and is represented as a three-dimensional feature map. A quantity of feature elements included in the edge information is less than a quantity of feature elements in the feature map y.

Figure 16:
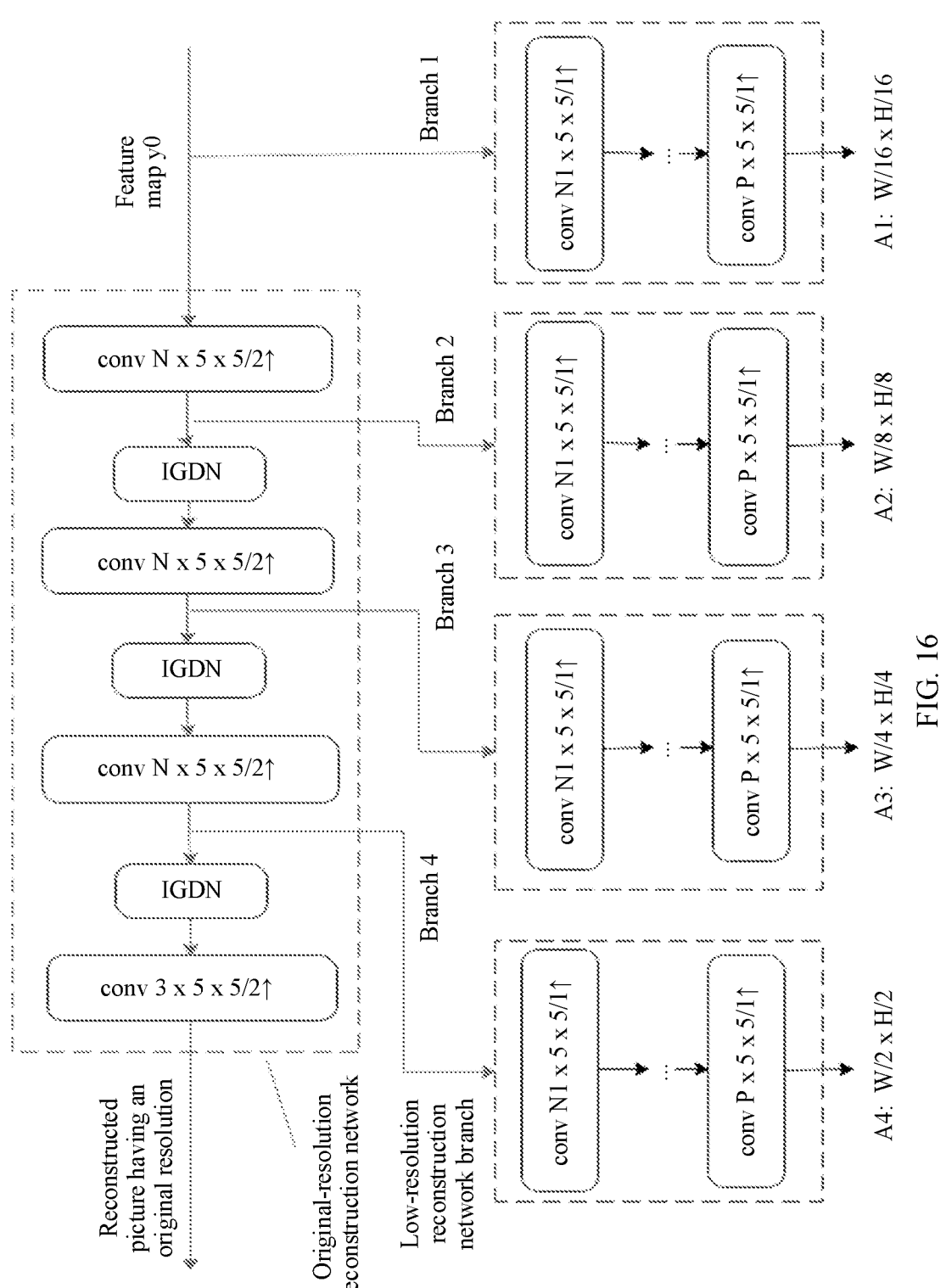
FIG. 16 is a schematic diagram of a network structure of a reconstruction module according to an embodiment of this disclosure.

As shown in a flowchart in FIG. 14, on the decoder side, the feature map y0 is obtained by parsing the compressed bitstream, and y0 is input into a reconstruction module, to obtain a reconstructed picture. The reconstructed picture includes a low-resolution reconstructed picture, and may further include a reconstructed picture having an original resolution. In an end-to-end picture encoding and decoding solution, usually, a structure of a reconstruction module on the decoder side corresponds to a structure of a feature extraction module on the encoder side. In an example, corresponding to the network structure of the feature extraction module on the encoder side in FIG. 15, FIG. 16 is a schematic diagram of a network structure of a reconstruction module according to an embodiment of this disclosure. An original-resolution reconstruction network may output the reconstructed picture having the original resolution, and one or more different low-resolution reconstruction network branches may exist, and correspondingly output low-resolution reconstructed pictures that have different resolutions.

A main innovation point of this disclosure lies in the reconstruction module, and a technical solution of the decoder side is described as follows.

Step 1: Perform entropy decoding on the compressed bitstream, to obtain the three-dimensional feature map y0, where y0 includes two-dimensional feature maps that are of M channels and whose resolutions are W/k×H/k.

A value of k is determined by the network structure of the feature extraction network on the encoder side. In an example, the value of k is related to a quantity of convolutional layers in the feature extraction network and a stride of each convolutional layer. Corresponding to the encoder side, in this embodiment, k=16, and in this embodiment, descriptions are provided based on k=16.

An entropy decoding method corresponds to the encoder side. When entropy encoding is performed on each feature element in the feature map y0, processing may be performed in one of the following methods. This is briefly described as follows.

Method 1: The context information of the current feature element is input into a probability estimation network that is the same as that on the encoder side, to obtain a model parameter, the model parameter is substituted into a probability distribution model, to obtain a probability distribution of the current feature element, and entropy decoding is performed based on the probability distribution, to obtain a value of the feature element.

Method 2: First, the edge information $\hat{z}$ is obtained through decoding, the edge information $\hat{z}$ is input into a probability estimation network that is the same as that on the encoder side, and the probability distribution of the current feature element is output. Arithmetic encoding is performed on the current feature element based on the probability distribution of the current feature element, to obtain the value of the current feature element.

Step 2: Obtain a first resolution, where the first resolution is lower than the resolution W×H of the original picture.

A method for obtaining the first resolution may be one of the following methods. If the first resolution is specified by an outside of a decoder, the decoder selects a corresponding reconstruction branch based on the specified first resolution, to perform a picture reconstruction operation. In this case, the decoder may not include the step of obtaining the first resolution, and step 3 may be directly performed.

It should be noted that, the first resolution may be a plurality of resolutions. If the plurality of resolutions are specified by an outside of the decoder, the decoder may simultaneously output reconstructed pictures having the plurality of resolutions.

Method 1: An outside of the decoder specifies the first resolution. In this case, an external application layer of the decoder needs to learn of a capability of the decoder, in other words, a specific resolution of a picture that can be output by the decoder. Information indicating a specific resolution (candidate resolution) of a picture that can be output in the bitstream may be carried in the bitstream by using SEI, or may be directly carried at the application layer (in a file format). A player reads all candidate resolutions, determines the first resolution based on a target resolution, and notifies the decoder of information about the first resolution. In this embodiment, the candidate resolutions include W/16×H/16, W/8×H/8, W/4×H/4 and W/2×H/2. The application layer includes a video player, an album, a web page, and the like.

Method 2: An inside of the decoder determines that an application layer notifies the decoder of a target resolution, and the decoder finds a candidate resolution closest to the target resolution, and uses the found candidate resolution as the first resolution. The candidate resolution is determined by an internal structure of the decoder. In this embodiment, the candidate resolutions include W/16×H/16, W/8×H/8, W/4×H/4 and W/2×H/2.

Method 3: The first resolution is determined based on complexity/a power consumption constraint of the decoder. In an example, a corresponding complexity indicator may be calculated for each reconstruction branch of the decoder, and the complexity indicator may be learned of at an upper layer (the application layer). The application layer selects a corresponding resolution based on the complexity indicator.

Method 4: The target resolution is specified by the encoder side and transmitted to the decoder side. The decoder side directly decodes the bitstream to obtain the first resolution. For example, the encoder side directly transmits a first identifier to indicate the target resolution, and the decoder side parses a value of the first identifier, to obtain the target resolution. The decoder side finds, from the candidate resolutions based on the target resolution, a candidate resolution that is closest to the target resolution, and uses the candidate resolution as the first resolution.

Step 3: Select a corresponding reconstruction network branch based on the first resolution, and input the feature map y0 into the reconstruction module, to obtain a reconstructed picture having the first resolution.

In this embodiment, the reconstruction module may simultaneously output a plurality of low-resolution reconstructed pictures, or may output only one low-resolution reconstructed picture. A specific output result is determined based on a requirement of the application layer. If the first resolution specified by the application layer includes a plurality of resolutions, the plurality of low-resolution reconstructed pictures may be output in this step. In this embodiment, descriptions are provided by using an example in which a low-resolution reconstructed picture is output.

In an example, as shown in FIG. 16, corresponding to the encoder side, the feature map y0 is input into the original-resolution reconstruction network of the reconstruction module, and the reconstructed picture having the original resolution is output. In addition, different branches may be pulled out from a structure of the original-resolution reconstruction network, and different convolutional layers are added without changing the structure of the original-resolution reconstruction network, to output different low-resolution reconstructed pictures. With reference to FIG. 16, a specific description is as follows. A quantity of channels of the first convolutional layer, a quantity of channels of the second convolutional layer, and a quantity of channels of the third convolutional layer each are N, and a stride is 2.

If the first resolution is W/16×H/16, the feature map y0 is directly input into a reconstruction network in Branch 1, to obtain a reconstructed picture A1 whose size is P×W/16× H/16. The reconstruction network in Branch 1 includes a first deconvolutional layer, a quantity of output channels of the first deconvolutional layer is P, and a stride is 1. The reconstruction network in Branch 1 may further include a second deconvolutional network, the second deconvolutional network includes one or more deconvolutional layers, a stride of the deconvolutional layer is 1, an output channel is N1, and values of N1 of a plurality of deconvolutional layers may be the same or different. P indicates a quantity of channels of the finally output reconstructed picture A1, and a value is usually 3 or 1. If a three-channel color picture needs to be output, the value of P is 3. If a grayscale picture needs to be output, the value of P is 1. The value of N1 is not limited.

If the first resolution is W/8×H/8, the feature map y0 is input into the original-resolution reconstruction network, a first-layer deconvolution operation is performed to obtain a feature map Q2 whose size is N×W/8×H/8, and the feature map Q2 is input into a reconstruction network in Branch 2, to obtain a reconstructed picture A2 whose size is P×W/8× H/8. A network structure corresponding to Branch 2 may be the same as or different from a network structure corresponding to Branch 1.

If the first resolution is W/4×H/4, the feature map y0 is input into the original-resolution reconstruction network, a first-layer devolution operation and a second-layer devolution operation are performed to obtain a feature map Q3 whose size is N×W/4×H/4, and the feature map Q3 is input into a reconstruction network in Branch 3, to obtain a reconstructed picture A3 whose size is P×W/4×H/4. A network structure corresponding to Branch 3 may be the same as or different from a network structure corresponding to Branch 1 or Branch 2.

If the first resolution is W/2×H/2, the feature map y0 is input into the original-resolution reconstruction network, a first-layer deconvolution operation, a second-layer deconvolution operation, and a third-layer deconvolution operation are performed to obtain a feature map Q4 whose size is N×W/2×H/2, and the feature map Q4 is input into a reconstruction network in Branch 4, to obtain a reconstructed picture A4 whose size is P×W/2×H/2. A network structure corresponding to Branch 4 may be the same as or different from a network structure corresponding to Branch 1, Branch 2, or Branch 3.

Step 4: Process the reconstructed picture having the first resolution, to obtain a reconstructed picture having the target resolution.

The first resolution and the target resolution are compared. If the first resolution and the target resolution are the same, no processing needs to be performed, and the reconstructed picture having the first resolution is directly used, for output and display, as the reconstructed picture having the target resolution.

If the first resolution and the target resolution are different, a corresponding scaling-up/down operation, an upsampling, or a downsampling operation further needs to be performed, to obtain a reconstructed picture having a resolution the same as the target resolution, and then output the reconstructed picture.

It should be noted that, this step may be completed by a picture scaling-up/down module of a player outside the decoder. Therefore, a solution of the decoder side may not include this step.

Embodiment 2

Figure 17:
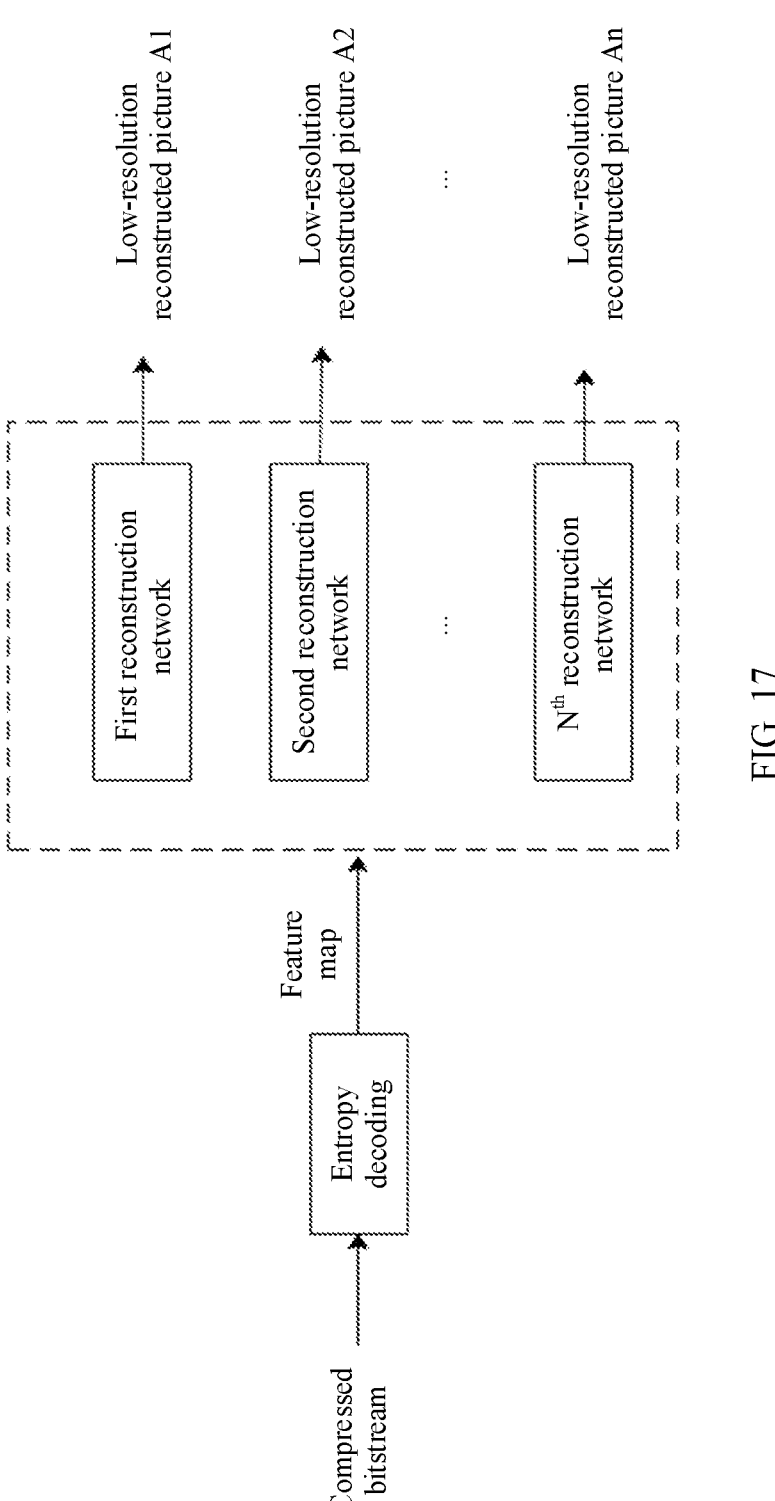
FIG. 17 is a schematic diagram of a procedure on a decoder side according to an embodiment of this disclosure.

A solution on an encoder side is the same as that in Embodiment 1. Details are not described herein again. FIG. 17 is a schematic diagram of a procedure on a decoder side according to an embodiment of this disclosure. Specific steps are as follows. Only step 3 is different from that in Embodiment 1, and only step 3 is described in detail herein.

Step 3: Select a corresponding reconstruction network branch based on a first resolution, and input a feature map y0 into a reconstruction module, to obtain a reconstructed picture having the first resolution.

Figures 18A, 18B, 18C, 18D:
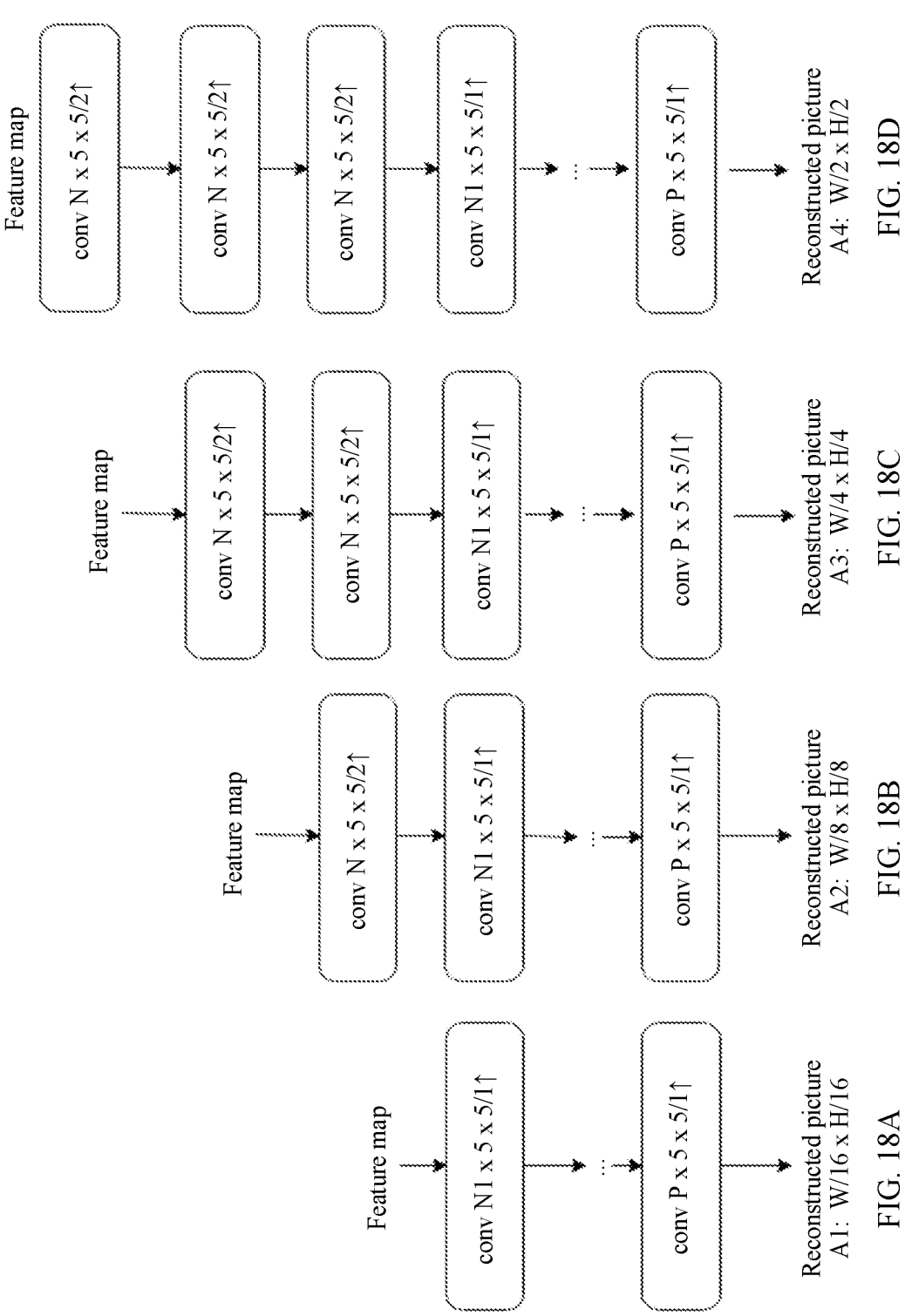
FIG. 18A, FIG. 18B, FIG. 18C, and FIG. 18D are a schematic diagram of a structure of a reconstruction network according to an embodiment of this disclosure.

FIGS. 18A, 18B, 18C, and 18D are a schematic diagram of a structure of a reconstruction network according to an embodiment of this disclosure. If the first resolution is W/16×H/16, a feature map y0 is input into a first reconstruction network (as shown in FIG. 18A), to obtain a target picture A1 having the first resolution. The first reconstruction network includes a first deconvolutional network, a quantity of output channels of the first deconvolutional network is P, and a stride is 1. The first reconstruction network may further include one or more second deconvolutional networks whose strides are 1, and output channels N1 of the plurality of second deconvolutional networks may be the same or different.

If the first resolution is W/8×H/8, a feature map y0 is input into a second reconstruction network (as shown in FIG. 18B), to obtain a target picture A2 having the first resolution. The second reconstruction network includes a third deconvolutional network. A quantity of channels of the third deconvolutional network is N, and a stride is 2. The second reconstruction network further includes a first deconvolutional network and a second deconvolutional network.

If the first resolution is W/4×H/4, a feature map y0 is input into a third reconstruction network (as shown in FIG. 18C), to obtain a target picture A3 having the first resolution. The third reconstruction network includes a third deconvolutional network, a quantity of channels of the third deconvolutional network is N, and a stride is 2. The third reconstruction network further includes a structure of the second reconstruction network.

If the first resolution is W/2×H/2, a feature map y0 is input into a fourth reconstruction network (as shown in FIG. 18D), to obtain a target picture A4 having the first resolution. The fourth reconstruction network includes a fourth deconvolutional network, a quantity of channels of the fourth deconvolutional network is N, and a stride is 2. The fourth reconstruction network further includes a structure of the third reconstruction network.

Figure 19:
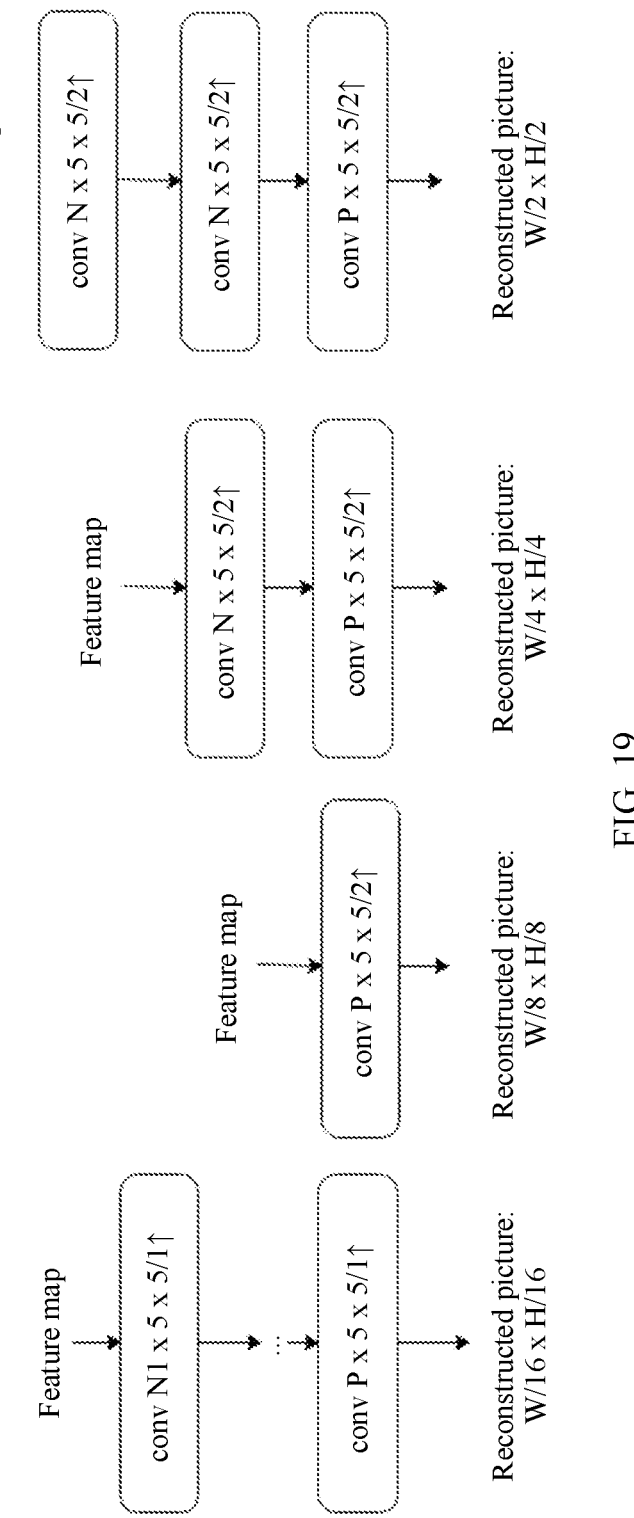
FIG. 19 is a schematic diagram of a structure of another reconstruction network according to an embodiment of this disclosure.

In another implementation, FIG. 19 is a schematic diagram of a structure of another reconstruction network according to an embodiment of this disclosure. The first reconstruction network, the second reconstruction network, the third reconstruction network, and the fourth reconstruction network may alternatively be implemented by using a network structure shown in FIG. 19. This is not limited herein.

Step 2.3: Process the reconstructed picture having the first resolution, to obtain a picture having the target resolution.

Embodiment 3

A difference between this embodiment and Embodiment 1 lies in that a quantity of channels of a feature map is reduced before the input feature map is reconstructed, or a quantity of channels of a feature map obtained by performing one layer or a plurality of layers of deconvolution operations in a reconstruction process is reduced, to reduce decoding complexity.

A method on a decoder side is as follows.

Based on Embodiment 1, only step 3 in this embodiment is different from that in Embodiment 1, and only step 3 is described in detail herein.

Figure 20:
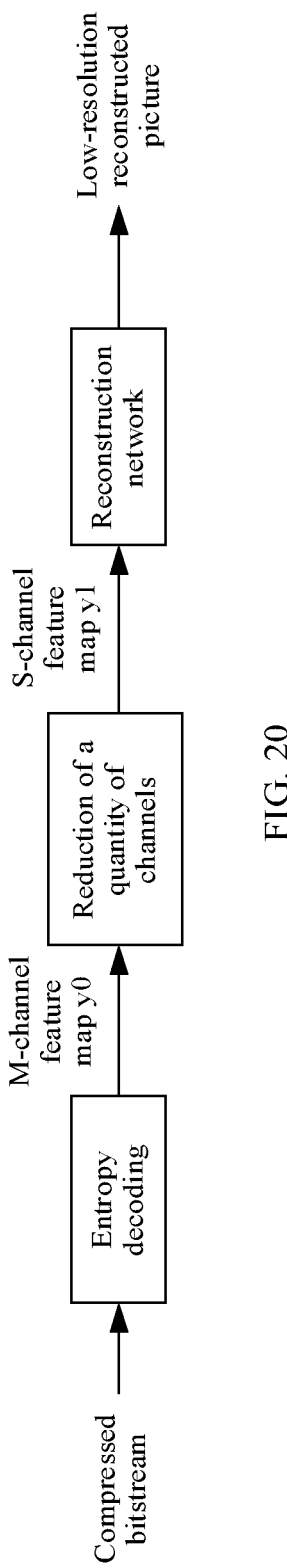
FIG. 20 is a schematic diagram of a channel reduction procedure according to an embodiment of this disclosure.

In a possible implementation, FIG. 20 is a schematic diagram of a channel reduction procedure according to an embodiment of this disclosure. Before a feature map y0 is input into a reconstruction network, a quantity M of channels of the feature map y0 is reduced to S, and only the feature map y1 with S channels is input. S is less than the quantity M of channels of the feature map y0. In this implementation, a plurality of different low-resolution reconstructed pictures cannot be output simultaneously. The reconstruction network may be implemented in a manner in Embodiment 1 and Embodiment 2.

Figure 21:
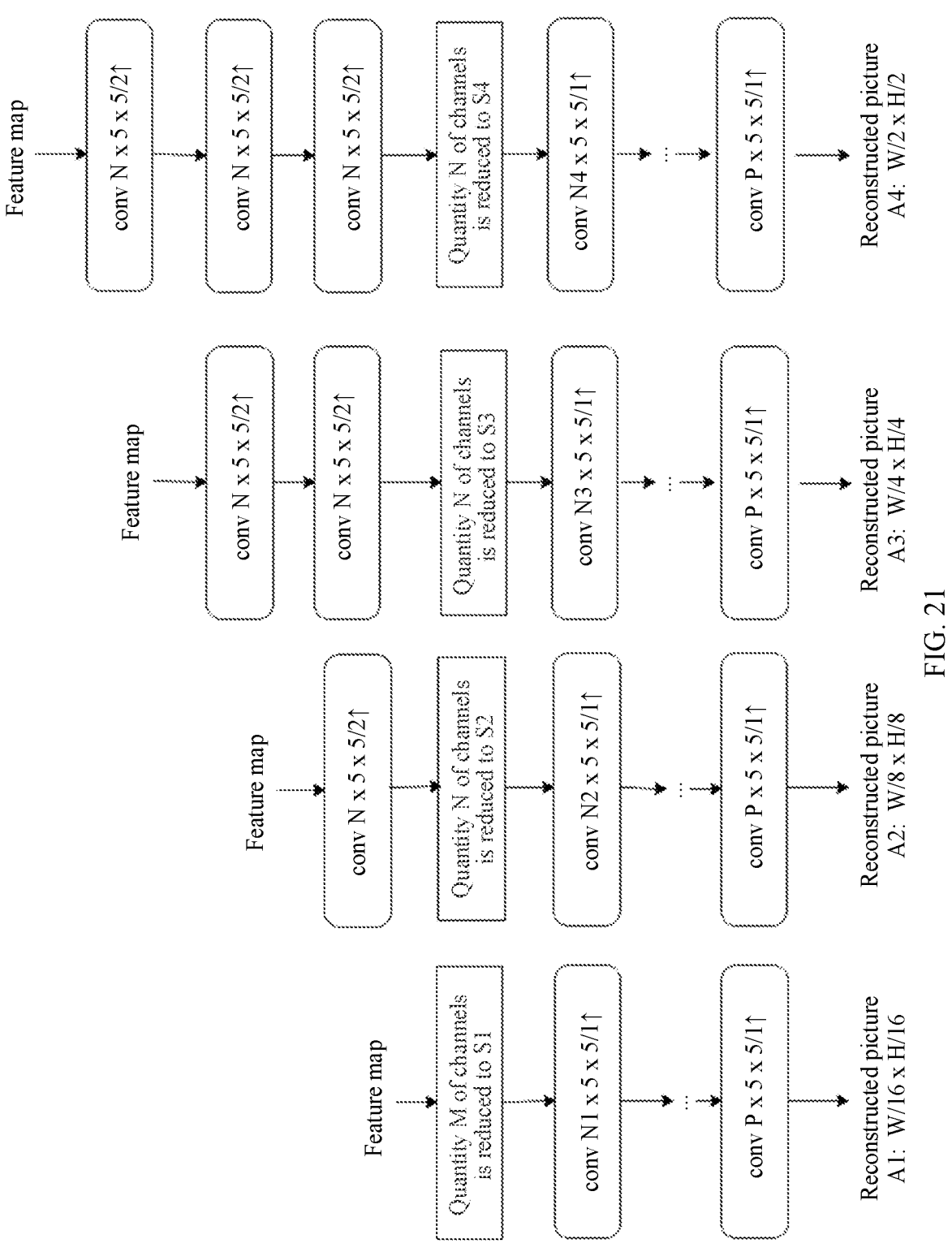
FIG. 21 is a schematic diagram of another channel reduction procedure according to an embodiment of this disclosure.

In a possible implementation, descriptions are provided with reference to Embodiment 2. FIG. 21 is a schematic diagram of another channel reduction procedure according to an embodiment of this disclosure. S1, S2, S3, and S4 each are less than the quantity M of channels of the feature map y0. When a first resolution is W/8×H/8, descriptions are provided by using an example in which the feature map y0 is input into a second reconstruction network to obtain a target picture A2. In this implementation, a plurality of different low-resolution reconstructed pictures may be simultaneously output. When a first resolution is W/8×H/8, the feature map y0 is input into a second reconstruction network, and passes through a deconvolutional layer whose quantity of channels is N and stride is 2, a feature map y1 whose quantity of channels is N is output, the quantity of channels of y1 is reduced to obtain a feature map whose quantity of channels is S2, and the feature map is input into a next level of a deconvolutional network, until a target picture A2 is output. A specific reduction method is to randomly extract feature map data of S2 channels, or extract feature map data of first S2 channels in N channels. This is not limited herein.

Figure 22:
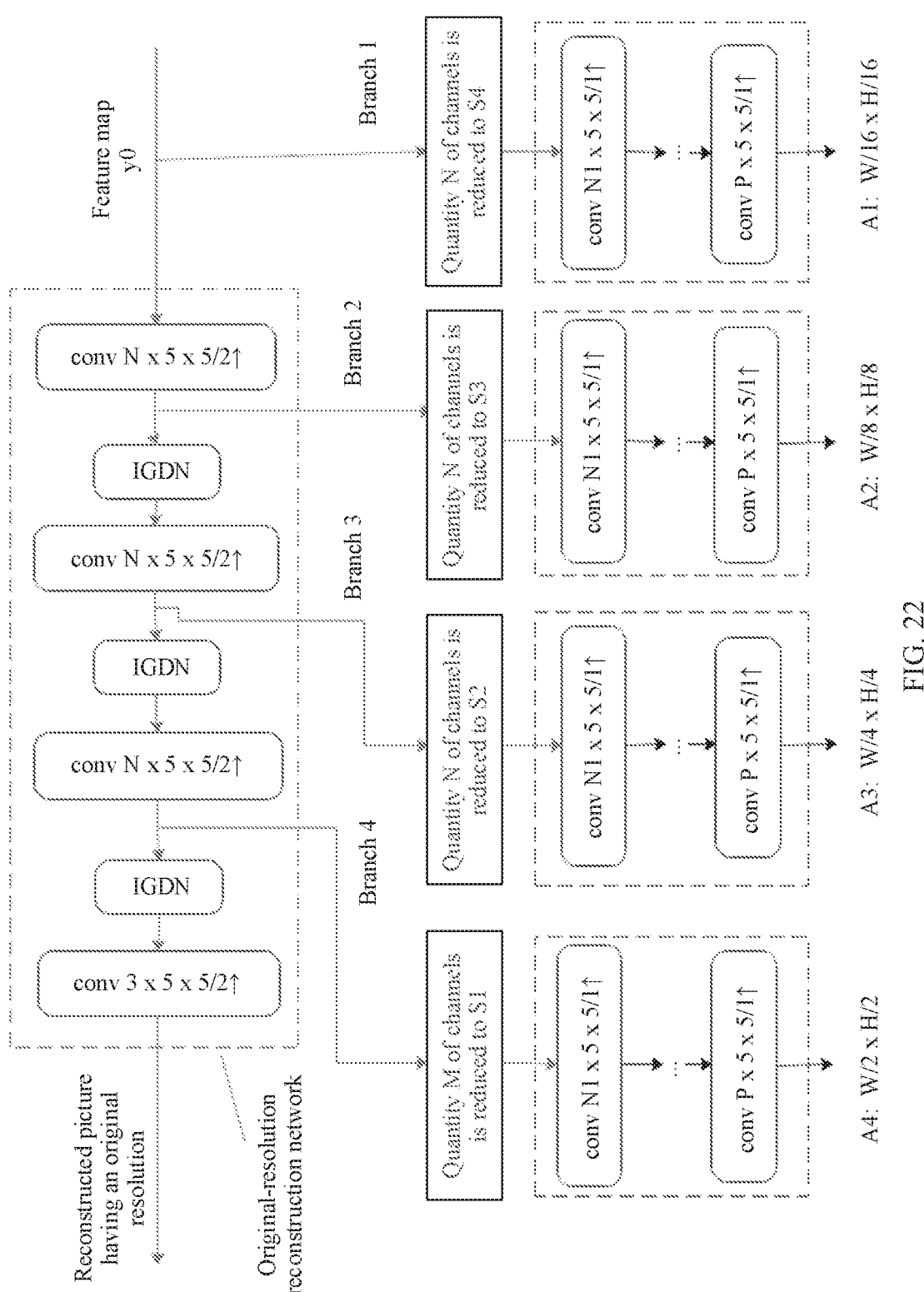
FIG. 22 is a schematic diagram of still another channel reduction procedure according to an embodiment of this disclosure.

In another possible implementation, descriptions are provided with reference to Embodiment 1. FIG. 22 is a schematic diagram of still another channel reduction procedure according to an embodiment of this disclosure. In FIG. 22, a quantity of channels of a feature map output by a convolutional layer is reduced in a reconstruction network, and S1, S2, S3, and S4 each are less than the quantity M of channels of the feature map y0. That the first resolution is W/8×H/8 is used for description. In this implementation, a plurality of different low-resolution reconstructed pictures may be simultaneously output. When the first resolution is W/8×H/8, the feature map y0 is input into an original-resolution reconstruction network, and a first layer of convolution operation is performed to obtain a feature map Q2 whose size is N×W/8×H/8, a quantity of channels of the feature map Q2 is reduced to obtain a feature map whose quantity of channels is S2, and the feature map is input into a reconstruction network in Branch 2, to obtain a reconstructed picture A2 whose size is P×W/8×H/8. A specific reduction method is to randomly extract feature map data of S2 channels, or extract feature map data of first S2 channels in the N channels. This is not limited herein.

Embodiment 4

Step 1: Decode a feature map of a main bitstream, to obtain feature maps (resolutions are W/K×H/K, and K=16) of first M channels (M<N) in all N channels.

Step 2: Input the feature maps of the M channels into a reconstruction network 1, to obtain a low-resolution picture A1 (a resolution of A1 is lower than a resolution W×H of an original picture).

Method 1: Perform a picture upsampling operation on the low-resolution reconstructed picture A1, to obtain a picture B1 having a target resolution.

A method for inputting the feature maps of the M channels into the reconstruction network 1 to obtain the low-resolution picture A1 is the same as that in Embodiment 1, and a low resolution corresponds to the first resolution in Embodiment 1. A method for setting the target resolution is not limited herein, for example, may be specified by an application side.

The picture upsampling operation is, for example, bilinear interpolation upsampling, or upsampling performed by directly filling a pixel value at a neighboring location.

Method 2: Perform a picture upsampling operation on the low-resolution reconstructed picture A1, to obtain a picture B3 having an original resolution.

The upsampling operation includes a picture upsampling operation, for example, bilinear interpolation upsampling, or upsampling performed by directly filling a pixel value at a neighboring location. Alternatively, a deconvolutional layer whose stride is greater than 1 is used for implementation.

A resolution of B3 is W×H.

Step 3: Decode the feature map of the main bitstream, to obtain feature maps of remaining N-M channels, and input feature maps of all the N channels into a reconstruction network 2, to obtain a picture B2 having an original resolution.

Beneficial effects: Steps 1 and 2 are performed, so that a small entropy decoding delay and a small picture reconstruction delay are occupied, and a low-quality picture is quickly generated. Step 3 and step 2 may be performed in parallel, to obtain a high-quality (standard-compliant) picture with a large delay.

Compared with the first three embodiments:

(1) Low-quality picture reconstruction can be started after feature maps of some channels is decoded.

(2) A reconstruction network may include a deconvolutional layer whose stride is greater than 1, to implement upsampling.

(3) Only two reconstruction branches are included.

Embodiment 5

In another possible implementation, an entire decoding solution in Embodiment 1 to Embodiment 4 may be simplified into the following two steps.

Step 1: Perform entropy decoding on a compressed bitstream, to obtain a three-dimensional feature map y0, where y0 includes two-dimensional feature maps that are of M channels and whose resolutions are W/k×H/k.

Step 2: Input the three-dimensional feature map y0 into a reconstruction network, to obtain a reconstructed picture having a first resolution. The first resolution is lower than a resolution W×H of an original picture.

It should be noted that processes in the foregoing embodiments may be combined randomly. For example, the process 605 may be as follows. The decoder reconstructs, based on the second neural network, the third feature map having the first resolution, to obtain the reconstructed picture having the second resolution, where the second resolution is different from the first resolution, the second resolution is lower than the resolution of the original picture, and the third feature map includes the second feature map and/or a feature map obtained by processing the second feature map based on the second neural network. This is not limited in this embodiment of this disclosure.

The foregoing mainly describes the encoding and decoding method provided in embodiments of this disclosure from a perspective of interaction between devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, each device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this disclosure, division into the modules is an example and is merely logical function division, and may be other division in an actual implementation.

Figure 23:
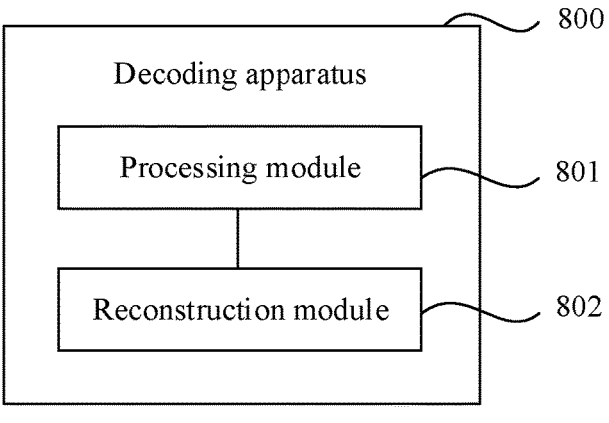
FIG. 23 is a block diagram of a decoding apparatus according to an embodiment of this disclosure.

FIG. 23 is a block diagram of a decoding apparatus according to an embodiment of this disclosure. A decoding apparatus 800 may be applied to an electronic device (for example, a decoder), and may be a chip or a functional module in the electronic device. When each functional module is obtained through division based on each corresponding function, the decoding apparatus 800 includes a processing module 801 and a reconstruction module 802, and further includes a transceiver module. The transceiver module may include a sending module and/or a receiving module, respectively configured to perform sending and receiving operations performed by the decoder in the embodiments shown in FIG. 4, FIG. 8, FIG. 9A and FIG. 9B, or FIG. 10.

The processing module 801 is configured to decode a bitstream, to obtain a first feature map, where a resolution of the first feature map is lower than a resolution of an original picture.

The reconstruction module 802 is configured to reconstruct a second feature map based on a first neural network, to obtain a reconstructed picture. A resolution of the second feature map and a resolution of the reconstructed picture each are a target resolution, the target resolution is lower than the resolution of the original picture, and the second feature map is the first feature map, or the second feature map is a feature map obtained by processing the first feature map based on a second neural network.

With reference to the foregoing solution, when the second feature map is a feature map obtained by processing the first feature map based on the second neural network, the second neural network includes one or more output nodes and a plurality of convolutional layers, the output node is located between an output end of a first convolutional layer and an input end of a last convolutional layer, the output node is connected to an input end of the first neural network, and the reconstruction module 802 is further configured to input the first feature map into the second neural network, to obtain the second feature map output by a target output node of the second neural network, where the target output node belongs to the one or more output nodes, and the reconstruction module 802 is configured to input the second feature map output by the target output node into the first neural network, to obtain the reconstructed picture output by the first neural network.

With reference to the foregoing solution, when there is a plurality of first neural networks, the reconstruction module 802 is configured to input the second feature map into a first neural network connected to the target output node, to obtain the reconstructed picture output by the first neural network connected to the target output node.

With reference to the foregoing solution, when there are a plurality of target resolutions and a plurality of target output nodes, the reconstruction module 802 is configured to input the first feature map into the second neural network, to obtain second feature maps that have a plurality of resolutions and that are output by the plurality of target output nodes of the second neural network, and input a second feature map output by each target output node into a first neural network connected to the target output node, to obtain reconstructed pictures that have a plurality of resolutions and that are output by first neural networks respectively connected to the plurality of target output nodes.

With reference to the foregoing solution, when the second neural network includes a plurality of output nodes, each output node corresponds to one output resolution, and the reconstruction module 802 is further configured to determine the target resolution, and determine that an output node whose output resolution is the target resolution is the target output node.

With reference to the foregoing solution, the first neural network includes at least one convolutional layer, and a convolution stride of the at least one convolutional layer is 1.

With reference to the foregoing solution, the bitstream corresponds to two-dimensional feature maps of M1 channels, and the processing module 801 is configured to decode a bitstream corresponding to two-dimensional feature maps of M2 channels in the M1 channels, to obtain the first feature map, where M2<M1, and the first feature map includes the two-dimensional feature maps of the M2 channels.

With reference to the foregoing solution, the reconstruction module 802 is further configured to perform upsampling processing on the reconstructed picture, to obtain a first picture, where a resolution of the first picture is the same as the resolution of the original picture.

With reference to the foregoing solution, the bitstream is a bitstream of an initial feature map, the initial feature map is obtained by performing feature extraction on the original picture, and the processing module 801 is further configured to decode a bitstream corresponding to a two-dimensional feature map of a channel other than the M2 channels in the M1 channels, to obtain a third feature map, where the third feature map includes two-dimensional feature maps of the M1-M2 channels, and the reconstruction module 802 is further configured to process the first feature map and the third feature map based on the second neural network, to obtain a second picture, where a resolution of the second picture is the same as the resolution of the original picture.

With reference to the foregoing solution, the second feature map includes two-dimensional feature maps of a plurality of channels, and before a second feature map is reconstructed based on a first neural network, to obtain a reconstructed picture, the processing module 801 is further configured to perform channel reduction processing on the second feature map, and the processing module 802 is configured to reconstruct, based on the first neural network, a second feature map obtained through channel reduction processing, to obtain the reconstructed picture.

With reference to the foregoing solution, the first feature map includes two-dimensional feature maps of a plurality of channels, and the reconstruction module 802 is further configured to perform channel reduction processing on the first feature map. The second feature map is a first feature map obtained through channel reduction processing, or the second feature map is a feature map obtained by processing, based on the second neural network, the first feature map obtained through channel reduction processing.

For a structure of an encoding apparatus, refer to the structure of the decoding apparatus shown in FIG. 23. The encoding apparatus may be applied to an electronic device (for example, an encoder), and may be a chip or a functional module in the electronic device. When each functional module is obtained through division based on each corresponding function, the encoding apparatus includes a processing module and an encoding module, and may further include a transceiver module. The transceiver module includes a sending module and/or a receiving module, respectively configured to perform sending and receiving operations performed by the encoder in the embodiments shown in FIG. 4, FIG. 8, FIG. 9A and FIG. 9B, or FIG. 10.

The processing module is configured to perform feature extraction on an original picture, to obtain an initial feature map, where the initial feature map includes two-dimensional feature maps of a plurality of channels, and a resolution of the initial feature map is lower than a resolution of the original picture.

The encoding module is configured to encode a to-be-encoded feature map, to obtain a bitstream. The to-be-encoded feature map is the initial feature map, or two-dimensional feature maps of some channels in the initial feature map.

The transceiver module is configured to send the bitstream to a decoding apparatus.

Figure 24:
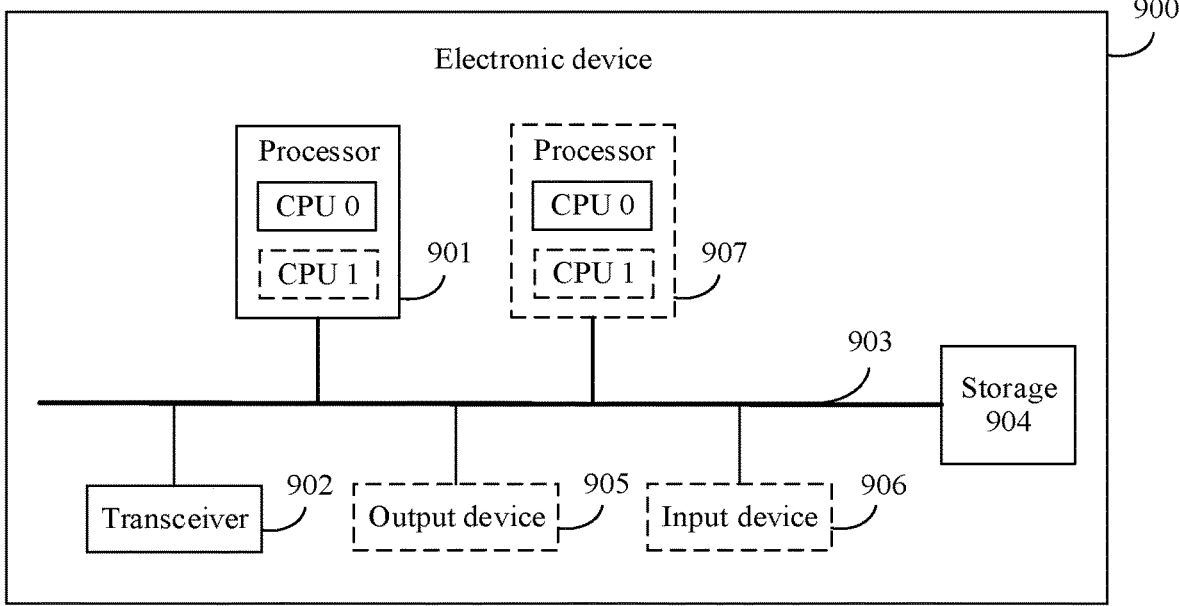
FIG. 24 is a schematic diagram of a structure of an electronic device according to an embodiment of this disclosure.

FIG. 24 is a schematic diagram of a structure of an electronic device according to an embodiment of this disclosure. An electronic device 900 may be a chip or a functional module in an encoder, or may be a chip or a functional module in a decoder. As shown in FIG. 24, the electronic device 900 includes a processor 901, a transceiver 902, and a communication line 903.

The processor 901 is configured to perform any step performed by the encoder or the decoder in the method embodiments shown in FIG. 4, FIG. 8, FIG. 9A and FIG. 9B, and FIG. 10. When data transmission such as obtaining is performed, the transceiver 902 and the communication line 903 may be selected to be invoked to complete a corresponding operation.

Further, the electronic device 900 may further include a storage 904. The processor 901, the storage 904, and the transceiver 902 may be connected through the communication line 903.

The processor 901 is a central processing unit (CPU), a general-purpose processor, a network processor (NP), a digital signal processor (DSP), a microprocessor, a microcontroller, a programmable logic device (PLD), or any combination thereof. Alternatively, the processor 901 may be another apparatus having a processing function, for example, a circuit, a component, or a software module. This is not limited.

The transceiver 902 is configured to communicate with another device. The transceiver 902 may be a module, a circuit, a transceiver, or any apparatus that can implement communication.

The transceiver 902 is mainly configured to receive and send data such as a picture or a bitstream, and may include a transmitter and a receiver, respectively configured to send and receive data. An operation other than data receiving and sending is implemented by a processor, for example, data processing and calculation.

The communication line 903 is configured to transmit information between components included in the electronic device 900.

In a design, the processor may be considered as a logic circuit, and the transceiver may be considered as an interface circuit.

The storage 904 is configured to store instructions. The instructions may be a computer program.

The storage 904 may be a volatile memory or a nonvolatile memory, or may include both of a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), and is used as an external cache. Through examples but not limitative descriptions, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct rambus dynamic random-access memory (DR RAM). The storage 904 may further be a read-only disc (CD-ROM) or another optical disc storage, an optical disc storage (including a compact disc, a laser disc, an optical disc, a digital versatile disc, a BLU-RAY disc, or the like), a magnetic disk storage medium, another magnetic storage device, or the like. It should be noted that the storage in the system and methods described in this specification includes but is not limited to these memories and any storage of another proper type.

It should be noted that the storage 904 may exist independently of the processor 901, or may be integrated together with the processor 901. The storage 904 may be configured to store instructions, program code, some data, or the like. The storage 904 may be located inside the electronic device 900, or may be located outside the electronic device 900. This is not limited. The processor 901 is configured to execute the instructions stored in the storage 904, to perform the method provided in the foregoing embodiments of this disclosure.

In an example, the processor 901 may include one or more CPUs such as a CPU 0 and a CPU 1 in FIG. 24.

In an optional implementation, the electronic device 900 includes a plurality of processors. For example, in addition to the processor 901 in FIG. 24, a processor 907 may be further included.

In an optional implementation, the electronic device 900 further includes an output device 905 and an input device 906. For example, the input device 906 is a device, for example, a keyboard, a mouse, a microphone, or a joystick, and the output device 905 is a device, for example, a display, or a speaker.

The processor and the transceiver that are described in this disclosure may be implemented on an integrated circuit (IC), an analog IC, a radio frequency integrated circuit, a hybrid signal IC, an application-specific integrated circuit (ASIC), a printed circuit board (PCB), an electronic device, or the like. The processor and the transceiver may alternatively be manufactured by using various IC technologies, for example, a complementary metal-oxide-semiconductor (CMOS), an N-type metal-oxide-semiconductor (NMOS), a p-type metal-oxide-semiconductor (PMOS), a bipolar junction transistor (BJT), a bipolar CMOS (BiCMOS), silicon germanium (SiGe), and gallium arsenide (GaAs).

It should be noted that the electronic device 900 may be any type of handheld or fixed device, for example, a notebook or laptop computer, a mobile phone, a smartphone, a tablet or tablet computer, a camera, a desktop computer, a set-top box, a television, a display device, a digital media player, a video game console, a video streaming device (for example, a content service server or a content distribution server), a broadcast receiving device, a broadcast transmitting device, and a monitoring device, and may not use or use any type of operating system. Alternatively, the electronic device 900 may be a device in a cloud computing scenario, for example, a virtual machine in a cloud computing scenario. In some cases, the electronic device 900 may be provided with a component used for wireless communication. Therefore, the electronic device 900 may be a wireless communication device, or a device having a structure similar to that in FIG. 15. In addition, a composition structure shown in FIG. 24 does not constitute a limitation on the electronic device 900. In addition to the components shown in FIG. 24, the electronic device 900 may include more or fewer components than those shown in FIG. 24, or combine some components, or have different component arrangements.

Alternatively, the electronic device 900 may be a chip system. The chip system may include a chip, or may include a chip and another discrete device.

In addition, for actions, terms, and the like in the embodiments of this disclosure, refer to each other. Details are not limited. In the embodiments of this disclosure, names of messages exchanged between devices, names of parameters in the messages, or the like are merely examples. Another name may alternatively be used in a specific implementation. Details are not limited.

In still another possible implementation, the transceiver module in FIG. 23 may be replaced with the transceiver 902 in FIG. 24, and a function of the transceiver module may be integrated into the transceiver 902. The processing module 801 may be replaced with the processor 907, and a function of the processing module 801 may be integrated into the processor 907. Further, the decoding apparatus 800 shown in FIG. 23 may further include a storage. When the transceiver module is replaced with a transceiver, and the processing module 801 is replaced with a processor, the decoding apparatus 800 or the encoding apparatus in this embodiment of this disclosure may be the electronic device 900 shown in FIG. 24.

According to the method provided in embodiments of this disclosure, this disclosure further provides a computer program product. The computer program product includes computer program code. When the computer program code is run on a computer, the computer is enabled to perform any one of the methods in embodiments of this disclosure.

An embodiment of this disclosure further provides a chip. The chip includes at least one processor, a storage, and an interface circuit. The storage, the transceiver, and the at least one processor are interconnected through a line. The at least one storage stores a computer program. When the computer program is executed by the processor, any one of the methods in embodiments of this disclosure is implemented.

An embodiment of this disclosure further provides a computer-readable storage medium. All or some of the procedures in the method embodiments may be completed by a computer or an apparatus having an information processing capability by executing a computer program or instructions to control related hardware. The computer program or the instructions may be stored in the computer-readable storage medium. When the computer program or the instructions are executed, the procedures in the method embodiments may be executed. The computer-readable storage medium may be an internal storage unit of the electronic device (including an encoder and/or a decoder) in any one of the foregoing embodiments, for example, a hard disk or a memory of the electronic device. The computer-readable storage medium may alternatively be an external storage device of the electronic device, for example, a plug-connected hard disk, a smart media card (SMC), a secure digital (SD) card, a flash card, or the like that is provided for the electronic device. Further, the computer-readable storage medium may alternatively include both the internal storage unit of the electronic device and the external storage device. The computer-readable storage medium is configured to store the computer program or instructions and another program and data that are required by the electronic device. The computer-readable storage medium may be further configured to temporarily store data that has been output or is to be output.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

A person skilled in the art may clearly understand that, for the purpose of convenient and brief description, for a detailed working process of the foregoing system, apparatus, and unit, refer to a corresponding process in the method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement, to achieve the objectives of the solutions of embodiments.

In addition, functional units in the embodiments of this disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, technical solutions of this disclosure essentially, or a part contributing to the conventional technology, or some of technical solutions may be implemented in a form of a software product. The computer software product is stored in a storage medium, and includes several instructions for instructing a computer device (a personal computer, a server, a network device, or the like) to perform all or some of the steps of the methods described in embodiments of this disclosure. The foregoing storage medium includes any medium that may store program code, for example, a Universal Serial Bus (USB) flash drive, a removable hard disk, a ROM, a RAM, a magnetic disk, or an optical disc.

The foregoing descriptions are merely specific implementations of this disclosure, but the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method implemented by a video decoder, wherein the method comprises:

decoding a first bitstream to obtain a first feature map, wherein a first resolution of the first feature map is lower than a second resolution of an original picture, wherein decoding the first bitstream comprises decoding a second bitstream corresponding to first two-dimensional feature maps of M2 channels in M1 channels to obtain the first feature map, wherein the first bitstream corresponds to second two-dimensional feature maps of the M1 channels, wherein M2<M1, and wherein the first feature map comprises the first two-dimensional feature maps; and reconstructing, based on a first neural network and the first feature map, a second feature map to obtain a reconstructed picture corresponding to the original picture, wherein each of a third resolution of the second feature map and a fourth resolution of the reconstructed picture has a target resolution, and wherein the target resolution is lower than the second resolution.

2. The method of claim 1, further comprising inputting the first feature map into a second neural network to obtain the second feature map from a target output node of the second neural network, wherein the second neural network comprises one or more first output nodes and convolutional layers, wherein the one or more first output nodes are located between an output end of a first convolutional layer and an input end of a last convolutional layer and are coupled to an input end of the first neural network, and wherein the target output node is of the one or more first output nodes; and wherein reconstructing the second feature map to obtain the reconstructed picture comprises inputting the second feature map into the first neural network to obtain the reconstructed picture.

3. The method of claim 2, wherein inputting the second feature map into the first neural network comprises inputting the second feature map into one first neural network of first neural networks to obtain the reconstructed picture from the one first neural network, and wherein the one first neural network is coupled to the target output node.

4. The method of claim 2, further comprising:

further inputting the first feature map into the second neural network to obtain second feature maps that have fifth resolutions and that are from target output nodes of the second neural network; and further inputting the second feature maps into corresponding first neural networks coupled to the target output nodes to obtain reconstructed pictures that have sixth resolutions.

5. The method of claim 2, further comprising:

determining the target resolution from output resolutions, wherein the second neural network comprises second output nodes respectively corresponding to the output resolutions; and setting a third output node that is of the second output nodes and that has the target resolution as the target output node.

6. The method of claim 1, wherein the first neural network comprises at least one convolutional layer, and wherein a convolution stride of the at least one convolutional layer is 1.

7. The method of claim 1, further comprising performing upsampling processing on the reconstructed picture to obtain a first picture, wherein a fifth resolution of the first picture is the same as the second resolution.

8. The method of claim 7, further comprising:

obtaining an initial feature map by performing feature extraction on the original picture;

obtaining the first bitstream from the initial feature map; and decoding a third bitstream corresponding to a third two-dimensional feature map of a first channel other than the M2 channels in the M1 channels to obtain a third feature map, wherein the third feature map comprises fourth two-dimensional feature maps of M1-M2 channels; and processing, based on a second neural network, the first feature map and the third feature map to obtain a second picture, wherein a sixth resolution of the second picture is the same as the second resolution.

9. The method of claim 1, further comprising:

performing, before reconstructing the second feature map, channel reduction processing on the second feature map to obtain a third feature map, wherein the second feature map comprises two-dimensional feature maps of channels; and reconstructing, based on the first neural network, the third feature map to obtain the reconstructed picture.

10. The method of claim 1, further comprising performing channel reduction processing on the first feature map to obtain the second feature map, wherein the first feature map comprises two-dimensional feature maps of channels.

11. The method of claim 1, further comprising processing, based on a second neural network, the first feature map to obtain the second feature map.

12. The method of claim 1, further comprising performing channel reduction processing on the first feature map to obtain a third feature map and processing, based on a second neural network, the third feature map to obtain the second feature map.

13. An electronic device comprising:

a storage configured to store instructions; and one or more processors coupled to the storage and configured to execute the instructions to cause the electronic device to:

decode a first bitstream to obtain a first feature map, wherein a first resolution of the first feature map is lower than a second resolution of an original picture;

decode a second bitstream corresponding to first two-dimensional feature maps of M2 channels in M1 channels to obtain the first feature map, wherein the first bitstream corresponds to second two-dimensional feature maps of the M1 channels, wherein M2<M1, and wherein the first feature map comprises the first two-dimensional feature maps; and reconstruct, based on a first neural network and the first feature map, a second feature map to obtain a reconstructed picture corresponding to the original picture, wherein each of a third resolution of the second feature map and a fourth resolution of the reconstructed picture has a target resolution, and wherein the target resolution is lower than the second resolution.

14. The electronic device of claim 13, wherein the one or more processors are further configured to execute the instructions to cause the electronic device to:

input the first feature map into a second neural network to obtain the second feature map from a target output node of the second neural network, wherein the second neural network comprises one or more first output nodes and convolutional layers, wherein the one or more first output nodes are located between an output end of a first convolutional layer and an input end of a last convolutional layer and are coupled to an input end of the first neural network, and wherein the target output node is of the one or more first output nodes; and reconstruct the second feature map to obtain the reconstructed picture by inputting the second feature map into the first neural network to obtain the reconstructed picture.

15. The electronic device of claim 14, wherein the one or more processors are further configured to execute the instructions to cause the electronic device to input the second feature map into one first neural network of first neural networks to obtain the reconstructed picture from the one first neural network, and wherein the one first neural network is coupled to the target output node.

16. The electronic device of claim 14, wherein the one or more processors are further configured to execute the instructions to cause the electronic device to:

further input the first feature map into the second neural network to obtain second feature maps that have fifth resolutions and that are from target output nodes of the second neural network; and further input second feature maps into corresponding first neural networks coupled to the target output nodes to obtain reconstructed pictures that have sixth resolutions.

17. The electronic device of claim 14, wherein the one or more processors are further configured to execute the instructions to cause the electronic device to:

determine the target resolution from output resolutions, wherein the second neural network comprises second output nodes respectively corresponding to the output resolutions; and set a third output node that is of the second output nodes and that has the target resolution as the target output node.

18. A computer program product comprising computer-executable instructions that are stored on a non-transitory computer-readable storage medium and that, when executed by one or more processors, cause an electronic device to:

decode a first bitstream to obtain a first feature map, wherein a first resolution of the first feature map is lower than a second resolution of an original picture;

decode a second bitstream corresponding to first two-dimensional feature maps of M2 channels in M1 channels to obtain the first feature map, wherein the first bitstream corresponds to second two-dimensional feature maps of the M1 channels, wherein M2<M1, and wherein the first feature map comprises the first two-dimensional feature maps; and reconstruct, based on a first neural network and the first feature map, a second feature map to obtain a reconstructed picture corresponding to the original picture, wherein each of a third resolution of the second feature map and a fourth resolution of the reconstructed picture has a target resolution, and wherein the target resolution is lower than the second resolution.

19. The computer program product of claim 18, wherein the instructions, when executed by the one or more processors, further cause the electronic device to:

input the first feature map into a second neural network to obtain the second feature map from a target output node of the second neural network, wherein the second neural network comprises one or more first output nodes and convolutional layers, wherein the one or more first output nodes are located between an output end of a first convolutional layer and an input end of a last convolutional layer and are coupled to an input end of the first neural network, and wherein the target output node is of the one or more first output nodes; and reconstruct the second feature map to obtain the reconstructed picture by inputting the second feature map into the first neural network to obtain the reconstructed picture.

20. The computer program product of claim 19, wherein the instructions, when executed by the one or more processors, further cause the electronic device to input the second feature map into one first neural network of first neural networks to obtain the reconstructed picture from the one first neural network, and wherein the one first neural network is coupled to the target output node.

* * * * *